United States Patent
Ramaswamy et al.

(10) Patent No.: US 9,055,336 B2
(45) Date of Patent: Jun. 9, 2015

(54) METHODS, SYSTEMS AND APPARATUS FOR MULTI-PURPOSE METERING

(71) Applicant: The Nielsen Company (US), LLC, Schaumburg, IL (US)

(72) Inventors: Arun Ramaswamy, Tampa, FL (US); Charles C. Conklin, New Port Richey, FL (US); Wayne A. Olmsted, Trinity, FL (US); Karin Johnson, Palm Harbor, FL (US); Fred Martensen, Tampa, FL (US); Daniel Nelson, Tampa, FL (US); Alexander Topchy, New Port Richey, FL (US); Paul M. Mears, Safety Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 14/280,949

(22) Filed: May 19, 2014

(65) Prior Publication Data
US 2014/0259033 A1    Sep. 11, 2014

Related U.S. Application Data

(63) Continuation of application No. 13/690,652, filed on Nov. 30, 2012, now Pat. No. 8,752,081, which is a continuation of application No. 11/957,082, filed on Dec. 14, 2007, now Pat. No. 8,327,396, which is a
(Continued)

(51) Int. Cl.
*H04N 7/16* (2011.01)
*H04N 21/442* (2011.01)
(Continued)

(52) U.S. Cl.
CPC .......... *H04N 21/44218* (2013.01); *H04L 12/66* (2013.01); *H04W 4/02* (2013.01);
(Continued)

(58) Field of Classification Search
USPC ........................................ 725/9–16
See application file for complete search history.

(56) References Cited

U.S. PATENT DOCUMENTS

| 449,495 | A | 3/1891 | Rose |
| 566,030 | A | 8/1896 | Sommer et al. |

(Continued)

FOREIGN PATENT DOCUMENTS

| AU | 199731160 | 12/1997 |
| AU | 2003253598 | 11/2003 |

(Continued)

OTHER PUBLICATIONS

"IEEE Standard for Information technology-Telecommunications and information exchange between systems-Local and metropolitan area networks-Specific requirements, Part 15.3: Wireless Medium Access Control (MAC) and Physical Layer (PHY) Specifications for High Rate Wireless Personal Area Networks (WPANs)", May 5, 2006, IEEE, IEEE Std 802.15.3b-2005.*

(Continued)

*Primary Examiner* — Nicholas Corbo
(74) *Attorney, Agent, or Firm* — Hanley, Flight & Zimmerman, LLC

(57) ABSTRACT

Methods and apparatus for multi-purpose metering are disclosed. An example method includes transmitting a first discovery inquiry message in response to a wakeup timer expiration signal, disabling a media detection circuit of the portable device when a base unit responds to the discovery inquiry message, and enabling the media detection circuit of the portable device when the base unit response to the discovery inquiry message is absent.

24 Claims, 24 Drawing Sheets

Related U.S. Application Data continuation of application No. PCT/US2007/008171, filed on Apr. 2, 2007.

(60) Provisional application No. 60/788,397, filed on Mar. 31, 2006, provisional application No. 60/870,054, filed on Dec. 14, 2006.

(51) Int. Cl.
*H04L 12/66* (2006.01)
*H04W 4/02* (2009.01)
*H04L 29/08* (2006.01)
*H04N 21/41* (2011.01)
*H04N 21/439* (2011.01)
*H04N 21/443* (2011.01)
*H04N 21/45* (2011.01)

(52) U.S. Cl.
CPC .......... *H04N21/44213* (2013.01); *H04L 67/22* (2013.01); *H04L 67/18* (2013.01); *H04N 21/4126* (2013.01); *H04N 21/4394* (2013.01); *H04N 21/4432* (2013.01); *H04N 21/4436* (2013.01); *H04N 21/4524* (2013.01)

(56) References Cited

U.S. PATENT DOCUMENTS

| | | |
|---|---|---|
| 3,056,135 A | 9/1962 | Currey et al. |
| 3,919,479 A | 11/1975 | Moon et al. |
| 4,230,990 A | 10/1980 | Lert, Jr. et al. |
| 4,245,245 A | 1/1981 | Matsumoto et al. |
| 4,279,433 A | 7/1981 | Petaja |
| 4,408,345 A | 10/1983 | Yashiro et al. |
| 4,461,241 A | 7/1984 | Ostler |
| 4,495,496 A | 1/1985 | Miller, III |
| 4,567,511 A | 1/1986 | Smith et al. |
| 4,603,232 A | 7/1986 | Kurland et al. |
| 4,623,230 A | 11/1986 | Weinblatt |
| 4,626,904 A | 12/1986 | Lurie |
| 4,658,357 A | 4/1987 | Carroll et al. |
| 4,677,466 A | 6/1987 | Lert, Jr. et al. |
| 4,688,026 A | 8/1987 | Scribner et al. |
| 4,695,879 A | 9/1987 | Weinblatt |
| 4,718,106 A | 1/1988 | Weinblatt |
| 4,814,751 A | 3/1989 | Hawkins et al. |
| 4,833,452 A | 5/1989 | Currier |
| 4,853,692 A | 8/1989 | Wolk et al. |
| 4,899,135 A | 2/1990 | Ghahariiran |
| 4,930,011 A | 5/1990 | Kiewit |
| 4,943,963 A | 7/1990 | Waechter et al. |
| 4,955,000 A | 9/1990 | Nastrom |
| 4,972,503 A | 11/1990 | Zurlinden |
| 4,990,892 A | 2/1991 | Guest et al. |
| 5,006,830 A | 4/1991 | Merritt |
| 5,014,206 A | 5/1991 | Scribner et al. |
| 5,062,151 A | 10/1991 | Shipley |
| 5,068,656 A | 11/1991 | Sutherland |
| 5,070,329 A | 12/1991 | Jasinaki |
| 5,072,380 A | 12/1991 | Randelman et al. |
| 5,086,290 A | 2/1992 | Murray et al. |
| 5,097,981 A | 3/1992 | Degasperi et al. |
| 5,119,104 A | 6/1992 | Heller |
| 5,133,081 A | 7/1992 | Mayo |
| 5,142,278 A | 8/1992 | Moallemi et al. |
| 5,146,231 A | 9/1992 | Ghaem et al. |
| 5,155,591 A | 10/1992 | Wachob |
| 5,200,822 A | 4/1993 | Bronfin et al. |
| 5,210,820 A | 5/1993 | Kenyon |
| 5,266,944 A | 11/1993 | Carroll et al. |
| 5,278,988 A | 1/1994 | Dejean et al. |
| 5,291,399 A | 3/1994 | Chaco |
| 5,309,174 A | 5/1994 | Minkus |
| 5,317,309 A | 5/1994 | Vercellotti et al. |
| 5,331,544 A | 7/1994 | Lu et al. |
| 5,357,254 A | 10/1994 | Kah, Jr. |
| 5,359,697 A | 10/1994 | Smith et al. |
| 5,382,970 A | 1/1995 | Kiefl |
| 5,387,993 A | 2/1995 | Heller et al. |
| 5,394,461 A | 2/1995 | Garland |
| 5,396,224 A | 3/1995 | Dukes et al. |
| 5,396,227 A | 3/1995 | Carroll et al. |
| 5,398,190 A | 3/1995 | Wortham |
| 5,406,271 A | 4/1995 | Sonnendorfer et al. |
| 5,410,344 A | 4/1995 | Graves et al. |
| 5,410,724 A | 4/1995 | Worthy |
| 5,432,841 A | 7/1995 | Rimer |
| 5,436,653 A | 7/1995 | Ellis et al. |
| 5,455,560 A | 10/1995 | Owen |
| 5,461,390 A | 10/1995 | Hoshen |
| 5,465,082 A | 11/1995 | Chaco |
| 5,471,404 A | 11/1995 | Mazer |
| 5,475,367 A | 12/1995 | Prevost |
| 5,481,294 A | 1/1996 | Thomas et al. |
| 5,483,276 A | 1/1996 | Brooks et al. |
| 5,490,060 A | 2/1996 | Malec et al. |
| 5,497,185 A | 3/1996 | Dufresne et al. |
| 5,510,828 A | 4/1996 | Lutterbach et al. |
| 5,515,426 A | 5/1996 | Yacenda et al. |
| 5,548,637 A | 8/1996 | Heller et al. |
| 5,550,928 A | 8/1996 | Lu et al. |
| 5,557,268 A | 9/1996 | Hughes et al. |
| 5,557,524 A | 9/1996 | Maki |
| 5,561,412 A | 10/1996 | Novak et al. |
| 5,568,119 A | 10/1996 | Schipper et al. |
| 5,588,005 A | 12/1996 | Ali et al. |
| 5,592,181 A | 1/1997 | Cai et al. |
| 5,594,786 A | 1/1997 | Chaco et al. |
| 5,621,388 A | 4/1997 | Sherburne et al. |
| 5,635,907 A | 6/1997 | Bernard et al. |
| 5,636,245 A | 6/1997 | Ernst et al. |
| 5,638,077 A | 6/1997 | Martin |
| 5,640,192 A | 6/1997 | Garfinkle |
| 5,644,723 A | 7/1997 | Deaton et al. |
| 5,650,769 A | 7/1997 | Campana, Jr. |
| 5,650,770 A | 7/1997 | Schlager et al. |
| 5,682,139 A | 10/1997 | Pradeep et al. |
| 5,686,888 A | 11/1997 | Welles, II et al. |
| 5,686,902 A | 11/1997 | Reis et al. |
| 5,689,229 A | 11/1997 | Chaco et al. |
| 5,691,980 A | 11/1997 | Welles, II et al. |
| 5,699,038 A | 12/1997 | Ulrich et al. |
| 5,699,244 A | 12/1997 | Clark, Jr. et al. |
| 5,705,980 A | 1/1998 | Shapiro |
| 5,708,421 A | 1/1998 | Boyd |
| 5,710,884 A | 1/1998 | Dedrick |
| 5,715,325 A | 2/1998 | Bang et al. |
| 5,717,717 A | 2/1998 | Yang et al. |
| 5,729,829 A | 3/1998 | Talwar et al. |
| 5,731,757 A | 3/1998 | Layson, Jr. |
| 5,737,026 A | 4/1998 | Lu et al. |
| 5,737,363 A | 4/1998 | Dinkins |
| 5,742,237 A | 4/1998 | Bledsoe |
| 5,748,104 A | 5/1998 | Argyroudis et al. |
| 5,751,246 A | 5/1998 | Hertel |
| 5,754,939 A | 5/1998 | Herz et al. |
| 5,760,704 A | 6/1998 | Barton et al. |
| 5,793,290 A | 8/1998 | Eagleson et al. |
| 5,808,564 A | 9/1998 | Simms et al. |
| 5,812,056 A | 9/1998 | Law |
| 5,812,959 A | 9/1998 | Froeburg et al. |
| 5,815,114 A | 9/1998 | Speasl et al. |
| 5,822,418 A | 10/1998 | Yacenda et al. |
| 5,822,544 A | 10/1998 | Chaco et al. |
| 5,825,283 A | 10/1998 | Camhi |
| 5,826,164 A | 10/1998 | Weinblatt |
| 5,828,402 A | 10/1998 | Collings |
| 5,838,223 A | 11/1998 | Gallant et al. |
| 5,848,129 A | 12/1998 | Baker |
| 5,867,205 A | 2/1999 | Harrison |
| 5,872,588 A | 2/1999 | Aras et al. |
| 5,889,548 A | 3/1999 | Chan |
| 5,890,068 A | 3/1999 | Fattouche et al. |
| 5,898,384 A | 4/1999 | Alt et al. |

(56) References Cited

U.S. PATENT DOCUMENTS

| | | |
|---|---|---|
| 5,901,171 A | 5/1999 | Kohli et al. |
| 5,917,425 A | 6/1999 | Crimmins et al. |
| 5,920,641 A | 7/1999 | Ueberreiter et al. |
| 5,923,252 A | 7/1999 | Sizer et al. |
| 5,952,958 A | 9/1999 | Speasl et al. |
| 5,973,683 A | 10/1999 | Cragun et al. |
| 5,974,396 A | 10/1999 | Anderson et al. |
| 5,982,808 A | 11/1999 | Otto |
| 5,984,182 A | 11/1999 | Murrah et al. |
| 5,987,306 A | 11/1999 | Nilsen et al. |
| 5,995,015 A | 11/1999 | DeTemple et al. |
| 6,002,918 A | 12/1999 | Heiman et al. |
| 6,006,148 A | 12/1999 | Strong |
| 6,009,333 A | 12/1999 | Chaco |
| 6,035,177 A | 3/2000 | Moses et al. |
| 6,041,280 A | 3/2000 | Kohli et al. |
| 6,052,734 A | 4/2000 | Ito et al. |
| 6,058,289 A | 5/2000 | Gardner et al. |
| 6,091,956 A | 7/2000 | Hollenberg |
| 6,098,048 A | 8/2000 | Dashefsky et al. |
| 6,104,295 A | 8/2000 | Gaisser et al. |
| 6,125,325 A | 9/2000 | Kohli |
| 6,184,918 B1 | 2/2001 | Goldschmidt et al. |
| 6,236,937 B1 | 5/2001 | Kohli |
| 6,246,948 B1 | 6/2001 | Thakker |
| 6,252,522 B1 | 6/2001 | Hampton et al. |
| 6,259,355 B1 | 7/2001 | Chaco et al. |
| 6,275,166 B1 | 8/2001 | Del Castillo et al. |
| 6,300,880 B1 | 10/2001 | Sitnik |
| 6,308,045 B1 | 10/2001 | Wright et al. |
| RE37,531 E | 1/2002 | Chaco et al. |
| 6,353,929 B1 | 3/2002 | Houston |
| 6,359,557 B2 | 3/2002 | Bilder |
| 6,381,577 B1 | 4/2002 | Brown |
| 6,393,046 B1 | 5/2002 | Kohli et al. |
| 6,397,041 B1 | 5/2002 | Ballard et al. |
| 6,400,753 B1 | 6/2002 | Kohli et al. |
| 6,421,609 B2 | 7/2002 | Kohli |
| 6,430,498 B1 | 8/2002 | Maruyama et al. |
| 6,433,689 B1 | 8/2002 | Hovind et al. |
| 6,466,971 B1 | 10/2002 | Humpleman et al. |
| 6,467,089 B1 | 10/2002 | Aust et al. |
| 6,487,719 B1 | 11/2002 | Itoh et al. |
| 6,523,175 B1 | 2/2003 | Chan |
| 6,530,082 B1 | 3/2003 | Del Sesto et al. |
| 6,531,982 B1 | 3/2003 | White et al. |
| 6,539,393 B1 | 3/2003 | Kabala |
| 6,546,419 B1 | 4/2003 | Humpleman et al. |
| 6,563,423 B2 | 5/2003 | Smith |
| 6,574,558 B2 | 6/2003 | Kohli |
| 6,577,238 B1 | 6/2003 | Whitesmith et al. |
| 6,606,744 B1 | 8/2003 | Mikurak |
| 6,615,130 B2 | 9/2003 | Myr |
| 6,647,548 B1 | 11/2003 | Lu et al. |
| 6,650,322 B2 | 11/2003 | Dai et al. |
| 6,662,137 B2 | 12/2003 | Squibbs |
| 6,671,818 B1 | 12/2003 | Mikurak |
| 6,675,383 B1 | 1/2004 | Wheeler et al. |
| 6,741,684 B2 | 5/2004 | Kaars |
| 6,745,011 B1 | 6/2004 | Hendrickson et al. |
| 6,813,475 B1 | 11/2004 | Worthy |
| 6,839,539 B2 | 1/2005 | Durrant et al. |
| 6,934,508 B2 | 8/2005 | Ceresoli et al. |
| 6,940,403 B2 | 9/2005 | Kail, IV |
| 6,970,131 B2 | 11/2005 | Percy et al. |
| 7,055,165 B2 | 5/2006 | Connelly |
| 7,080,061 B2 | 7/2006 | Kabala |
| 7,086,075 B2 | 8/2006 | Swix et al. |
| 7,107,009 B2 | 9/2006 | Sairanen et al. |
| 7,117,008 B2 | 10/2006 | Bajikar |
| 7,124,101 B1 | 10/2006 | Mikurak |
| 7,130,807 B1 | 10/2006 | Mikurak |
| 7,155,159 B1 | 12/2006 | Weinblatt et al. |
| 7,181,159 B2 | 2/2007 | Breen |
| 7,222,071 B2 | 5/2007 | Neuhauser et al. |
| 7,277,692 B1 | 10/2007 | Jones et al. |
| 7,289,643 B2 | 10/2007 | Brunk et al. |
| 7,295,108 B2 | 11/2007 | Corrado et al. |
| 7,460,827 B2 | 12/2008 | Schuster et al. |
| 7,471,987 B2 | 12/2008 | Crystal et al. |
| 7,483,975 B2 | 1/2009 | Kolessar et al. |
| 7,647,604 B2 | 1/2010 | Ramaswamy |
| 7,650,616 B2 | 1/2010 | Lee |
| 7,770,193 B2 | 8/2010 | Lee |
| 7,783,889 B2 | 8/2010 | Srinivasan |
| 7,793,316 B2 | 9/2010 | Mears et al. |
| 8,020,179 B2 | 9/2011 | Mears et al. |
| 8,023,882 B2 | 9/2011 | Croy et al. |
| 8,185,351 B2 | 5/2012 | Crystal et al. |
| 8,225,342 B2 | 7/2012 | Mears et al. |
| 8,327,396 B2 | 12/2012 | Ramaswamy et al. |
| 8,467,717 B2 | 6/2013 | Croy et al. |
| 8,555,304 B2 | 10/2013 | Mears et al. |
| 8,738,763 B2 | 5/2014 | Crystal et al. |
| 8,752,081 B2 | 6/2014 | Ramaswamy et al. |
| 2001/0037232 A1 | 11/2001 | Miller |
| 2001/0049620 A1 | 12/2001 | Blasko |
| 2002/0010919 A1 | 1/2002 | Lu et al. |
| 2002/0027682 A1 | 3/2002 | Iwasaki et al. |
| 2002/0056087 A1 | 5/2002 | Berezowski et al. |
| 2002/0059094 A1 | 5/2002 | Hosea et al. |
| 2002/0059218 A1 | 5/2002 | August et al. |
| 2002/0068556 A1 | 6/2002 | Brown |
| 2002/0083060 A1 | 6/2002 | Wang et al. |
| 2002/0129360 A1 | 9/2002 | Lee |
| 2002/0133393 A1 | 9/2002 | Tatsumi et al. |
| 2002/0133412 A1 | 9/2002 | Oliver et al. |
| 2002/0138830 A1 | 9/2002 | Nagaoka et al. |
| 2002/0144259 A1 | 10/2002 | Gutta et al. |
| 2002/0152090 A1 | 10/2002 | Kobayashi et al. |
| 2002/0174425 A1 | 11/2002 | Markel et al. |
| 2002/0178220 A1 | 11/2002 | Smith et al. |
| 2002/0178441 A1 | 11/2002 | Hashimoto |
| 2002/0198762 A1 | 12/2002 | Donato |
| 2003/0005430 A1 | 1/2003 | Kolessar |
| 2003/0005433 A1 | 1/2003 | Janik et al. |
| 2003/0018977 A1 | 1/2003 | McKenna |
| 2003/0037333 A1 | 2/2003 | Ghashghai et al. |
| 2003/0041141 A1 | 2/2003 | Abdelaziz et al. |
| 2003/0046685 A1 | 3/2003 | Srinivasan et al. |
| 2003/0070182 A1 | 4/2003 | Pierre et al. |
| 2003/0074224 A1 | 4/2003 | Tanabe et al. |
| 2003/0097302 A1 | 5/2003 | Overhultz et al. |
| 2003/0115586 A1 | 6/2003 | Lejouan et al. |
| 2003/0121041 A1 | 6/2003 | Mineyama |
| 2003/0122708 A1 | 7/2003 | Percy et al. |
| 2003/0163831 A1 | 8/2003 | Gall et al. |
| 2003/0170001 A1 | 9/2003 | Breen |
| 2003/0171833 A1 | 9/2003 | Crystal et al. |
| 2003/0172376 A1 | 9/2003 | Coffin et al. |
| 2003/0177488 A1 | 9/2003 | Smith et al. |
| 2004/0004737 A1 | 1/2004 | Kahn et al. |
| 2004/0019463 A1 | 1/2004 | Kolessar et al. |
| 2004/0025174 A1 | 2/2004 | Cerrato |
| 2004/0027271 A1 | 2/2004 | Schuster et al. |
| 2004/0041703 A1 | 3/2004 | Bergman et al. |
| 2004/0058675 A1 | 3/2004 | Lu et al. |
| 2004/0064351 A1 | 4/2004 | Mikurak |
| 2004/0111738 A1 | 6/2004 | Gunzinger |
| 2004/0122679 A1 | 6/2004 | Neuhauser et al. |
| 2004/0237096 A1 | 11/2004 | Cain et al. |
| 2005/0034147 A1 | 2/2005 | Best, Jr. et al. |
| 2005/0035857 A1 | 2/2005 | Zhang et al. |
| 2005/0039206 A1 | 2/2005 | Opdycke |
| 2005/0054285 A1 | 3/2005 | Mears et al. |
| 2005/0125820 A1 | 6/2005 | Nelson et al. |
| 2005/0141345 A1 | 6/2005 | Holm et al. |
| 2005/0144632 A1 | 6/2005 | Mears et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2006/0168613 A1 | 7/2006 | Wood et al. |
| 2006/0178918 A1 | 8/2006 | Mikurak |
| 2006/0242325 A1 | 10/2006 | Ramaswamy et al. |

(56) References Cited

U.S. PATENT DOCUMENTS

| | | |
|---|---|---|
| 2007/0011040 A1 | 1/2007 | Wright et al. |
| 2007/0177626 A1 | 8/2007 | Kotelba |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0005308 A1 | 1/2008 | Ochiai et al. |
| 2008/0086533 A1 | 4/2008 | Neuhauser et al. |
| 2008/0091087 A1 | 4/2008 | Neuhauser et al. |
| 2008/0091451 A1 | 4/2008 | Crystal |
| 2008/0091762 A1 | 4/2008 | Neuhauser et al. |
| 2008/0109295 A1 | 5/2008 | McConochie et al. |
| 2008/0140479 A1 | 6/2008 | Mello et al. |
| 2008/0204273 A1 | 8/2008 | Crystal et al. |
| 2009/0037575 A1 | 2/2009 | Crystal et al. |
| 2009/0070797 A1 | 3/2009 | Ramaswamy et al. |
| 2009/0169024 A1 | 7/2009 | Krug et al. |
| 2009/0171767 A1 | 7/2009 | Kolessar |
| 2010/0199296 A1 | 8/2010 | Lee et al. |
| 2010/0268540 A1 | 10/2010 | Arshi et al. |
| 2010/0268573 A1 | 10/2010 | Jain et al. |
| 2010/0269127 A1 | 10/2010 | Krug |
| 2010/0299689 A1 | 11/2010 | Mears et al. |
| 2011/0099142 A1 | 4/2011 | Karjalainen et al. |
| 2011/0106587 A1 | 5/2011 | Lynch et al. |
| 2011/0153391 A1 | 6/2011 | Tenbrock |
| 2011/0289523 A1 | 11/2011 | Mears et al. |
| 2012/0245978 A1 | 9/2012 | Jain et al. |

FOREIGN PATENT DOCUMENTS

| | | |
|---|---|---|
| CA | 2073387 | 1/1993 |
| CA | 2252903 | 4/1997 |
| CA | 2229238 | 8/1999 |
| EP | 0231427 | 8/1987 |
| EP | 1026847 | 8/2000 |
| EP | 0895599 | 8/2002 |
| EP | 0731339 | 11/2002 |
| EP | 1209483 | 3/2003 |
| EP | 1271102 | 6/2003 |
| EP | 1133090 | 2/2008 |
| EP | 1213860 | 4/2008 |
| FR | 2555383 | 5/1985 |
| JP | 7007483 | 1/1995 |
| JP | 7327017 | 12/1995 |
| JP | 8249307 | 9/1996 |
| JP | 9081638 | 9/1997 |
| JP | 10163992 | 6/1998 |
| JP | 10308711 | 11/1998 |
| JP | 11308185 | 11/1999 |
| JP | 11345388 | 12/1999 |
| JP | 2000020548 | 1/2000 |
| JP | 2000020555 | 1/2000 |
| JP | 2000048070 | 2/2000 |
| JP | 2000068956 | 3/2000 |
| JP | 2000307530 | 11/2000 |
| JP | 2000517141 | 12/2000 |
| JP | 2001502130 | 2/2001 |
| JP | 2001209881 | 8/2001 |
| JP | 2001524776 | 12/2001 |
| JP | 2001527320 | 12/2001 |
| JP | 2002051274 | 2/2002 |
| JP | 2002064467 | 2/2002 |
| JP | 2002135810 | 5/2002 |
| JP | 2002344933 | 11/2002 |
| JP | 2004222129 | 8/2004 |
| JP | 2005520393 | 7/2005 |
| JP | 2006260275 | 9/2006 |
| WO | 9111062 | 7/1991 |
| WO | 9417609 | 8/1994 |
| WO | 9504430 | 2/1995 |
| WO | 9512278 | 5/1995 |
| WO | 9904350 | 1/1999 |
| WO | 9933206 | 7/1999 |
| WO | 0003364 | 1/2000 |
| WO | 03077455 | 9/2003 |
| WO | 03095945 | 11/2003 |
| WO | 2005041109 | 5/2005 |
| WO | 2005057956 | 6/2005 |
| WO | 2005071961 | 8/2005 |
| WO | 2006037014 | 4/2006 |
| WO | 2006099612 | 9/2006 |
| WO | 2007073484 | 6/2007 |
| ZA | 20048525 | 9/2006 |

OTHER PUBLICATIONS

Canadian Intellectual Patent Office, "Office Action," issued in connection with corresponding Canadian Application No. 2,647,892, issued Nov. 13, 2014 (4 pages).

Battelle Transportation Division, "Lexington Area Travel Data Collection Test," Final Report to Federal Highway Administration, Sep. 15, 1997 (92 pages).

Bizcommunity.com, "Nielsen to Test Electronic Ratings for Outdoor Advertising," retrieved from <http://www.bizcommunity.com/Print.aspx?1=196&c=19&ct=1&ci=1181/198/19/1181 >, retrieved Feb. 25, 2011(3 pages).

Canadian Intellectual Property Office, "First Office Action," issued in connection with Canadian Patent Application No. 2,483,042, on Jun. 15, 2010 (8 pages).

Canadian Intellectual Property Office, "Notification of a Requisition by the Examiner," issued in connection with Canadian Patent Application No. 2,407,474, on Sep. 8, 2009 (4 pages).

Canadian Intellectual Property Office, "Second Office Action," issued in connection with Canadian Patent Application No. 2,483,042, mailed Oct. 11, 2011 (5 pages).

Canadian Intellectual Property Office, "Third Office Action," issued in connection with Canadian Patent Application No. 2,483,042, mailed May 14, 2013 (5 pages).

Canadian Intellectual Patent Office, "Office Action," issued in connection with Canadian Patent Application No. 2,615,262, issued May 21, 2014 (2 pages).

Canadian Intellectual Patent Office, "Office Action," issued in connection with Canadian Patent Application No. 2,647,892, issued Nov. 5, 2013 (3 pages).

Canadian Intellectual Patent Office, "Office Action," issued in connection with Canadian Patent Application No. 2,483,042, issued Jun. 9, 2014 (2 pages).

Canadian Intellectual Patent Office, "Office Action," issued in connection with Canadian Patent Application No. 2,669,133, issued Jun. 16, 2014 (2 pages).

Complaint in *Arbitron Inc.* v. *John Barrett Kiefl* in United States District Court for the Southern District of New York, Apr. 22, 2009, Case 1:09-cv-04013-PAC (12 pages).

Cormen et al., "C Track: Assignment 7," Sep. 14, 2004 (6 pages).

European Patent Office, "European Search Report," issued in connection with European Patent Application No. 03750041.0, mailed Oct. 19, 2010 (3 pages).

European Patent Office, "European Search Report," issued in connection with European Application No. 07754662.0, mailed Nov. 5, 2012 (7 pages).

European Patent Office, "European Search Report," issued in connection with European Patent Application No. 07754662.0, mailed Oct. 17, 2012 (6 pages).

European Patent Office, "Examination Report," issued in connection with European Patent Application No. 03750041.0, mailed Apr. 11, 2011 (7 pages).

European Patent Office, "Examination Report," issued in connection with European Patent Application No. 07844943.6, mailed Aug. 12, 2013 (7 pages).

European Patent Office, "Examination Report," issued in connection with European Patent Application No. 07844943.6, mailed Dec. 8, 2011 (5 pages).

(56) References Cited

OTHER PUBLICATIONS

European Patent Office, "Extended European Search Report," issued in connection with European Patent Application No. 07844943.6, mailed Dec. 30, 2010 (10 pages).
European Patent Office, "Extended European Search Report," issued in connection with European Patent Application No. 13002091.0, mailed Dec. 11, 2013 (9 pages).
European Patent Office, "Supplementary European Search Report," issued in connection with European Patent Application No. 03815891.1, mailed Feb. 27, 2009 (3 pages).
Fink et al., "Social- and Interactive-Television Applications Based on Real-Time Ambient-Audio Identification," EuroITV, 2006 (10 pages).
Government of India Patent Office, "First Examination Report," issued in connection with Indian Patent Application No. 1833/CHENP/2005, mailed Feb. 27, 2007 (3 pages).
Government of India Patent Office, "First Examination Report," issued in connection with Indian Patent Application No. 2346/CHENP/2004, mailed Aug. 9, 2010 (2 pages).
Government of India Patent Office, "Grant Notice," issued in connection with Indian Patent Application No. 1833/CHENP/2005, mailed Feb. 4, 2008 (2 pages).
Government of India Patent Office, "Office Action," issued in connection with Indian Patent Application No. 1833/CHENP/2005, mailed Dec. 12, 2007 (2 pages).
Instituto Mexicano de la Propiedad Industrial, "English Summary of Office Action," issued in connection with Mexican Patent Application No. PA/a/2004/010349, issued Jun. 6, 2007 (3 pages).
Instituto Mexicano de la Propiedad Industrial, "Office Action," issued in connection with Mexican Patent Application No. MX/a/2007/012204, issued Jun. 8, 2010 (4 pages).
Instituto Mexicano de la Propiedad Industrial, "Office Action," issued in connection with Mexican Patent Application No. MX/a/2009/004889, mailed Jul. 1, 2013 (2 pages).
Instituto Mexicano de la Propiedad Industrial, "Office Action," issued in connection with Mexican Patent Application No. PA/a/2006/008054, issued Apr. 7, 2009 (4 pages).
Intellectual Property Corporation of Malaysia, "Substantive Examination Adverse Report and Search Report," issued in connection with Malaysian Application No. PI20031501, mailed Aug. 14, 2009 (3 pages).
Intellectual Property Corporation of Malaysia, "Substantive Examination Adverse Report and Search Report," issued in connection with Malaysian Application No. PI20050135, mailed May 13, 2008 (3 pages).
Intellectual Property Corporation of Malaysia, "Substantive Examination Adverse Report and Search Report," issued in connection with Malaysian Application No. PI20080006, mailed Dec. 31, 2008 (3 pages).
Intellectual Property Corporation of Malaysia, "Substantive Examination Adverse Report," issued in connection with Malaysian Application No. PI20031501, mailed Dec. 31, 2008 (2 pages).
Intellectual Property Office of New Zealand, "Examination Report," issued in connection with New Zealand Patent Application No. 556380, mailed Jul. 13, 2007 (1 page).
International Bureau, "International Preliminary Report on Patentability," issued in connection with International Patent Application No. PCT/US2003/04030, mailed Apr. 22, 2004 (9 pages).
International Bureau, "International Preliminary Report on Patentability," issued in connection with International Patent Application No. PCT/US2007/008171, mailed Mar. 24, 2009 (6 pages).
International Bureau, "International Preliminary Report on Patentability," issued in connection with International Patent Application No. PCT/US2007/083940, mailed May 12, 2009 (4 pages).
International Bureau, "Report on Patentability and Written Opinion," issued in connection with International Patent Application No. PCT/US2004/00818, mailed Jul. 27, 2006 (11 pages).
International Bureau, "Written Opinion," issued in connection with International Patent Application No. PCT/US2007/083940, mailed Apr. 16, 2008 (3 pages).
International Preliminary Examining Authority, "International Preliminary Examination Report," issued in connection with International Patent Application No. PCT/US2003/12371, mailed Feb. 22, 2005 (29 pages).
International Preliminary Examining Authority, "International Preliminary Examination Report," issued in connection with International Patent Application No. PCT/US2003/12371, mailed Mar. 30, 2005 (6 pages).
International Preliminary Examining Authority, "Written Opinion," issued in connection with International Patent Application No. PCT/US2003/12371, mailed Dec. 9, 2004 (5 pages).
International Searching Authority, "International Search Report," issued in connection with International Patent Application No. PCT/US2003/04030, mailed Aug. 19, 2003 (4 pages).
International Searching Authority, "International Search Report," issued in connection with International Patent Application No. PCT/US2007/08171, mailed Sep. 18, 2008 (4 pages).
International Searching Authority, "Search Report," issued in connection with International Patent Application No. PCT/US2003/12371, mailed Feb. 19, 2004 (5 pages).
International Searching Authority, "Search Report," issued in connection with International Patent Application No. PCT/US2004/00818, mailed Mar. 25, 2005 (3 pages).
International Searching Authority, "Search Report," issued in connection with International Patent Application No. PCT/US2007/083940, mailed Apr. 16, 2008 (1 page).
International Searching Authority, "Written Opinion," issued in connection with International Patent Application No. PCT/US2003/04030, mailed Dec. 12, 2003 (8 pages).
International Searching Authority, "Written Opinion," issued in connection with International Patent Application No. PCT/US2004/00818, mailed Mar. 25, 2005 (9 pages).
International Searching Authority, "Written Opinion," issued in connection with International Patent Application No. PCT/US2007/08171, mailed Sep. 18, 2008 (4 pages).
International Trade Administration, Office of Telecommunications, "Global Positioning System: Market Projections and Trends in the Newest Global Information Utility," Sep. 1998 (95 pages).
IP Australia, "Patent Examination Report 1," issued in connection with Australian Patent Application No. 2007316392, mailed Sep. 10, 2012 (3 pages).
IP Australia, "Patent Examination Report 2," issued in connection with Australian Patent Application No. 2007316392, mailed Jan. 2, 2013 (3 pages).
IP Australia, "Patent Examination Report 3," issued in connection with Australian Patent Application No. 2007316392, mailed Mar. 4, 2013 (4 pages).
IP Australia, "Search Report," issued in connection with Australian Patent Application No. SG 200206444-2, mailed Jul. 22, 2005 (4 pages).
IP Australia, "Notice of Acceptance," issued in connection with Australian Patent Application No. 2003253598, mailed Jul. 11, 2008 (3 pages).
IP Australia, "Notice of Acceptance," issued in connection with Australian Patent Application No. 2007316392, mailed May 15, 2014 (2 pages).
Israel Patent Office, "Office Action," issued in connection with Israel Patent Application No. 198525. mailed Nov. 22, 2012 (4 pages).
Israel Patent Office, "Office Action," issued in connection with Israel Patent Application No. 198525. issued Jun. 18, 2014 (4 pages).
Japanese Patent Office, "Final Rejection," issued in connection with Japanese Patent Application No. P2009-536460, mailed Jan. 28, 2014 (5 pages).
Japanese Patent Office, "Notice of Grounds for Rejection," issued in connection with Japanese Patent Application No. 2001-579179, mailed Oct. 20, 2009 (5 pages).
Japanese Patent Office, "Office Action" issued in connection with Japanese Patent Application No. 2009-536460, mailed Jun. 12, 2012 (5 pages).
Japanese Patent Office, "Office Action" issued in connection with Japanese Patent Application No. 2009-536460, mailed Jun. 18, 2013 (5 pages).

(56) References Cited

OTHER PUBLICATIONS

Korean Intellectual Property Office, "Office Action," issued in connection with Korean Patent Application No. 10-2009-7011445, mailed Dec. 12, 2013 (10 pages).
Korean Intellectual Property Office, "Translation of Notice of Preliminary Rejection," issued in connection with Korean Patent Application No. 10-2004-07017055, mailed Nov. 30, 2009 (6 pages).
Korean Intellectual Property Office, "Translation of Notice of Preliminary Rejection," issued in connection with Korean Patent Application No. 10-2009-7011445, mailed Jun. 10, 2014 (9 pages).
Macera, John S. (representing Kiefl) to Michael Skarzynski (of Arbitron) re; Alleged Patent Infringement, Exhibit 1 of the Apr. 22, 2009 Complaint in *Arbitron Inc.*, v. *John Barrett Kiefl* in United States District Court for the Southern District of New York, Case 1:09-cv-04013-PAC, Apr. 8, 2009 (8 pages).
Radio Ink, "Arbitron & Scarborough Unveil New Mall Shopper Audience Measurement," retrieved from <http://www.radioink.com/HeadlineEntry.asp?hid=135452&pt=todaynews>, 2008 (1 page).
Robinson, Phillip, "Global Positioning Helps Keep Travelers on Course," Knight Rider/Tribune News Service, Jun. 1997 (3 pages).
Skarzynski, Michael (of Arbitron), to John S. Macera (representing Kiefl) re: Alleged Patent Infringement, Apr. 23, 2009 (2 pages).
State Intellectual Property Office of China, "First Office Action," issued in conncection with Chinese Patent Application No. 038090759, mailed Sep. 7, 2007 (3 pages).
State Intellectual Property Office of China, "First Office Action," issued in connection with Chinese Patent Application No. 200710139849.7, mailed Mar. 13, 2009 (1 pages).
State Intellectual Property Office of China, "First Office Action," issued in connection with Chinese Patent Application No. 200780047653.3, mailed Aug. 27, 2010 (8 pages).
State Intellectual Property Office of China, "Rejection Decision," issued in connection with Chinese Patent Application No. 03809075.9, mailed Jan. 15, 2010 (11 pages).
State Intellectual Property Office of China, "Second Office Action," issued in connection with Chinese Patent Application No. 200710139849.7, mailed Nov. 30, 2011 (1 page).
State Intellectual Property Office of China, "Second Office Action," issued in connection with Chinese Patent Application No. 200780047653.3, mailed Jul. 20, 2011 (9 pages).
State Intellectual Property Office of China, "Text of the Notification of Reexamination," issued in connection with Chinese Patent Application No. 03809075.9, mailed Jul. 19, 2011 (7 pages).
State Intellectual Property Office of China, "Third Office Action," issued in connection with Chinese Patent Application No. 200710139849.7, mailed Aug. 3, 2012 (6 pages).
Taiwanese Patent Office, "Examiners Opinion," issued in connection with Taiwanese Patent Application No. 9210797, mailed Oct. 30, 2007 (2 pages).
Taiwanese Patent Office, "Office Action," issued in connection with Taiwanese Patent Application No. 9210797, mailed Jul. 31, 2009 (14 pages).
Taiwanese Patent Office, "Preliminary Exam Report," issued in connection with Taiwanese Patent Application No. 9210797, mailed Jul. 19, 2007 (7 pages).
United States Patent and Trademark Office, "Advisory Action," issued in connection with U.S. Appl. No. 10/970,585, mailed Aug. 18, 2009 (3 pages).
United States Patent and Trademark Office, "Advisory Action," issued in connection with U.S. Appl. No. 11/457,666, mailed Aug. 8, 2007 (5 pages).
United States Patent and Trademark Office, "Advisory Action," issued in connection with U.S. Appl. No. 11/935,788, mailed Aug. 30, 2012 (3 pages).
United States Patent and Trademark Office, "Non-Final Office Action," issued in connection with U.S. Appl. No. 10/970,585, mailed Aug. 18, 2011 (9 pages).
United States Patent and Trademark Office, "Final Office Action," issued in connection with U.S. Appl. No. 10/970,585, mailed Jun. 4, 2009 (13 pages).
United States Patent and Trademark Office, "Final Office Action," issued in connection with U.S. Appl. No. 10/970,585, mailed May 10, 2010 (13 pages).
United States Patent and Trademark Office, "Final Office Action," issued in connection with U.S. Appl. No. 11/457,666, mailed Dec. 14, 2009 (19 pages).
United States Patent and Trademark Office, "Final Office Action," issued in connection with U.S. Appl. No. 11/935,788, mailed May 11, 2011 (20 pages).
United States Patent and Trademark Office, "Final Office Action," issued in connection with U.S. Appl. No. 11/935,788, mailed May 24, 2010 (13 pages).
United States Patent and Trademark Office, "Final Office Action," issued in connection with U.S. Appl. No. 11/935,788, mailed May 9, 2012 (22 pages).
United States Patent and Trademark Office, "Final Office Action," issued in connection with U.S. Appl. No. 11/957,082, mailed Aug. 25, 2011 (12 pages).
United States Patent and Trademark Office, "Final Office Action," issued in connection with U.S. Appl. No. 13/159,243, mailed Jan. 26, 2012 (26 pages).
United States Patent and Trademark Office, "Non-Final Office Action," issued in connection with U.S. Appl. No. 10/970,585, mailed Dec. 29, 2010, (17 pages).
United States Patent and Trademark Office, "Non-Final Office Action," issued in connection with U.S. Appl. No. 10/970,585, mailed Oct. 27, 2009 (12 pages).
United States Patent and Trademark Office, "Non-Final Office Action," issued in connection with U.S. Appl. No. 10/970,585, mailed Oct. 29, 2008 (12 pages).
United States Patent and Trademark Office, "Non-Final Office Action," issued in connection with U.S. Appl. No. 11/457,666, mailed Feb. 23, 2009 (16 pages).
United States Patent and Trademark Office, "Non-Final Office Action," issued in connection with U.S. Appl. No. 11/457,666, mailed Feb. 26, 2010 (18 pages).
United States Patent and Trademark Office, "Non-Final Office Action," issued in connection with U.S. Appl. No. 11/935,788, mailed Mar. 4, 2013 (21 pages).
United States Patent and Trademark Office, "Non-Final Office Action," issued in connection with U.S. Appl. No. 11/935,788, mailed Nov. 3, 2010 (21 pages).
United States Patent and Trademark Office, "Non-Final Office Action," issued in connection with U.S. Appl. No. 11/935,788, mailed Sep. 16, 2011 (23 pages).
United States Patent and Trademark Office, "Non-Final Office Action," issued in connection with U.S. Appl. No. 11/935,788, mailed Sep. 17, 2009 (10 pages).
United States Patent and Trademark Office, "Non-Final Office Action," issued in connection with U.S. Appl. No. 11/957,082, mailed Nov. 29, 2010 (12 pages).
United States Patent and Trademark Office, "Non-Final Office Action," issued in connection with U.S. Appl. No. 13/159,243, mailed Aug. 17, 2012 (5 pages).
United States Patent and Trademark Office, "Non-Final Office Action," issued in connection with U.S. Appl. No. 13/159,243, mailed Aug. 18, 2011 (21 pages).
United States Patent and Trademark Office, "Notice of Allowance," issued in connection with U.S. Appl. No. 10/970,585, mailed Mar. 16, 2012 (8 pages).
United States Patent and Trademark Office, "Notice of Allowance," issued in connection with U.S. Appl. No. 11/457,666, mailed Mar. 4, 2011 (7 pages).
United States Patent and Trademark Office, "Notice of Allowance," issued in connection with U.S. Appl. No. 11/457,666, mailed Nov. 23, 2010 (6 pages).
United States Patent and Trademark Office, "Notice of Allowance," issued in connection with U.S. Appl. No. 11/935,788, mailed Jan. 15, 2014 (6 pages).

(56) References Cited

OTHER PUBLICATIONS

United States Patent and Trademark Office, "Notice of Allowance," issued in connection with U.S. Appl. No. 11/935,788, mailed Oct. 4, 2013 (13 pages).

United States Patent and Trademark Office, "Notice of Allowance," issued in connection with U.S. Appl. No. 11/957,082, mailed Aug. 1, 2012 (10 pages).

United States Patent and Trademark Office, "Notice of Allowance," issued in connection with U.S. Appl. No. 13/159,243, mailed Feb. 20, 2013 (7 pages).

United States Patent and Trademark Office, "Notice of Allowance," issued in connection with corresponding U.S. Appl. No. 13/526,415, mailed Jun. 10, 2013 (15 pages).

United States Patent and Trademark Office, "Requirement of Restriction/Election," issued in connection with corresponding U.S. Appl. No. 10/970,585, mailed Apr. 16, 2008 (6 pages).

United States Patent and Trademark Office, "Requirement of Restriction/Election," issued in connection with corresponding U.S. Appl. No. 10/970,585, mailed Aug. 21, 2008 (9 pages).

United States Patent and Trademark Office, "Restriction Requirement," issued in connection with U.S. Appl. No. 11/957,082, mailed Jul. 28, 2010 (21 pages).

United States Patent and Trademark Office, "Supplemental Advisory Action," issued in connection with corresponding U.S. Appl. No. 11/457,666, mailed Mar. 9, 2010 (19 pages).

United States Patent and Trademark Office, "Notice of Allowance," issued in connection with U.S. Appl. No. 13/690,652, mailed Jan. 24, 2014 (12 pages).

United States Patent and Trademark Office, "Notice of Allowance," issued in connection with U.S. Appl. No. 13/690,652, mailed May 12, 2014 (5 pages).

Walker, R., "Audio Watermarking," R&D White Paper WHP 057, BBC Research and Development, Aug. 31, 2004 (18 pages).

Want et al, "Bridging Physical and Virtual Worlds with Electronic Tags," ACM CHI'99, Pittsburgh, PA, May 15-20, 1999, ACM Press (8 pages).

Webster'S II New Riverside University Dictionary, Definition of "Advertise," 1984, 1988 (3 pages).

* cited by examiner

| 1300 | |
|---|---|
| . | . |
| . | . |
| . | . |
| $T_1$ | $s_1$ |
| $T_2$ | $s_2$ |
| $T_3$ | $s_3$ |
| $T_4$ | $s_4$ |
| $T_5$ | $s_5$ |
| $T_6$ | $s_6$ |
| $T_7$ | $s_7$ |
| $T_8$ | $s_8$ |
| $T_9$ | $s_9$ |
| $T_{10}$ | $s_{10}$ |
| $T_{11}$ | $s_{11}$ |
| $T_{12}$ | $s_{12}$ |
| $T_{13}$ | $s_{13}$ |
| $T_{14}$ | $s_{14}$ |
| $T_{15}$ | $s_{15}$ |
| $T_{16}$ | $s_{16}$ |
| $T_{17}$ | $s_{17}$ |
| $T_{18}$ | $s_{18}$ |
| $T_{19}$ | $s_{19}$ |
| $T_{20}$ | $s_{20}$ |
| $T_{21}$ | $s_{21}$ |
| $T_{22}$ | $s_{22}$ |
| $T_{23}$ | $s_{23}$ |
| $T_{24}$ | $s_{24}$ |
| $T_{25}$ | $s_{25}$ |
| $T_{26}$ | $s_{26}$ |
| . | . |
| . | . |
| . | . |

| 1305 | |
|---|---|
| . | . |
| . | . |
| . | . |
| $\tau_1$ | $\sigma_1$ |
| $\tau_5$ | $\sigma_5$ |
| $\tau_9$ | $\sigma_9$ |
| $\tau_{13}$ | $\sigma_{13}$ |
| $\tau_{17}$ | $\sigma_{17}$ |
| $\tau_{21}$ | $\sigma_{21}$ |
| $\tau_{25}$ | $\sigma_{25}$ |
| . | . |
| . | . |
| . | . |

$T_1 \neq \tau_1$ $S_1 \neq \sigma_1$

METHODS, SYSTEMS AND APPARATUS FOR MULTI-PURPOSE METERING

CROSS REFERENCE TO RELATED APPLICATIONS

This patent is a continuation of U.S. patent application Ser. No. 13/690,652, filed on Nov. 30, 2012, which is a continuation of U.S. patent application Ser. No. 11/957,082, filed on Dec. 14, 2007 and Issued as U.S. Pat. No. 8,327,396 on Dec. 4, 2012, which is a continuation of International Patent Application Serial No. PCT/US2007/008171, filed on Apr. 2, 2007, which claims the benefit of U.S. Provisional Patent Application Ser. No. 60/788,397, filed on Mar. 31, 2006, all of which are hereby incorporated herein by reference in their entireties. This patent also claims the benefit of U.S. Provisional Patent Application Ser. No. 60/870,054, filed on Dec. 14, 2006, which is hereby incorporated herein by reference in its entirety.

FIELD OF THE DISCLOSURE

The present disclosure relates generally to media monitoring and, more particularly, to methods, systems, and apparatus for multi-purpose metering.

BACKGROUND

Consuming media presentations (i.e., audio and/or video presentations) generally involves listening to audio information and/or viewing video information. Media presentations may include, for example, radio programs, music, television programs, movies, still images, etc. Media-centric companies such as, for example, advertising companies, broadcast networks, etc. are often interested in the viewing and listening interests of audience to better market their products and/or to improve their programming. A well-known technique often used to measure the exposure and/or number of audience members exposed to media involves awarding media exposure credit to a media presentation for each audience member that is exposed to the media presentation.

Media exposure credit is often measured by monitoring the media consumption of audience members using, for example, personal portable metering devices (PPMs), also known as portable metering devices, tags, and portable personal meters. A PPM is an electronic device that is typically worn (e.g., clipped to a belt or other apparel) or carried by an audience member and configured to monitor media consumption (e.g., viewing and/or listening activities) using any of a variety of media monitoring techniques. For example, one technique of monitoring media consumption involves detecting or collecting information (e.g., ancillary codes, signatures, etc.) from audio and/or video signals that are emitted or presented by media presentation devices (e.g., televisions, stereos, speakers, computers, video display devices, video games, mobile telephones, etc.).

While wearing a PPM, an audience member or monitored individual performs their usual daily routine, which may include listening to the radio and/or other sources of visual and/or audio-visual media and/or watching television programs and/or other sources of visual media. As the audience member is exposed to (e.g., is in proximity to) media, a PPM associated with (e.g., assigned to and carried by) that audience member detects audio and/or video information associated with the media, generates monitoring data, and/or determines location data. In general, monitoring data may include any information that is representative of (or associated with) and/or that may be used to identify a particular media presentation (e.g., a song, a television program, a movie, a video game, etc.) and/or to identify the source of the media presentation (e.g., a television, a digital video disk player, a stereo system, etc.). For example, the monitoring data may include (a) signatures that are collected or generated by the PPM based on audio or visual characteristics of the media, (b) audio codes that are broadcast simultaneously with (e.g., embedded in) the media, (c) infrared (IR) or radio frequency (RF) signals emitted by a remote control device and/or emitted by a transceiver configured to transmit location information, (d) information supplied by the audience member using any of a variety of data input devices, etc.

In several known systems, information associated with the location of an audience member is used to determine or to collect media monitoring information. For example, location information may be used to identify media (e.g., billboards) to which audience members were exposed and/or to better understand the environments within which audience members consume different types of media information. Thus, location information may be used to track and log the location of an audience member as the audience member performs a daily routine.

Location information may be collected using any of several known systems such as, for example, location code emitters and broadcast positioning systems. Location code emitters are typically configured to emit location codes associated with respective areas within which the location code emitters are disposed. The codes may be, for example, acoustic codes, audio codes, RF codes, IR codes, Bluetooth® codes, etc., that are detected by PPMs worn or carried by audience members. More specifically, the location codes may be automatically and continuously or intermittently detected and collected by a PPM as the PPM is moved from area to area.

Broadcast positioning systems (e.g., global positioning systems, radio frequency positioning systems, etc.) are typically configured to work in combination with position monitors or PPMs that are worn or carried by audience members. The position monitors are configured to determine and/or collect location information associated with the location of audience members based on information emitted by the broadcast positioning systems.

Media monitoring information and location information are often used to credit media presentations to which audience members have been exposed as having been consumed by the audience member. However, credit given to media presentations based on exposure is not necessarily indicative of actual media consumption. For example, an audience member may be within hearing and viewing distance of a television program, but may be inattentive, preoccupied or otherwise not actively consuming the content of the television program. Thus, assigning consumption credit to media based on exposure, alone, may result in inaccurate audience measurement data.

Another drawback of the traditional operation of PPMs stems from the dependency on the audience member's ability/willingness to comply with PPM wearing/carrying requirements. More specifically, for example, the data collected by the PPM represents media exposed to the audience member provided that the PPM is sufficiently near the audience member to detect such media. As a result, each audience member who agrees to be monitored is required to comply with prescribed carrying/wearing requirements. Such requirements, generally identify a minimum percentage of daily waking time during which the audience member is required to carry/wear the PPM, but may also (or instead) identify specific periods of time during which the PPM must be carried/worn or a minimum number of PPM carrying/wearing hours per day. If such requirements are not met, media exposure may go undetected or media exposure may be inaccurately detected if, for example, the PPM detects a media presentation to which the audience member was not exposed because the audience member was not within proximity of the PPM when that particular media presentation was detected.

Compliance verification techniques are often as difficult to implement as attempting to enforce audience members to comply with appropriate operating guidelines of the PPM. An audience member is often relied on to comply with appropriate operating guidelines of PPM usage. However, human factors such as forgetfulness, personal preference, stress, etc. often affect negatively the intentions of audience members to fully comply in their usage of PPMs.

DETAILED DESCRIPTION

Figure 1:
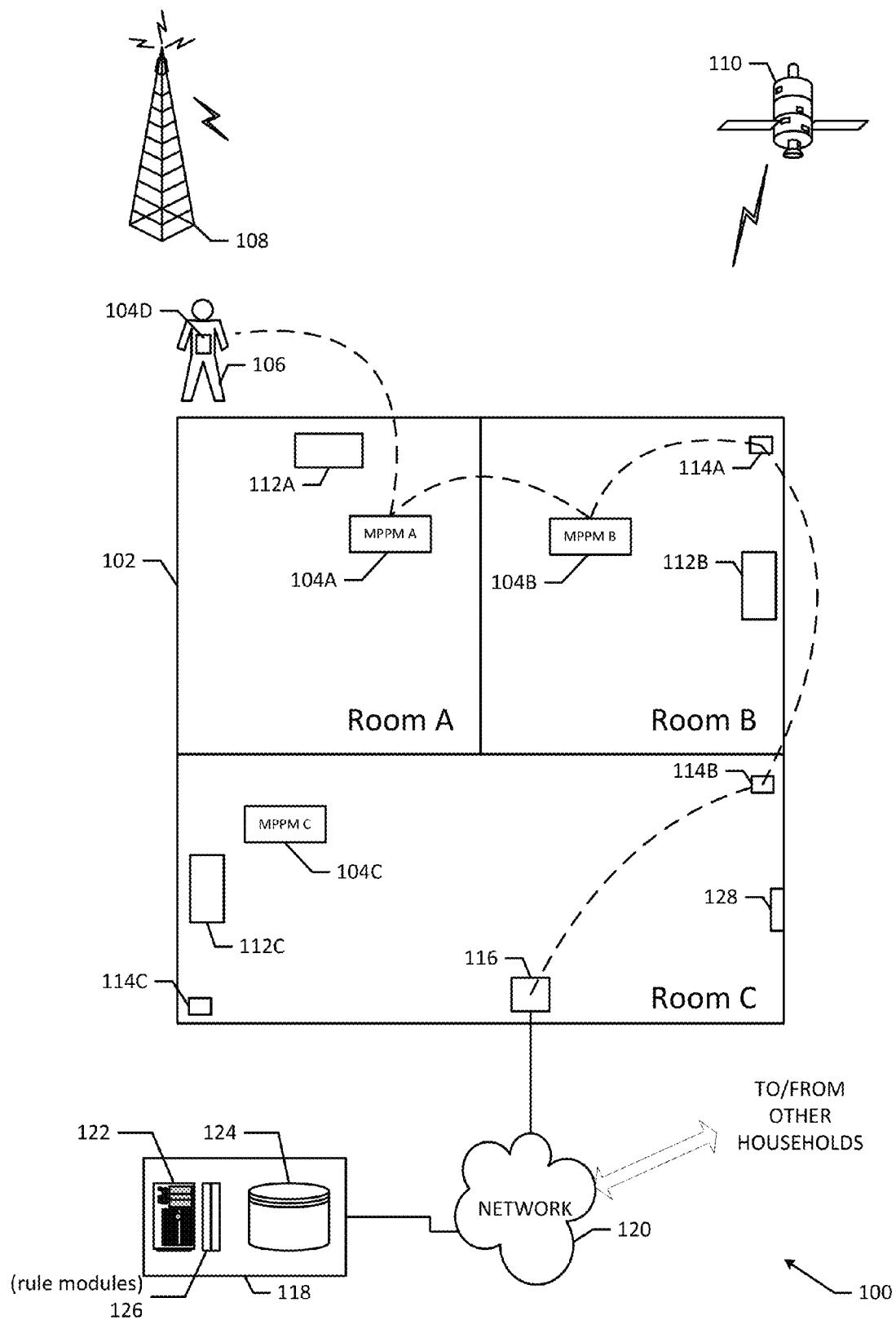
FIG. 1 illustrates an example system for collecting media exposure information and an example area in which audience members may be exposed to media presentations.

Although the following discloses example systems including, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware, firmware, and/or software. Accordingly, while the following describes example systems, persons having ordinary skill in the art will readily appreciate that the examples provided are not the only way to implement such systems.

In general, the example methods and apparatus described herein may be used to analyze the movements and/or behaviors of audience members in the course of their exposure to media sources or media presentations to aid in determining whether such media presentations were actually consumed by the audience members. In some example implementations, the audience members may be panelist members that are statistically selected to participate in a market research study. However, in other example implementations, the audience members need not be panelist members. While mere proximity to media sources reflects an audience member's exposure, determining whether the audience member was paying attention to, consumed, and/or was engaged with such media sources requires more than proximity. For example, knowledge of an audience member's location of 5-feet from a media source (e.g., television) at one moment in time indicates exposure. However, such an audience member detected 5-feet from the media source for several moments in time (e.g., over a span of 30 minutes) indicates that the audience member may be consuming (e.g., engaged-with, paying attention to, etc.) the media presentation. Accordingly, location determination allows valuable audience member data to be collected so that media exposure and/or consumption behavior may be determined. In addition, the methods and apparatus described herein may be used to determine if audience members are complying with Multipurpose Personal Portable Meters (MPPMs) carrying/wearing requirements or MPPM usage requirements.

The example methods and apparatus described herein may also be used to manage communication procedures among the various MPPMs carried by the audience members. Such communication procedures, described in further detail below, prevent and/or minimize communication conflicts between MPPMs and other devices of the audience measurement system. Additionally, the methods and apparatus described herein may be used to determine the location and/or proximity of the various MPPMs carried by the audience members. As described in further detail below, location and/or proximity information may allow the MPPMs to more efficiently utilize on-board systems such that battery life is maximized.

In particular, the example methods and apparatus described herein may be implemented using, for example, MPPMs worn or carried by audience members and location information systems (e.g., a global positioning system (GPS), RF towers/transceivers for triangulation, etc.), and may be used to collect audience member movement information and/or media exposure information and to analyze such movement and/or exposure information. Additionally, the movement and/or exposure information may be detected relative to media sources (e.g., a set-top box, television, stereo, etc.) and used to determine the behavior of an audience member to determine if the audience member is sufficiently consuming media presentations. In this manner, media presentations (e.g., audio, video, still images, Internet information, computer information, etc.) may be given appropriate media consumption credit.

Additionally, the example methods and apparatus described herein include a monitoring system that includes, but is not limited to, portable units to acquire media and/or audience member information. The portable units of the monitoring system operate in conjunction with various base units that are located in various rooms of a household. Portable units may be feature rich and/or scaled down tags, as discussed in further detail below. Both the feature rich portable units and tags are capable of determining a distance of one or more audience members and the media delivery devices (e.g., televisions, home entertainment centers, stereos, etc.). The portable units, tags, and base units of the monitoring system also may operate in a mesh network to provide communicative functionality even when one of the devices is not within communicative proximity to a base unit, as discussed in further detail below. The monitoring system also determines communication bandwidth capabilities of the household, and may further adjust audio data processing accordingly to allow more efficient data transfers. In particular, for situations in which acquired household data resolution is lower than the resolution of reference broadcast programming data, the monitoring system includes various hash matching processes for broadcast programming identification.

Monitoring System

Turning to FIG. 1, for purposes of clarity the example methods and apparatus are described herein with respect to an example geographic area 100 including indoor and outdoor regions that are associated with a household 102. However, the example methods and apparatus described herein may be used in any area or environment.

Information about an audience member's behavior may be determined/estimated using location information and/or motion information. Location information may include, for example, geographic, global, or position coordinates that, when analyzed, may be used to determine the movements of a person or an audience member from one location to another. Location information may also include distances between an audience member and a media source, such as, for example, a home entertainment center, television, and/or a set-top box (STB) that resides in a household 102. As described in greater detail below, location information may be collected, obtained, generated, etc. using any suitable location detection devices, location detection systems, and/or location detection techniques. Specifically, the location detection devices described below may be worn or otherwise carried by a person or audience member and/or part of the MPPM.

Media monitoring information may include any information associated with media that is consumed (e.g., viewed, listened to, interacted with, etc.) by an audience member. Media presentations may include, for example, television programming, radio programming, movies, songs, advertisements, Internet information, and/or any other video information, audio information, still image information, and computer information to which a person may be exposed via any media device (e.g., television, radio, Internet, in-store display(s), billboard(s), etc.). Media monitoring information may be generated based on, for example, audio codes, video codes, audio signatures, video signatures, radio frequency (RF) codes, and/or any other codes, signature information, or identifiers that may be extracted from or otherwise associated with a media presentation to which an audience member is exposed. As described in greater detail below, media monitoring information may be collected generated, obtained, etc. using any suitable media consumption detection device and/or any suitable media consumption detection technique.

The example geographic area 100, in which the example methods and apparatus of the present disclosure may operate, includes the example household 102, which may contain multiple rooms and/or floors. The example geographic area 100 of FIG. 1 also includes an example MPPM 104 worn by an audience member 106. Additional example MPPMs 104A, 104B, 104C, and 104D (collectively referred to as "MPPMs 104") are shown in FIG. 1 at various locations of the example geographic area 100 based on where the audience member is located. Such example MPPMs may operate both inside and outside the example household 102, and employ various communication techniques and communication systems including, but not limited to, RF transceiver towers 108 and satellites 110. The example household 102 also includes a plurality of media delivery centers 112A, 112B, and 112C (collectively referred to as "media delivery centers 112"), each of which may include one or more media delivery devices such as, for example, a television, a radio, etc. as well as a media playback device such as, for example, a DVD player, a VCR, a video game console, etc. Of course, a media delivery center 112 may only include a single media delivery device.

The example household 102 may also include one or more location information systems such as, for example, a plurality of base units 114A, 114B, 114C. The base units 114A, 114B, 114C (collectively referred to as "base units 114") may also receive the MPPMs 104 for battery charging and/or data transfer operations, as discussed in further detail below. Additionally, the base units 114 may include one or more location based technologies (e.g., global positioning systems, radio frequency, optical, ultra-sonic, IR, Bluetooth®, etc.), some of which are described below and may be configured to work cooperatively with the MPPMs 104 to substantially continuously generate location information associated with the location of the example MPPM 104D as the audience member 106 moves among various areas within, around, and/or outside the household 102. The base units 114 are configured primarily as stationary devices disposed on or near the media delivery centers 112 and adapted to perform one or more of a variety of well known media (e.g., television, radio, Internet, etc.) metering methods. Depending on the types of metering that the base units 114 (also referred to as a "set meter") are adapted to perform, the base units 114 may be physically coupled to the media delivery centers 112 or may instead be configured to capture signals emitted externally by the media delivery centers 112 such that direct physical coupling to the media delivery centers 112 is not required. Typically, a base unit 114 is provided for each media delivery center disposed in the household 102, such that the base units 114 may be adapted to capture data regarding all in-home viewing by the audience members 106.

Information collected by the base units 114 and/or the MPPMs 104 may be provided to a home processing system 116. The home processing system 116 may be communicatively coupled to one or more docking stations (not shown) configured to receive the MPPMs 104 and communicatively couple the MPPMs 104 to the home processing system 116. In such an arrangement, audience members 106 may periodically (e.g., nightly) place the MPPMs 104 in the docking stations to enable the home processing system 116 or base units 114 to obtain collected media monitoring information, location information, motion information, and/or any other information stored on the MPPMs 104. Such information transfer may, additionally or alternatively, occur between the home processing system 116 and various MPPMs 104 via wireless and/or hardwired communications directly, and/or via one or more base units 114. Additionally, the docking stations also charge a battery of each the MPPMs 104 while the MPPMs 104 are docked thereto. Alternatively, the base units 114 may operate as the home processing system 116 to collect information from other base units 114 and/or MPPMs 104 of the example household 102.

To transfer data from the household 102, the home processing system 116 (or a base unit 114) is further communicatively coupled to a central facility 118 via a network 120. The network 120 may be implemented using any suitable communication interface including, for example, a telephone system, a cable system, a satellite system, a cellular communication system, AC power lines, a network, the Internet, etc. The central facility 118 is remotely located from the household 102 and is communicatively coupled to the household 102 and other monitored sites (e.g., other households) via the network 120. The central facility 118 may obtain media exposure data, consumption data, media monitoring data, location information, motion information, and/or any other monitoring data that is collected by various media monitoring devices such as, for example, the MPPMs 104. The central facility 118 may also record broadcast media at a relatively high (e.g., detailed) data rate to assist audio signature matching (e.g., audio, video, etc.) between various household monitored data and signatures monitored by the central facility 118. As discussed in further detail below, the central facility 118 may record broadcast media audio along with a timestamp. Monitored data that is received by various households may also contain audio signatures with a corresponding timestamp, which allow the central facility 118 to compare the timestamps and audio signatures to determine particular broadcast media monitored by the various households.

In an example implementation, the central facility 118 includes a server 122 (i.e., a central processor system) and a database 124. The database 124 may be implemented using any suitable memory and/or data storage apparatus and techniques. The server 122 may be implemented using, for example, a processor system similar or identical to the example processor system 812 depicted in FIG. 8 that is configured to store information collected from the MPPMs 104 and/or base units 114 in the database 124 and to analyze the information. In addition, the server 122 may be configured to generate calibration information for the MPPMs 104 based on audio information or audio samples collected during an acoustic characterization process or calibration process performed within the household 102.

The central facility 118 may also include rule modules 126 to configure monitoring equipment (e.g., MPPMs 104, base units 114, home processing systems 116) in conformance with regional parameters expected by the audience members. For example, monitoring systems in various geographic regions may include audience members 106 that speak different languages. As such, a rule module 126 that is employed to reflect regional preferences may propagate such preferences from the central facility 118 to each piece of monitoring equipment (e.g., MPPMs 104, base units 114, home processing systems 116, etc.). Because each piece of monitoring equipment may include visual and/or audio prompts to communicate to the audience member, the regionally specific rule module 126 prompts the monitoring equipment to apply the appropriate language. The rule modules 126 may also dictate parameters such as, but not limited to, currency nomenclature, language dialects/accents, and data sample rates. For example, if certain geographic regions are less likely to include high-speed networks and/or internet services, the rule module 126 for that particular region may instruct all corresponding monitoring equipment to reduce the sample rate during data acquisition by the various metering devices (e.g., MPPMs 104, base units 114).

As shown in FIG. 1, the household 102 may also include an example compliance status device 128 that may be configured to obtain compliance status from the MPPM of each audience member in the household 102 and display the compliance status or provide an indication of compliance performance to the central facility 118. The compliance status device 128 includes a display that may be implemented using, for example, a plurality of LEDs and/or a display screen (e.g., CRT, LCD, etc.). Each of the LEDs may correspond to one of the audience members. Each LED may be configured to, for example, glow red when the corresponding audience member is non-compliant and glow green when the corresponding audience member is compliant. Each MPPM may be configured to wirelessly transmit compliance status information directly to the compliance status device 128 and/or each MPPM may be configured to transmit compliance status information to a central collection facility (e.g., the central facility 118 described above), which may then communicate the compliance status information to the compliance status device 128. The compliance status device 128 may also be communicatively coupled to a home processing system (e.g., the home processing system 116 and/or base unit 114 described above). The compliance status systems disclosed in U.S. Application Ser. No. 60/613,646 may also be used to determine compliance of audience members.

Although only one compliance status device 128 is shown in FIG. 1, a plurality of compliance status devices may be located throughout the household 102. For example, each of the plurality of compliance status devices may be located in a respective room of the household 102. Each compliance status device may be configured to indicate via, for example, LEDs, when an audience member is in the room corresponding to that compliance status device. An example interface for an example implementation of the compliance status device 128 is illustrated in greater detail in FIG. 22. Additionally or alternatively, the compliance status device 128 may be a digital picture frame. Typically, a digital picture frame displays a random or ordered sequence of digital photos that an audience member places on the digital picture frame memory. Additionally, the digital picture frame may be communicatively connected to a network of the household 102 (e.g., wired, wirelessly, network hub, router, etc.) and display digital pictures from an audience member's personal computer. Such networked digital picture frame may also be communicatively connected to the home processing system 116 and/or the base units 114 to receive gentle reminder statements to urge or encourage compliance. For example, the home processing system 116 may send a gentle reminder command to the compliance status device 128 that causes a message to be displayed, such as "Please obtain your Portable Unit."

The home processing system 116 and/or the base units 114 may monitor for trends exhibited by audience members 106 carrying the MPPMs 104. In particular, the home processing system 116 and/or the base units 114 may log location information of the MPPMs 104 and identify a trend that, for example, every workday at 6:50 AM the audience member 106 removes the MPPM 104 from its docking station and leaves the household 102. In response to this observed trend, the home processing system 116 and/or base units 114 may automatically prompt the compliance status device 128 (e.g., the digital picture frame) to display a message at 6:51 AM if the MPPM 104 is still in its docking station, thereby indicating that the audience member 106 may have forgotten it. For example, the digital picture frame may display a message at 6:51 AM that reads, "You have forgotten your Portable Unit! Please obtain it before leaving the house."

Portable Units

Location information and motion information may be continuously collected in indoor environments and/or outdoor environments via, for example, the example MPPMs 104 that may be carried or worn by an audience member 106 as shown in FIG. 1. The example MPPM 104, discussed in further detail in FIG. 2A, may be implemented as a standalone device having a pager-like design and/or integrated or jointly configured with a mobile telephone (e.g., a cordless telephone or a cellular-type telephone).

Figure 2A:
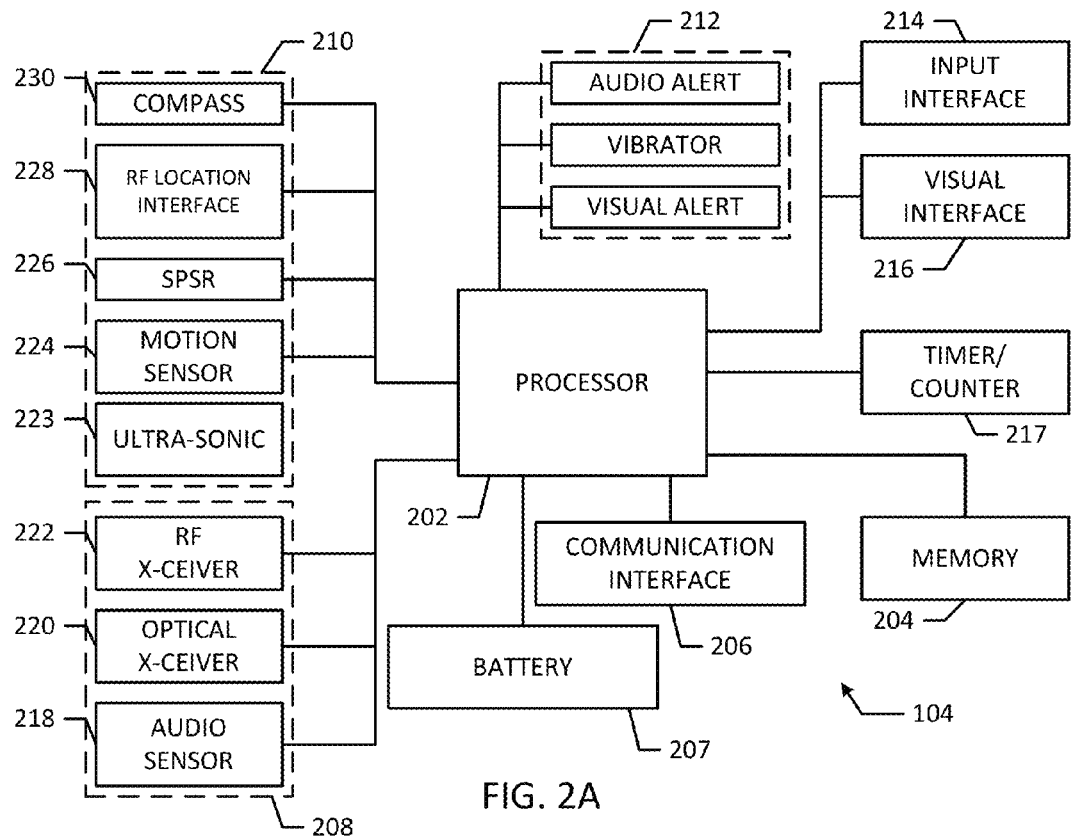
FIG. 2A is a block diagram of an example Multipurpose Personal Portable Metering device of FIG. 1.

FIG. 2A is a block diagram of the example MPPM 104 of FIG. 1. As described above, the MPPM 104 may be used to monitor the media consumption activities of an audience member (e.g., the audience member 106 of FIG. 1) in addition to location information and motion information associated with those media consumption activities. In general, the MPPM 104 includes electronic components configured to detect and collect media monitoring information, location information, and motion information and communicates the information to the home processing system 116 and/or the central facility 118 (FIG. 1) for subsequent analyses. As shown in FIG. 2A, the MPPM 104 includes a processor 202, a memory 204, a communication interface 206, a battery 207, a plurality of media monitoring information sensors 208, a plurality of location and motion sensors 210, a plurality of audience alerts 212, an input interface 214, a visual interface 216, a timer/counter 217, and a comparator 234, all of which are communicatively coupled as shown.

The processor 202 may be any processor suitable for controlling the MPPM 104 and managing or processing monitoring data related to detected media consumption or presentation information, location information, and/or motion information. For example, the processor 202 may be implemented using a general purpose processor, a digital signal processor, or any combination thereof. The processor 202 may be configured to perform and control various operations and features of the MPPM 104 such as, for example, setting the MPPM 104 in different operating modes, controlling a sampling frequency for collecting media monitoring information, compressing collected tuning information, location information, and motion information, managing communication operations with other processor systems (e.g., the base units 114, the home processing system 116, the server 122 of FIG. 1), selecting location information systems (e.g., the RF transceiver tower 108, the satellite 110, and the base units 114), etc.

The memory 204 may be used to store collected media monitoring information, program instructions (e.g., software, firmware, etc.), program data (e.g., location information, motion information, etc.), region specific data from the rule modules 126, and/or any other data or information required to operate the MPPM 104. For example, after acquiring location information (discussed in further detail below), motion information, and/or media monitoring information, the processor 202 may time stamp the acquired information and store the time-stamped information in the memory 204. The memory 204 may be implemented using any suitable volatile and/or non-volatile memory including a random access memory (RAM), a read-only memory (ROM), a flash memory device, a hard drive, an optical storage medium, etc. In addition, the memory 204 may be any removable or non-removable storage medium.

The communication interface 206 may be used to communicate information between the MPPM 104 and other processor systems including, for example, the base units 114 (and/or charging/docking stations 114), the home processing system 116, and/or the server 122 of FIG. 1. The communication interface 206 may be implemented using any type of suitable wired or wireless transmitter, receiver, or transceiver such as, for example, a Bluetooth® transceiver, an 802.11 (i.e., Wi-Fi®) transceiver, a cellular communications transceiver, an optical communications transceiver, a network port, a universal serial bus (USB) port, etc. Communication between the MPPM 104 and the charging docking station 114 may occur when the MPPM 104 is docked in the charging station 114, for example, just before the audience member goes to sleep each night. Additionally, the base unit/charging station 114 and the MPPM 104 may communicate via a wireless interface, which may be particularly helpful if the audience member forgets to place the MPPM 104 on the charging station each night to charge the battery 207 and/or transfer measurement data. Without limitation, the base units 114 may operate as docking/charging stations 114, a communication hub for the household 102, and/or a data aggregator for other devices of the household 102 (e.g., MPPMs, TAGs, base units, docking stations, etc.). Such devices may be designated as a hub by virtue of an application programming interface (API) executed on a processor of the base unit 114, charging station 114, or home processing system 116. As discussed in further detail below, the docking stations/base units 114 are typically powered via a household electrical outlet, which may provide communication to the other base units/docking stations 114 within the household 102 via any present and/or future powerline communication line protocols.

The media monitoring information sensors 208 include an audio sensor 218, and optical transceiver 220, and an RF transceiver 222. The example MPPM 104, via the audio sensor 218, the optical sensor 220, and/or the RF transceiver 222, observes the environment in which the audience member 106 is located and monitors for media presentation and/or signals associated with media presentations. When media presentations are detected, the example MPPM 104 logs or stores a representation of the media content (e.g., a sample of detected portions of the content, a signature, a code, a replica, etc.) in the memory 204 and/or identifies the content, along with the time at which the content is detected.

The audio transducer 218 may be, for example, a condenser microphone, a piezoelectric microphone or any other suitable transducer capable of converting audio information into electrical information. The optical transceiver 220 may be, for example, a transmitter and receiver combination including a light sensitive diode, an IR sensor, a complimentary metal oxide semiconductor (CMOS) sensor array, a charge-coupled diode (CCD) sensor array, a light emitting diode (LED), etc. The RF transceiver 222 may be, for example, a Bluetooth® transceiver, an 802.11 transceiver, an ultrawideband RF receiver, and/or any other RF receiver and/or transceiver. While the example MPPM 104 of FIG. 1 includes the audio sensor 218, the optical transceiver 220, and the RF transceiver 222, the example MPPM 104 need not include all of the sensors 218, 220, and 222 and/or may include other sensors. For example, the audio sensor 218 is sufficient to identify audio/video or program content via program characteristics, such as audio signatures or, if they are present, audio codes. Additionally, the optical transceiver 220 is sufficient to identify program content via program characteristics, such as video signatures or, if present, video codes. However, because video monitoring generally requires a line of sight between the MPPM 104 and the media delivery device, one particularly advantageous example includes the audio sensor 218 and the optical transceiver 220 to enable audio and/or video monitoring (e.g., code and/or signature collecting).

The location and/or motion sensors 210 are configured to detect location-related information and/or motion-related information and to generate corresponding signals that are communicated to the processor 202. More specifically, the location and/or motion sensors 210 may include an ultrasonic transceiver 223, a motion sensor 224, a satellite positioning system (SPS) receiver 226, an RF location interface 228, and/or a compass 230. Additionally, the audio sensor 218 may be configured to receive ultrasonic signals from an ultrasonic source, such as an ultrasonic transmitter on a base unit 114, other portable units 104, and/or the home processing system 116.

Some of the location and/or motion sensors 210 may be configured to receive location-related information (e.g., encoded information, pluralities of fragmented information, etc.) and/or to perform processing (either alone or in cooperation with the processor 202) to convert the received information to location information that indicates the location at which the MPPM 104 is located. For example, location information may be derived using triangulation techniques, whereby the MPPM 104 may receive RF signals from three or more RF transmitters (e.g., three or more of the base units 114 of FIG. 1). In this case, a single RF signal from any one RF transmitter may be useless for generating location information. However, the location information may be generated by triangulating or processing a combination of RF signals from a plurality of RF transmitters. Thus, some of the location and/or motion sensors 210 may be configured to process received location-related signals to generate location information and others of the location and/or motion sensors 210 may be configured to process the received location-related signals in combination with software executed on the processor 202 to generate location information. Additionally or alternatively, the location and/or motion sensors 210 may not process data, but instead may communicate any received information to the processor 202 for processing.

The ultrasonic transceiver 223 may be used to allow the MPPM 104 and/or base units 114 to determine location information of the MPPM 104. As discussed in further detail below, the ultrasonic transceiver 223 works in combination with the RF location interface 228, RF transceiver 222, and/or optical transceiver 220 to determine a distance between the MPPM 104 and a particular base unit 114 and/or home processing system 116. For example, the MPPM 104B ("MPPM B") of FIG. 1 may transmit an ultrasonic chirp and RF signal simultaneously. Because the ultrasonic chirp propagates to the base unit 114 at the speed of sound, and the simultaneous RF chirp reaches the same base unit 114, for all practical purposes, immediately, the distance between the MPPM 104B and the base unit 114 may be calculated based on the time difference at which the chirps are detected, as described in further detail below.

The motion sensor 224 may be used to detect relatively small body movements of an audience member (e.g., the audience member 106), generate motion information related to the body movements, and/or to communicate the motion information to the processor 202. The motion sensor 224 may be implemented using any suitable motion detection device such as, for example, a mercury switch, a trembler, a piezo-gyroscope integrated circuit (IC), an accelerometer IC, etc.

The SPS receiver (SPSR) 226 may be implemented using, for example, a GPS receiver and may be configured to generate location information based on encoded GPS signals received from GPS satellites. In general, the SPS receiver 226 may be used by the MPPM 104 to collect location information in outdoor environments.

The RF location interface 228 may be implemented using a receiver or a transceiver and may be used to receive location-related signals or information from location information systems such as, for example, the RF transceiver tower 108 and/or the base units 114. The RF location interface 228 may also be configured to broadcast location-related information such as, for example, time-stamped MPPM identification codes. The time-stamped MPPM identification codes may be received by, for example, three or more of the base units 114, which may process the codes cooperatively using triangulation techniques to determine the location of the MPPM 104. The base units 114 may communicate to the home processing system 121 the received time-stamped MPPM identification codes along with information relating to the time at which the codes were received by each of the base units 114. The home processing system 121 may then determine the location of the MPPM 104 based on this information.

The RF location interface 228 may be implemented using any suitable RF communication device such as, for example, a cellular communication transceiver, a Bluetooth® transceiver, an 802.11 transceiver, an ultrawideband RF transceiver, etc. In addition, the RF location interface 228 may be implemented using only an RF receiver or only an RF transmitter. Examples of known location-based technologies that may be implemented in cooperation with the RF location interface 228 include a Ekahau Positioning Engine™ by Ekahau, Inc. of Saratoga, Calif. and an ultrawideband positioning system by Ubisense, Ltd. of Cambridge, United Kingdom.

The Bluetooth® transceiver, whether implemented as part of the RF location interface 228, the RF transceiver 222, and/or the communication interface 206 may monitor the household 102 for Bluetooth® activity. For example, many wireless telephones and/or portable media players employ Bluetooth technology to enable wireless listening devices, such as speakers, headphones, and/or earpieces. The Bluetooth® transceiver may detect when such devices are being used, and thus determine whether an audience member 106 is consuming media, or whether the audience member 106 is merely proximate to the media source. For example, if the audience member 106 has a television turned on in Room A (of FIG. 1) during a 30-minute broadcast of a prime-time television show, a typical audience measurement system may credit the audience member with viewing the show based on mere proximity to the television. However, if the user was talking on the telephone during the duration of the television show, then awarding credit to the audience member 106 may not be appropriate. The Bluetooth® transceiver within the MPPM 104 and/or within a base unit 114 may detect such wireless phone earpiece activity, and deny credit to a user for viewing the television show.

The compass 230 may be implemented using a magnetic field sensor, an electronic compass integrated circuit (IC), and/or any other suitable electronic circuit. In general, the compass 230 may be used to generate direction information, which may be useful in determining the direction in which an audience member (e.g., the audience member 106) is facing. The direction information may be used to determine if a person is facing a television to enable consumption of a television program. The direction information may also be used to determine if a person is facing, for example, a billboard advertisement so that when the MPPM 104 receives an RF identification signal corresponding to the billboard advertisement and location information indicating that the audience member 106 is in front of the billboard, the direction information from the compass 230 may be used to determine if the audience member 106 is facing the billboard. In this manner, the billboard content may be credited appropriately for being consumed by a person.

The plurality of audience alerts 212 may be used to capture the attention of audience members (e.g., the audience member 106 of FIG. 1) to, for example, provide information to audience members and/or request input. Depending on a mode in which the example MPPM 104 is operating, the audience member 106 may be prompted via one or more of the audience alerts 212 to indicate via the input interface 214 whether the audience member is consuming the detected media presentation or is merely in the vicinity of the detected media presentation. Additionally, the audience member 106 may be prompted to express approval or disapproval of a media presentation, or may submit his or her approval or disapproval without being prompted. The entry of any input information (whether positive or negative) can also be used to credit a program with active consumption assuming that there is a positive correlation between opinion formulation and consumption (e.g., assuming people tend to formulate opinions on information that has actually been consumed and are less likely to formulate opinions on information to which they have merely been exposed).

The MPPM 104 may also include the input interface 214, which may be used by an operator (e.g., the audience member 106) to input information to the MPPM 104. For example, the input interface 214 may include one or more buttons or a touchscreen that may be used to enter information, set operational modes, turn the MPPM 104 on and off, etc. In addition, the input interface 214 may be used to enter MPPM settings information, audience member identification information, etc.

The MPPM 104 may further include the visual interface 216, which may be used, for example, in combination with the input interface 214 to enter and retrieve information from the MPPM 104. For example, the visual interface 216 may be implemented using a liquid crystal display (LCD) that, for example, displays detailed status information, location information, configuration information, calibration information, etc. In some cases, the visual interface 216 may include light-emitting diodes (LEDs) that convey information including, for example, status information, operational mode information, etc.

The timer/counter 217 may be used to generate timer events that are communicated to the processor 202. Timer events may be used to, for example, wake-up the MPPM 104 from a shut-down state, powered-down state, a power-saving mode state, etc. The timer/counter 217 may be configured to generate a timing event after a particular amount of time has elapsed or at a particular time of day. The amount of time or time of day may be set by, for example, configuring registers in the timer/counter 217.

The comparator 234 may be used to compare information. For example, the MPPM 104 may use the comparator to compare a locally stored identifier associated with the MPPM 104 with a received identifier communicated by a base unit 114 to determine if the base unit 114 is attempting to communicate with the MPPM 104. The MPPM 104 may also use the comparator 234 to compare any other information (e.g., time information, battery charge information, identification information, etc.). In some cases, the MPPM 104 may compare information to determine subsequent operations that the MPPM 104 should perform. For example, the MPPM 104 may use the comparator 234 to compare time or counter information from the timer/counter 217 to threshold values (e.g., minimum threshold values (zero) or maximum threshold values) to determine whether to perform, for example, wake up operations (e.g., wake up subsystems of the MPPM 104) or operations associated with placing subsystems of the MPPM 104 in a sleep mode.

Figure 2B:
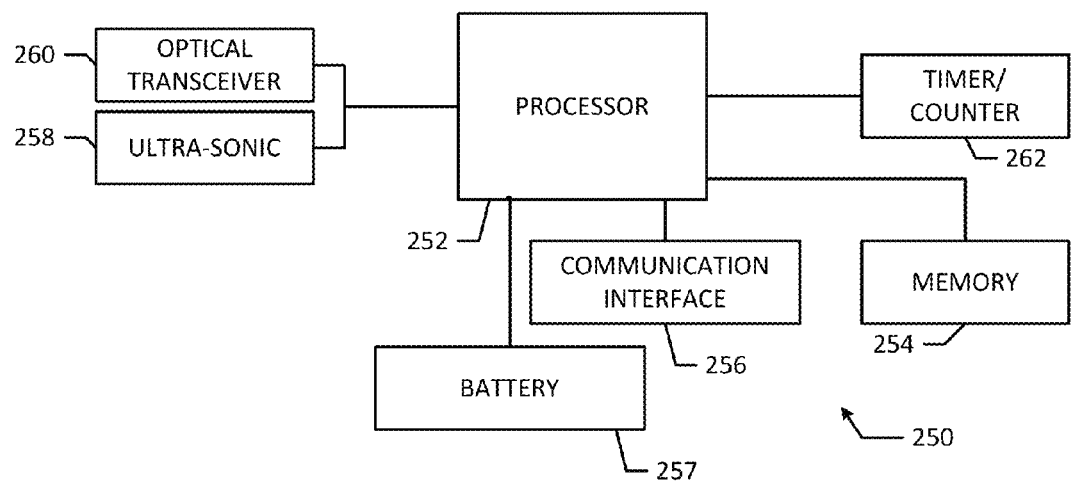
FIG. 2B is a block diagram of an example tag device of FIG. 1.
Figure 2C:
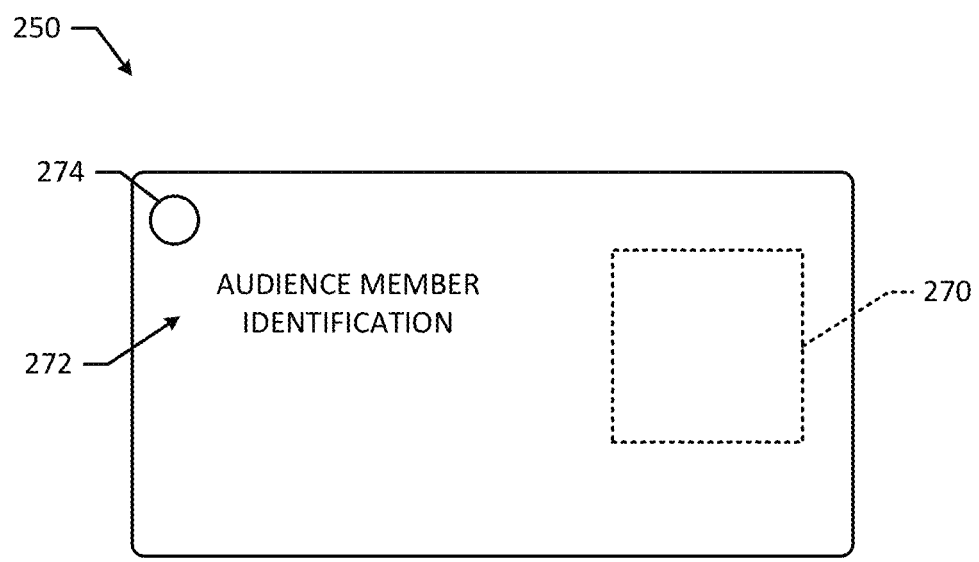
FIG. 2C illustrates the example tag of FIG. 2B in a wearable format.

Although the example methods and apparatus are described herein relative to the example MPPM 104, location information and motion information may also be continuously collected based on identification tags or metering tags (e.g., the example identification tag 250 of FIGS. 2B and 2C). For example, an identification tag 250 may be worn or carried by an audience member (e.g., the audience member 106) and used in combination with or instead of the example MPPM 104. For example, the identification tag 250 may be used to detect the location of the audience member 106 by configuring a location information system (e.g., the base units 114 of FIGS. 1 and 3) to measure the proximity of the identification tag 250 to the location information system, the presence of the identification tag 250 within a room of the household 102, or the location (e.g., the location coordinates) of the identification tag 250 within a room or the household 102. When the identification tag 250 is used in combination with the example MPPM 104, the MPPM 104 may collect media monitoring information while the location information system collects location or proximity information based on the identification tag 250. Identification tags 250 may be used instead of the example MPPM 104 for battery conservation purposes. Typically, identification tags 250 contain fewer communicative features, location sensors, and/or motion sensors. As such, the identification tags 250 may operate for much longer periods of time and rely more heavily on the base units 114 for media logging.

As compared to the example MPPM 104 described above in view of FIG. 2A, which includes a plurality of sensors, transducers, alerts, and/or displays, the example tag 250 of FIG. 2B includes a fewer number of on-board components and systems. FIG. 2B is a block diagram of an example tag 250 that may be used instead of, or in addition to the example MPPM 104 of FIG. 2A. While the MPPM 104 of FIG. 2A includes many peripheral devices and features, the MPPM 104 of FIG. 2A also consumes more power than the example tag 250 of FIG. 2B. The example tag 250 illustrates a trade-off between media monitoring functions performed by the base units 114 (and/or home processing system 116) and battery longevity of the portable metering device used. In general, the tag 250 of FIG. 2B includes some of the same and/or similar components as the MPPM 104 of FIG. 2A, including a processor 252, a memory 254, a communication interface 256, a battery 257, an ultrasonic transceiver 258, an optical transceiver 260, a radio frequency (RF) transceiver 262, a timer/counter 264, and a comparator 266 all of which are communicatively coupled as shown. The various transceivers, as understood by persons of ordinary skill in the art, include both a transmitter portion and a receiver portion. For example, the optical transceiver 260 may include a photodiode (light emitting diode, LED) for infra-red (IR) transmission and a photodetector for IR reception.

In some implementations, the MPPM 104 may acquire media monitoring information at a data rate suitable for various aspects of the household 102 and/or geographic region. Many urban localities include an infrastructure of high speed internet access such as, for example, cable modems, digital subscriber line (DSL) modems, and/or wireless fidelity (WiFi) networks. Such high speed networking opportunities reduce bandwidth concerns for transmitting and/or receiving media monitoring information to/from the central facility 118. Generally, the data (sample) rate of streams captured by MPPMs 104 and/or base units 114 is 0.128 seconds per sample. Persons of ordinary skill in the art will appreciate that other sample rates may be selected based on factors such as the memory size of the MPPM and/or base unit 114 and/or a bit length of the captured media information. Naturally, samples captured with a binary string length of 24-bits will demand less bandwidth than 32-bit samples taken at the same sample rate. On the other hand, rural households without access to a high speed internet infrastructure may rely on telephone modems to send and receive media monitoring information to/from the central facility 118. As such, the sample rate of the MPPMs 104 and/or base units 114 may decrease accordingly to minimize transmission bandwidth and time that the telephone modem is on-line. The home processing system 116 and/or base units 114 may detect and/or otherwise be aware of communicative limitations and adjust sample rates accordingly. Similarly, the rule modules 126 may also be aware of geographical areas in which sample rates should be lower and, in response to these communicative limitations, automatically configure household 102 devices to acquire media at a lower data rate.

Adjusting sample rates in an example household 102 may be implemented at various layers of functionality. For example, upon detection of a relatively low bandwidth home, the MPPMs 104 may be adjusted to reduce the rate of data capture in an effort to reduce the volume of information eventually transmitted to the central facility 118. Additionally or alternatively, the base units/chargers 114, upon receipt of the collected data from the MPPMs 104, may apply data reduction technique and/or apply various compression algorithms to the data prior to transmission to the central facility 118. Application of data reduction techniques and/or compression techniques within the example household 102 further help to minimize excessive bandwidth burdens on in-home networks.

While the MPPMs 104 may be full-featured devices that, among other things, acquire audio data, compress the data, encrypt the data, compute the data to various signature formats, and/or compress the audio data into a lossless format, the MPPMs 104 may also scale-back their processing capabilities based on bandwidth parameters and/or battery longevity management. The MPPM 104 may be configured as a datalogger to perform simple audio collection and compression (e.g., 32 kbps MP3, ADPCM, GSM, etc.) prior to data transfer to a base unit/charger 114. The base unit/charger 114 may, upon receipt of the data from the MPPMs 104, complete the signature generation process, thereby relieving the MPPMs 104 of processing burdens, battery consumption burdens, and/or bandwidth burdens of the in-home network. Additionally, if alternate signature algorithms are designed and uploaded to an example household 102 from the central office 118, such updated signature algorithms do not need to be uploaded to every device within the household 102. Instead, a single device, such as a base unit 114, a charging station 114, or a home processing system 116 may store current and/or updated signature algorithms. As discussed in further detail below, such layered data reduction and processing distribution has, at least, a two-fold benefit of improved MPPM 104 battery life, and reducing storage requirements of the MPPMs 104 and/or other base units/charging stations 114 in the household 102.

The media monitoring information collected by the MPPMs 104, base units 114, and/or home processing systems 116 may be processed by the central facility 118 in real time or at a later time. As discussed earlier, the central facility 118 may monitor and record broadcast information, such as codes (e.g., audio codes), signals (e.g., audio or video signals), signatures (e.g., a representation of an audio, video, or another source signal) from radio and/or television programs. Because the central facility 118 includes abundant memory resources (e.g., database 124) and high speed communication capabilities (e.g., high speed internet connections, T1 trunk lines, etc.), the data acquisition rate may be much higher than that of the MPPMs 104. For example, the central facility 118 typically acquires signatures/samples at a rate four times faster than that of the MPPMs 104, e.g., 1 sample every 0.032 seconds. Such audio data is stored in one more or databases 124 and represents reference data that may be compared to media data acquired by the MPPMs so that broadcast content may be identified. Various matching algorithms, discussed in further detail below, seek to find the closest match between media data acquired by household 102 devices and reference data acquired by the central facility 118.

Ideal conditions result in a data sample acquired by the MPPM 104, for example, exactly matching a data sample acquired by the central facility 118. Furthermore, both samples ideally have an associated timestamp that is also identical. However, sample integrity from the MPPMs 104 is typically degraded by noise (e.g., environmental conditions) and/or sample bit length reductions to accommodate for bandwidth limitations. Furthermore, time stamps are generally offset due to the clocks within various household 102 hardware (e.g., MPPMs 104, base units 114, home processing system 116) not being synchronized and/or drifting. For example, MPPMs 104 that are not recharged prior to low battery voltage levels may experience an inability to maintain accurate clock time, thereby resulting in time differences between the MPPM 104 clock and the clock of the central facility 118. Therefore, a Hamming distance (i.e., the number of bits that differ between two binary strings) of zero is preferred, but an unlikely reality. As discussed in further detail below, a hash matching algorithm allows an approximation to optimal matching algorithms while allowing an efficient tradeoff between accuracy and matching speed.

As shown in FIG. 1, the household 102 and the audience member 106 wearing the MPPM 104 are located within the example geographic area 100. As described below, the MPPM 104 may be used to collect location information, motion information, and/or media monitoring information within the household 102, outside of the household 102 (e.g., stores, shopping malls, restaurants, etc.), within structures other than the household 102, outdoors, etc.

The MPPM 104 may be configured to substantially continuously generate, obtain, and/or collect media monitoring information, location information, and/or motion information. As described in greater detail below in connection with FIG. 2A, the MPPM 104 may include one or more media detection devices used to detect presented media and to generate or collect media monitoring information or media-related data based on, for example, audio signals, video signals, RF signals, infrared (IR) signals, ultrasonic (US) signals, etc. In addition, the MPPM 104 may include one or more location or positioning devices that enable the MPPM 104 to collect location or position information from one or more location information systems and/or to send location information to one or more location information systems. The example geographic area 100 includes one or more location information systems that may be used to communicate location information to/from the MPPM 104.

The location information collected by the MPPMs 104 also allow more efficient audience member data processing than may occur on a media monitoring side (MMS), such as at the central office 118. Samples (e.g., video samples, audio samples, etc.) collected by the MPPM 104 are typically compared to reference broadcast data to identify which broadcast program (e.g., television program, movie, song, etc.) was consumed. Because each geographic locality may have a diverse broadcast programming schedule, the MMS may need to search a large database prior to finding a match. However, as discussed above, the MPPMs 104 include an SPS receiver 226 that determines geographic locality information so that searches by the MMS may be focused on particular geographic subsets of the database, thereby improving identification efficiency and reducing search time. For example, if the audience member is from Chicago and takes the MPPM 104 on a business trip to San Diego, broadcast programming consumed by the Chicago native while visiting San Diego may be properly identified as occurring in San Diego due to the SPS location information. As such, the Chicago native may be credited for media consumption behavior while on the business trip.

The location information systems may be implemented using, for example, one or more radio frequency (RF) transceiver towers represented in FIG. 1 by the RF transceiver tower 108 and/or one or more satellites represented in FIG. 1 by a satellite 110. In addition, the interior environment of the household 102 or other monitored location 102 may include one or more location information systems described below.

The MPPM 104 may collect media monitoring information (e.g., codes, signatures, etc.) associated with any media (e.g., video, audio, movies, music, still pictures, advertising, etc.) to which the audience member 106 is exposed. For example, the MPPM 104 may be configured to obtain audio codes, generate or collect signatures, etc. that may be used to identify video programs (e.g., DVD movies, television programming, etc.), audio programs (e.g., CD audio, radio programming, etc.), etc. Using one or more media detection devices described below in connection with FIG. 2A, the MPPM 104 may collect media monitoring information associated with media presented or delivered by one or more of the media delivery centers 112 and to which the audience member 106 may be exposed.

Additionally, the MPPM 104 may be configured to receive audio codes and/or RF codes associated with other forms of media such as, for example, billboards (not shown) or any other form of publicly viewable advertising or media. For example, each billboard may include an audio broadcasting device and/or an RF broadcasting device configured to emit a billboard code that uniquely identifies that billboard. If the MPPM 104 is proximate to a billboard, the MPPM 104 may obtain the billboard code as media monitoring information, thereby indicating that the audience member 106 was exposed to the billboard. In addition, the MPPM 104 may be configured to obtain direction information via, for example, an electronic compass, and log the direction in which the audience member 106 was facing or traveling so that subsequent data analyses may determine if the audience member 106 was likely facing the billboard and, thus, exposed to the billboard's content.

The RF transceiver tower 108 may be used in combination with any RF communication technology such as, for example, a cellular or mobile communication technology (e.g., GSM, CDMA, TDMA, AMPS, etc.) In some example configurations, the RF transceiver tower 108 may be configured to transmit or broadcast position information and/or any type of signal that may be used by the MPPM 104 to generate location information. For example, the RF transceiver tower 108 may transmit information having geographic location information and time codes. More specifically, the RF transceiver tower 108 may be associated with a particular or unique set of geographic location coordinates (i.e., geographic location information), that define or indicate the location of the RF transceiver tower 108 within a global positioning grid. The time codes may be associated with a time at which a particular signal is transmitted by the RF transceiver tower 108.

The geographic location information and the time codes received from a plurality of RF transceiver towers may be used by the MPPM 104 to perform one or more triangulation processes to determine the location(s) of the MPPM 104. Triangulation processes are well known in the art and, thus, are not described further herein. Although the RF transceiver tower 108 is depicted as being located in an outdoor environment, the MPPM 104 may include location technologies that communicate with the RF transceiver tower 108 when the MPPM 104 is located within indoor environments (e.g., within the household 102) or outdoor environments.

The satellite 110 may also be used to communicate location information to/from the MPPM 104. For example, the satellite 110 may be used to implement any satellite positioning system (SPS) such as, for example, the global positioning system (GPS) that continuously broadcasts position-related information. In this manner, the MPPM 104 may receive the position-related information from the satellite 110 to determine movement information associated with the location(s) of the MPPM 104.

Unlike the feature-rich MPPM 104 of FIG. 2A, the memory of the example tag 250 of FIG. 2B typically stores a minimal amount of information such as, for example, a unique tag identification number that corresponds with one of the audience members. Similarly, the communication interface 256 may be used to communicate information to the tag 250, such as uploading a unique identification number to the memory 254, setting the timer/counter 264 with a date and time, and/or synchronizing the timer/counter 264 with other devices of the example household 102 and/or the central facility 118. Moreover, due to the relatively reduced power demands for the tag 250 as compared to the MPPM 104 of FIG. 2A, the battery 257 of FIG. 2B, and overall form-factor of the tag 250, may be much smaller.

FIG. 2C illustrates an example identification tag 250 implemented in the shape of a credit card or key chain. The example tag 250 of FIG. 2C includes an electronic system-on-chip (SOC) 270 and audience member identification indicia 272. As shown in FIG. 2B, the electronic SOC 270 may include a memory 254, RF circuitry, infra-red (IR) circuitry 260, ultrasonic (US) circuitry 258, radio frequency (RF) circuitry 262, comparator 266, and, in some implementations, a processor 252. The memory 254 may be used to store audience member identification information and the RF circuitry, IR circuitry 260, and/or US circuitry 258 may be used to transmit the audience member identification information from the memory 254 to one or more of the base units 114. The electronic SOC 270 may be configured to be powered via RF emissions transmitted by, for example, the base units 114.

The identification information 272 may be printed, engraved, or otherwise put on a surface of the identification tag 250. The identification information 272 may be the name of an audience member or an identification number corresponding to the audience member. The identification information 272 may be the same information that is stored in the memory of the electronic SOC 270.

Each audience member of a household (e.g., the household 102 of FIG. 1) may be instructed to wear or carry an identification tag that is substantially similar or identical to the identification tag 250. In some implementations, an audience member may be instructed to clip an identification tag to each of their most frequently carried or worn belongings. For example, a plurality of identical (e.g., all having the same audience member identification information printed thereon and/or stored in the electronic SOC 270) identification tags may be issued to each audience member. Each audience member may then clip or store each identification tag in, for example, a purse, a jacket, shoes, a belt, a wallet, a key chain, etc. The identification tag 250 may include a key chain hole 274 that may be used to attach the identification tag 250 to a set of keys. Clipping, attaching, or storing an identification tag in each of an audience member's most frequently used belongings ensures that the audience member will always carry or wear an identification tag. Additionally or alternatively, the identification tag 250 may be small and integrated as a pendant, bracelet, and/or any other type of jewelry. Incorporating the tag 250 as a piece of jewelry further promotes audience member 106 compliance and ensures that the audience member will more frequently wear the tag 250.

The example MPPM 104 may include one or more location detection devices and/or motion detection devices as described above in connection with FIG. 2A that the MPPM 104 may use to monitor the audience member 106 and/or determine MPPM 104 location information. The location detection devices and/or motion detection devices may be configured to enable the example MPPM 104 to collect audience member location information and/or motion information in indoor environments and/or outdoor environments. In this manner, when an audience member moves among indoor areas and outdoor areas a substantially continuous location/motion history may be tracked or logged for each audience member and subsequently analyzed to develop movement information.

Base Unit

Figure 3:
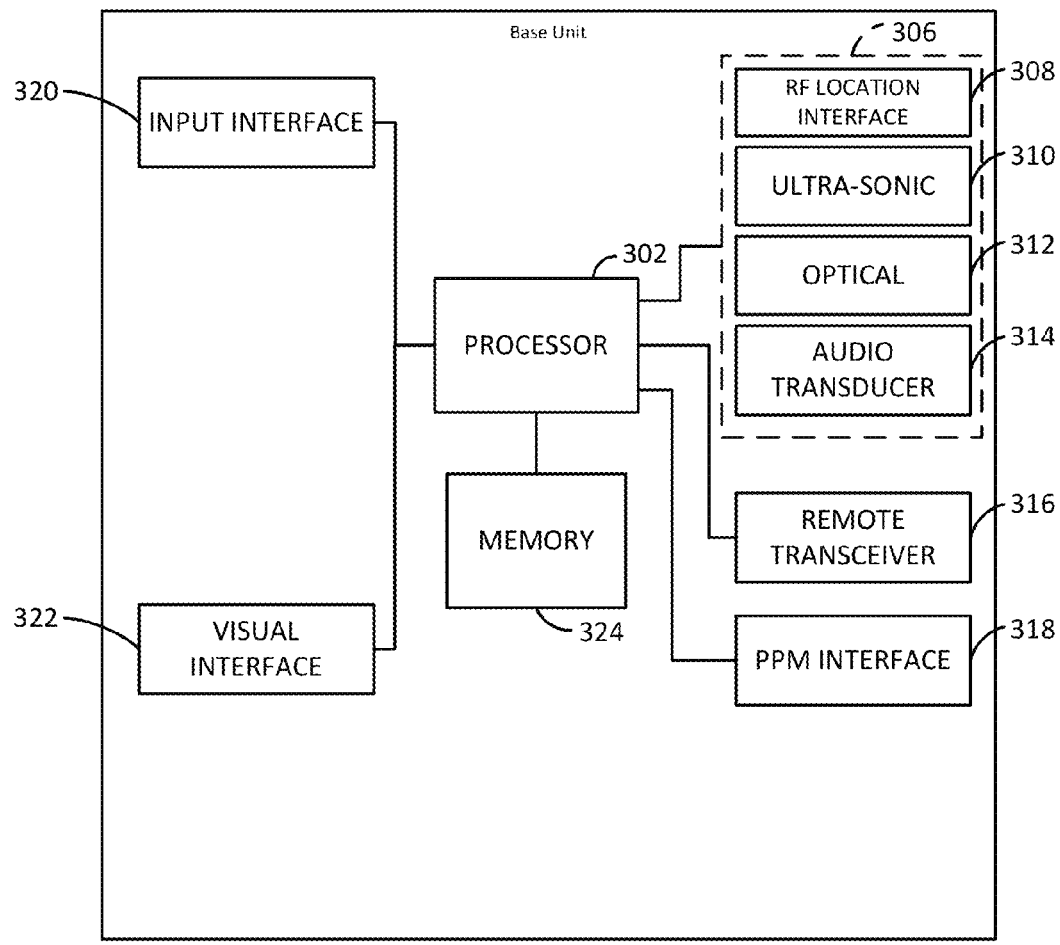
FIG. 3 is a block diagram of an example base unit for use in the system of FIG. 1.

FIG. 3 is a block diagram of one of the example base units 114 of FIG. 1. As described above, the example base units 114 may be used to communicate information to the MPPM 104, the home processing system 116, and/or the central facility 118 of FIG. 1. As shown in FIG. 3, the example base unit 114 includes a processor 302, a memory 304, and a plurality of sensors and/or transducers 306. Such sensors and/or transducers 306 include an RF location transceiver 308, an ultrasonic transceiver 310, an optical sensor and/or transmitter (e.g., transceiver) 312, and an audio transducer 314. The example base unit 114 also includes a remote transceiver 316 that receives the monitoring data collected by the base unit 114 and/or received by a MPPM 104 and sends it to, for example, the home processing system 116 (FIG. 1) and/or the central facility 118 (FIG. 1). The example base unit 114 of FIG. 1 also includes a MPPM interface 318, an input interface 320, a visual interface 322, and a memory 324, all of which may be communicatively coupled to the processor 302 as shown.

The processor 302 may be used to control and/or perform various operations or features of the base unit 114 and may be implemented using any suitable processor, including any general purpose processor, digital signal processor (DSP), or any combination thereof. For example, the processor 302 may be configured to receive location information, motion information, and/or media monitoring information from the MPPM 104. Information collected (by either the MPPM 104 and/or the base unit 114) may be stored in the memory 324 and communicated to the home processing system 116 and/or directly to the central facility 118.

The processor 302 may also be configured to control communication processes that occur between the base unit 114 and other processing systems (e.g., the MPPM 104, the home processing system 116, and the server 122). For example, the processor 302 may provide location-related information to MPPMs via the RF location transceiver 308. In addition, the processor 302 may control the reception of media monitoring information, location information, motion information, etc. from the MPPM 104 via the MPPM interface 318 and store the information in the memory 324. The processor 302 may then cause the remote transceiver 316 to communicate the monitoring data to, for example, the home processing system 116 (FIG. 1) and/or the central facility 118 (FIG. 1). Additionally, the processor 302 and/or the memory of the base unit 114 may be programmed to carry out the process of FIGS. 4C, 5D, 6, 8-12, 16-18, and/or 20 below.

The memory 324 is substantially similar or identical to the memory 204 (FIG. 2A) and may be used to store program instructions (e.g., software, firmware, etc.), data (e.g., location information, motion information, media monitoring information, etc.), and/or any other data or information.

The RF location interface 308 may be implemented using a transmitter, a receiver, or a transceiver and configured to transmit and/or receive location-related information and may be configured to communicate with the RF location interface 228 (FIG. 2A) of the MPPM 104. For example, the RF location interface 308 may transmit location-related codes to the MPPM 104, which may receive encoded location-related codes from various base units to determine location coordinates indicative of the location of the MPPM 104. Additionally or alternatively, the RF location interface 308 may receive location-related codes from the MPPM 104 and, as described above, may work in cooperation with other base units and/or the home processing system 116 to determine the location of the MPPM 104. Where multiple MPPMs are present, each MPPM is assigned a unique code to enable the base structures to distinguish MPPMs when detecting locations.

The RF location interface 308 may be implemented using any suitable RF communication device such as, for example, a cellular communication transceiver, a Bluetooth® transceiver, an 802.11 transceiver, an ultrawideband RF transceiver, etc. In addition, the RF location interface 308 may be used in combination with any of the known location-based technologies described above (e.g., the Ekahau Positioning Engine™ by Ekahau, Inc. and the ultrawideband positioning system by Ubisense, Ltd.). Thus, the RF location interface 308 may be configured to receive and/or transmit any form of location-related information including location coordinates and/or any other information associated with known location-based technologies.

The MPPM interface 318 is substantially similar or identical to the communication interface 206 of FIG. 2A and may be configured to communicate information between the base unit 114 and one or more MPPMs (e.g., the MPPM 104 of FIGS. 1 and 2A). The MPPM interface 318 may be any wired or wireless transceiver such as, for example, a Bluetooth® transceiver, an 802.11 transceiver, an Ethernet transceiver, a universal asynchronous receiver-transmitter (UART), a cellular communication transceiver, etc.

The input interface 320 and the visual interface 322 of the base unit 114 may be substantially similar or identical to the input interface 214 and the visual interface 216, respectively, of FIG. 2A.

The remote transceiver 316 may be used to communicate information between the base unit 114 and, for example, the home processing system 116 (FIG. 1) and/or the central facility 118 (FIG. 1). The remote transceiver 316 may be communicatively coupled to the network 120 and may be implemented using any suitable wired or wireless communication transceiver including, for example, a telephone modem, a DSL modem, a cable modem, a cellular communication circuit, an Ethernet communication circuit, an 802.11 communication circuit, a powerline modem, etc. The remote transceiver 316 may be used to communicate media monitoring information (e.g., audio samples, codes, and/or signatures), location information, and/or motion information to the home processing system 116 and/or the central facility 118 via the network 120.

MPPM Location Determination

Figure 4A:
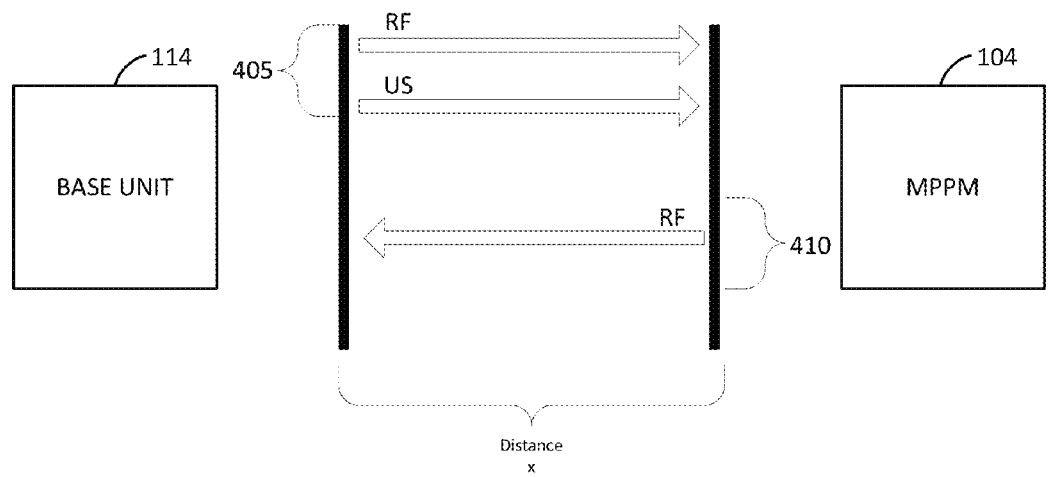
FIG. 4A illustrates an example communication process between the example Multipurpose Personal Portable Metering device of FIGS. 1 and 2A, and base unit of FIG. 1.

An example communication between the base unit 114 and the MPPMs 104 for determining the location of the MPPMs 104 is shown in FIG. 4A. The base unit 114 is separated by a distance "x" from the MPPM 104. The base unit 114 initiates a location determination process (distance determination) by emitting a chirp 405, which includes a simultaneous radio frequency (RF) chirp with an ultrasonic (US) chirp. For ease of illustration, the example of FIG. 4A employs an RF chirp, but the base unit may, without limitation, employ an IR chirp instead of the RF chirp. The base unit 114 may transmit the RF chirp with the RF location interface 308 and transmit the US chirp with the US transducer 310. The RF chirp transmitted by the base unit 114 may further include an embedded base unit 114 identifier. RF signals (electromagnetic radiation) propagate at 186,282 miles per second, whereas the speed of sound propagates at a substantially slower speed of 0.2057 miles per second. The RF chirp propagation time is, for all practical purposes, instantaneous because it travels at the speed of light, thus the MPPM 104 receives the RF chirp first and initiates a timer 217. Accordingly, the MPPM 104 is "armed" and waiting to detect the US chirp via the US transducer 223. Persons of ordinary skill in the art will appreciate that audio sampling rates of computers, PDAs, and other audio hardware typically exceeds 8000 samples per second. Such a sample rate yields a resolution of 0.125 milliseconds per sample, which is sufficient for purposes of audience member distance determination.

Upon receipt of the US chirp by the MPPM 104, the MPPM 104 stops the timer and calculates the distance between the base unit 114 and MPPM 104 as a function of the elapsed time and the known propagation rate of sound. If necessary, or if varying degrees of accuracy are desired, adjustments to the calculation may be implemented to accommodate for variations in air temperature, ambient pressure, and/or atmospheric density. Such calculations are stored in the memory 204 of the MPPM 104 and executed by the processor 202 to yield the distance "x." The calculated distance is then stored in the memory 204 for later communication to the base unit 114. The MPPM 104, after calculating and storing the distance between itself and the base unit 114, retrieves the distance measurement from the memory 204 and transmits it to the base unit 114 as an encoded RF and/or IR signal 410. In addition to the MPPM 104 transmitting the distance measurement results in the encoded RF and/or IR signal 410, the MPPM 104 may also embed an MPPM identifier so that the base unit 114 may identify which distance value is associated with which MPPM. Additionally or alternatively, the MPPM 104 may transfer the distance measurement results to the base unit 114 when the MPPM 104 connects to the charging/docking station 114 (e.g., at the end of the day). Such redundant information transfer may ensure that data from the MPPM 104 is not missed by, for example, bursts of RF and/or IR noise that may interfere with wireless data transmission. While both the MPPM 104 and the base unit 114 may each store the distance measurement results in their respective memories, the MPPM 104 may delete such calculation results from its memory 204 after the MPPM 104 docks with the charging station 114, typically at the end of the day. Similarly, the charging station/base unit 114 may delete such distance measurement results from memory 324 after such results are transferred to the central office 118, another base unit 114 configured as a household hub, and/or the home processing system 116.

The base unit 114 and MPPM 104 may, additionally or alternatively, repeat the distance determination process any number of times to verify an accurate measurement. For example, five iterations of the distance determination process may proceed in which the MPPM 104 calculates an average from the five samples. The average distance value is then transmitted to the base unit 114 via an encoded RF signal 410. Still further, the MPPM 104 may send the raw elapsed time data back to the base unit 114 rather than perform such calculations on the processor 202. The relay of raw data back to the base unit 114 rather than on-board calculation by the MPPM 104 may allow the MPPM 104 to consume less power for calculations and/or reduce the memory 204 size requirements.

Because a household 102 may include several MPPMs 104, each with distance determination capabilities as described above, the base unit 114 may perform the distance determination process in a MPPM-specific manner. For example, the base unit 114 may simultaneously send the RF and/or US chirp to the MPPM 104 with a MPPM identification code embedded in the RF and US signals 405. As such, only the MPPM 104 having the matching identity of the encoded RF chirp will arm to receive the US signal. Alternate MPPM(s) that do not have the matching identification code will ignore the RF chirp and will not initiate their timer(s) 217. Similarly, the encoded US chirp is decoded by the MPPM 104 having the matching identification code to cause the MPPM 104 to stop its timer 217 upon receipt. Accordingly, multiple MPPMs, such as MPPM A 104A, MPPM B 104B and MPPM C 104C may independently execute a distance determination process, even if such MPPMs are in RF and/or US proximity to each other.

While the illustrated example of FIG. 4A shows the base unit 114 transmitting a simultaneous chirp including a US chirp and an RF (or IR) chirp, the base unit 114 may, instead, transmit the RF or IR chirp without a corresponding US chirp. For example, the base unit 114 may transmit the RF chirp and initiate the timer 217. For all practical purposes, the transmitted RF chirp is immediately received by the MPPM 104, which may then transmit a US chirp in response to receiving the RF chirp. Accordingly, the base unit 114 stops its timer 217 in response to receiving the US chirp and calculates the distance "x" based on the elapsed time.

In the illustrated example of FIG. 4A, the base unit 114 includes four ultrasonic transceivers 310a, 310b, 310c, and 310d. Additionally, the example MPPM 104 includes four ultrasonic transceivers 223a, 223b, 223c, and 223d. Continuing with the immediate example above, in which the MPPM 104 transmits a US chirp in response to receiving an RF chirp from the base unit 114, the example ultrasonic transceivers 310a-d may determine direction information of the MPPM 104. For example, a US chirp transmitted by the MPPM 104 is first received by transceivers 310a and 310b, and at some time later the US chirp is received by transceivers 310c and 310d. The base unit 114 may then identify an orientation of the MPPM 104 based on the temporal delay of the US chirp between the transceivers 310a-d.

Similarly, if the base unit 114 transmits the US chirp, then the four US transceivers 223a-d will receive the chirp at different times based on the orientation of the transceivers 223a-d with respect to the transmitted US chirp. In the illustrated example of FIG. 4A, US transceivers 223a and 223b receive the US chirp transmitted by the base unit 114 at substantially the same time. Additionally, the US transceivers 223c and 223d will receive the US chirp at some time later than US transceivers 223a and 223b, thereby indicating a source direction of the transmitted US chirp.

Figure 4B:
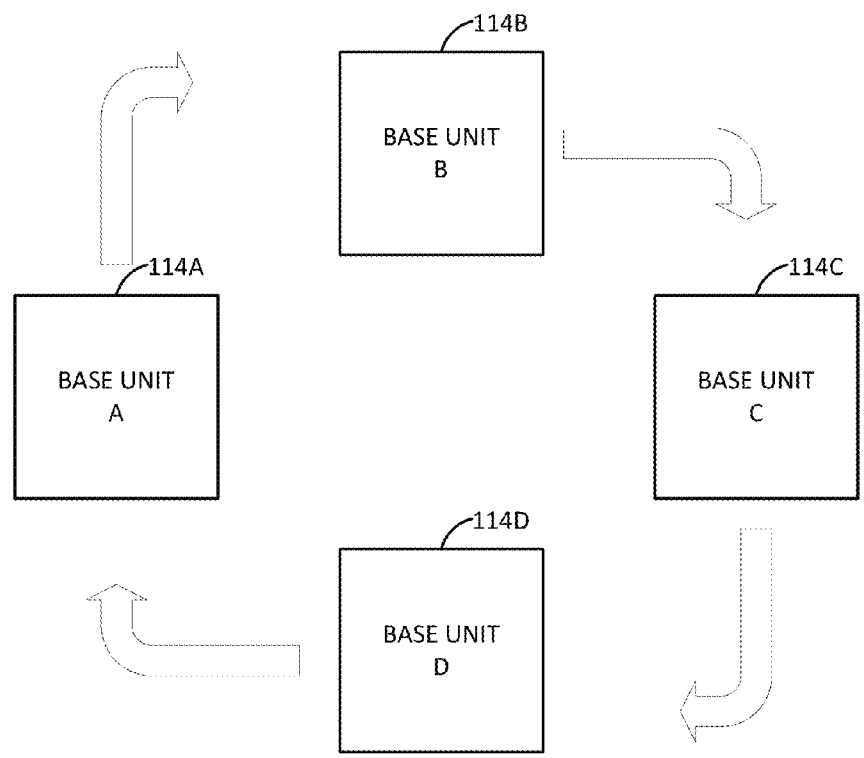
FIG. 4B illustrates an example communication process for use in the system of FIG. 1.

Additionally or alternatively, as shown in FIG. 4B, the various base units 114 of a household 102 may operate on a "round-robin" configuration to prevent communication interference between various metering devices within the household 102. In particular, if the base units 114 and MPPMs 104 do not implement the encoded RF and US chirps, as described above, then any base unit 114 that transmits an RF chirp may cause all of the MPPMs 104 to start their respective timers 217 because (unlike localized US signals) RF signals typically propagate through walls of a household 102 without significant attenuation. However, communication interference may be minimized or eliminated by ensuring that only one base unit 114 emits the simultaneous RF and US chirp at a time. In particular, FIG. 4B illustrates an example round-robin communication process for four example base units 114A, 114B, 114C, and 114D (collectively "114") that may reside in a household 102 or other monitored location (e.g., a store). Each of the base units has a dedicated amount of time during which it may send and/or receive data to/from the various MPPMs 104. During the dedicated amount of time, only one of the four base units may transmit (via the RF location interface 308, the ultrasonic transceiver 310, the optical transceiver 312, and/or the audio transducer 314) to the MPPMs 104. Such dedicated time-slots restrict communication between base units and MPPMs, but do not interrupt and/or interfere with any abilities of the other base units and/or other MPPMs performing metering operations, such as logging audio signals from the various media delivery centers 112.

For example, base unit A 114A begins a periodic loop by having exclusive permission to send and/or receive communication signals to the MPPMs 104. During the time-slot dedicated to base unit A 114A, none of base unit B, base unit C, or base unit D may send the simultaneous RF and US chirp for the purpose of distance determination. Upon the expiration of the time-slot for base unit A 114A, a time-slot for base unit B 114B permits exclusive permission to perform the aforementioned distance determination process without interference from other base units 114. In a similar manner, the round-robin loop proceeds to base unit C 114C and later to base unit D 114D before repeating the round-robin loop again beginning with base unit A 114A. Because all of the base units 114 are typically plugged into a powerline outlet and/or wired or wirelessly networked throughout the example household 102, such base units 114 are communicatively coupled to one another. Marshalling of the round-robin protocol may be accomplished by assigning one device, such as base unit A 114A, for example, as the primary device and all remaining devices as secondary. Alternatively, any other device that is communicatively connected to the base units 114 may operate as the primary to marshal the round-robin protocol, including, but not limited to, the home processing system 116. Persons of ordinary skill in the art will appreciate that a round-robin network sharing protocol may be administered in any number of ways and will not be discussed herein further.

Although the round-robin communication protocol described above minimizes the occurrence of communication conflicts between MPPMs 104 and base units 114, an RF chirp from any base unit may still penetrate through the walls of a household 102 and initiate the timer 217 of a respective MPPM 104. US propagation beyond the walls of a room, while still possible, is much less likely to occur. While an encoded RF chirp, as discussed above, would eliminate this issue, base units 114 that do not employ RF encoding may operate in a round-robin fashion that solves this issue by adding a time delay between communication time-slots for each base unit 114. In particular, each MPPM 104 may be configured to time-out after a predetermined amount of time has elapsed from the initial RF chirp if no corresponding US chirp is detected. For example, if the speed of sound for a particular household is assumed to be 1086 feet per second, then a MPPM 104 time-out of 0.027 seconds will allow rooms less than 30 feet to be measured. Time delays in excess of 0.027 seconds suggest that the US chirp may have propagated beyond the boundaries of the room, thus may be ignored.

Figure 4C:
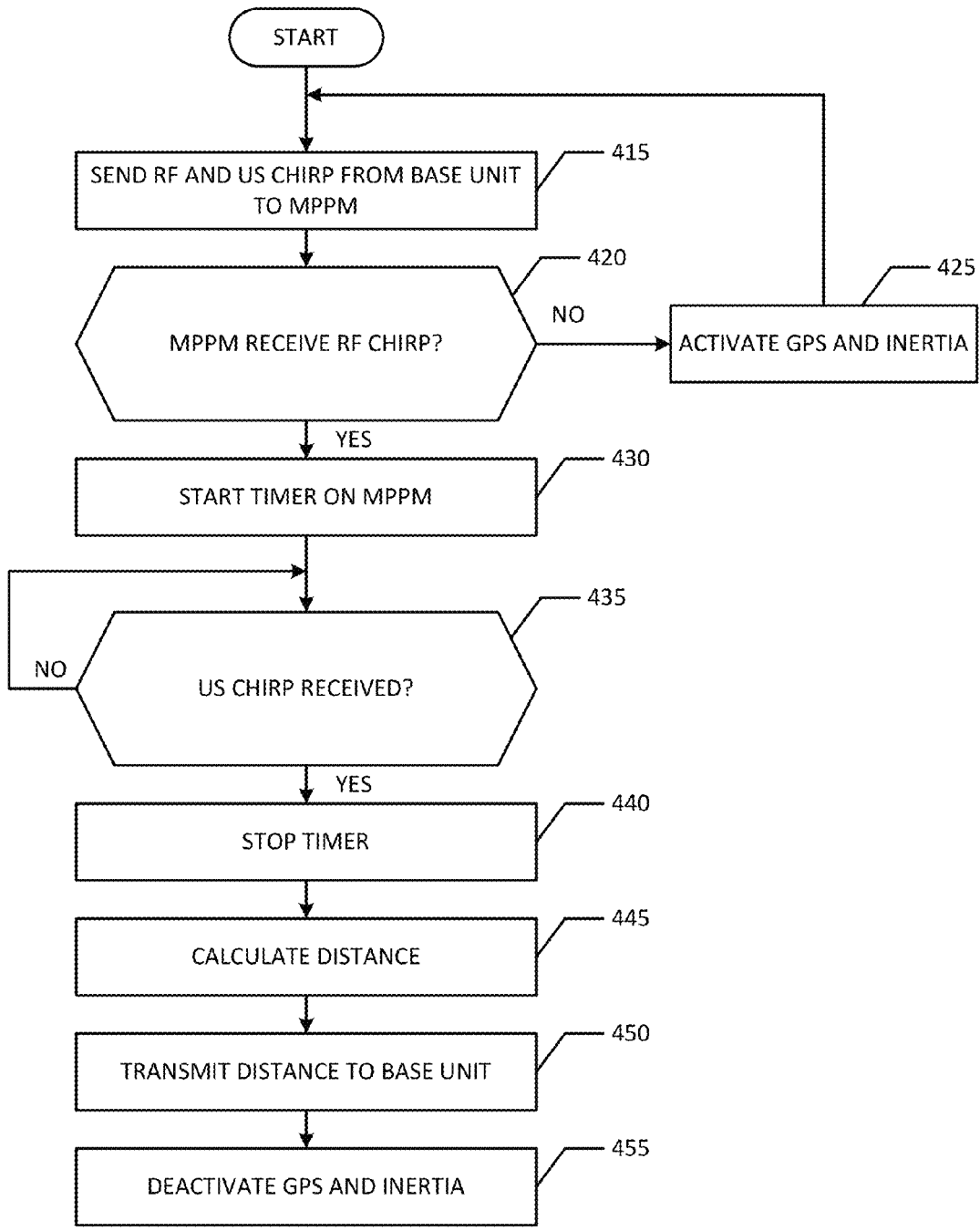
FIG. 4C illustrates a flow diagram of an example process to calculate distance between the example Multipurpose Personal Portable Metering device of FIGS. 1 and 2A and the base unit of FIGS. 1 and 3.

FIG. 4C is a flow diagram of an example method that may be used to calculate distance between the MPPM 104 and the base unit 114. As discussed above in view of FIGS. 4A and 4B, the base unit 114 and MPPM 104 determine distance by a combination of RF and US chirps (see 405 and 410 of FIG. 4A). The base unit 114 initiates a location determination process (distance determination) by emitting a chirp 405, which includes a simultaneous radio frequency (RF) chirp with an ultrasonic (US) chirp (block 415). If, after a predetermined time-out period, the base unit 114 fails to receive a responsive RF chirp back from the MPPM 104, the MPPM 104 is presumed to be out of range of the household 102 (block 420). As discussed below in view of FIG. 13, if the MPPM fails to receive an RF or US chirp from the base unit 114, then the MPPM 104 activates its GPS engine and inertial motion sensors (block 425). Because the base unit 114 is typically connected to a powerline outlet, power conservation issues are of little concern and the base unit 114 may attempt to locate a MPPM 104 continuously. The MPPM 104, on the other hand, does not continuously transmit an RF or US chirp so that battery power is conserved. Persons of ordinary skill in the art will appreciate that blocks 415, 420, and 425 may iterate at periodic intervals in a constant effort to search for MPPM 104 devices within range of the household 102. Each base unit 114 of the household 102 may emit a periodic chirp in a round-robin manner to prevent communication interference, as discussed above in view of FIG. 4B. The round-robin communication process permits each base unit 114 a dedicated amount of time in which communications between itself and the MPPM 104 may occur. Typically, the dedicated amount of time is sufficient for a distance calculation between a single pair of base unit 114 and MPPM 104.

On the other hand, if the MPPM 104 detects the RF chirp (block 420), the MPPM initiates a timer (block 430). Because the RF chirp propagation time is, for all practical purposes, instantaneous because it travels at the speed of light, the MPPM 104 receives the RF chirp first and initiates a timer 217 before the US chirp has an opportunity to reach the MPPM 104. As such, the MPPM 104 is effectively "armed" and waiting to detect the US chirp via the US transducer 223 (block 435). Persons of ordinary skill in the art will appreciate that, while the MPPM 104 may enter into a timing loop to wait for the US chirp to arrive, such an US chirp may never arrive due to a variety of factors. For example, RF signals typically propagate through walls of a household 102 with relative ease, but US signals typically require a significantly closer proximity. If the US chirp fails to arrive at the MPPM after a predetermined timeout period, the MPPM 104 may return to its previous operating state (e.g., monitoring audio data). However, upon receipt of the US chirp by the MPPM 104 (block 435), the MPPM 104 stops the timer (block 440) and calculates the distance between the base unit 114 and MPPM 104 as a function of the elapsed time and the known propagation rate of sound (block 445). If necessary, or if varying degrees of accuracy are desired, adjustments to the calculation may be implemented to accommodate for variations in air temperature, ambient pressure, and/or atmospheric density. Such calculations are stored in the memory 204 of the MPPM 104 and executed by the processor 202 to yield the distance "x." The calculated distance is then stored in the memory 204 for later communication to the base unit 114.

The MPPM 104, after calculating and storing the distance between itself and the base unit 114, retrieves the distance measurement from the memory 204 and transmits it to the base unit 114 as an encoded RF or IR signal 410 (block 450). As discussed in further detail below, the MPPM 104 deactivates its GPS and inertia sensors (block 455) because it is within range of the household 102, i.e., a known location that typically does not require GPS location techniques.

Tag Location Determination

Figure 5A:
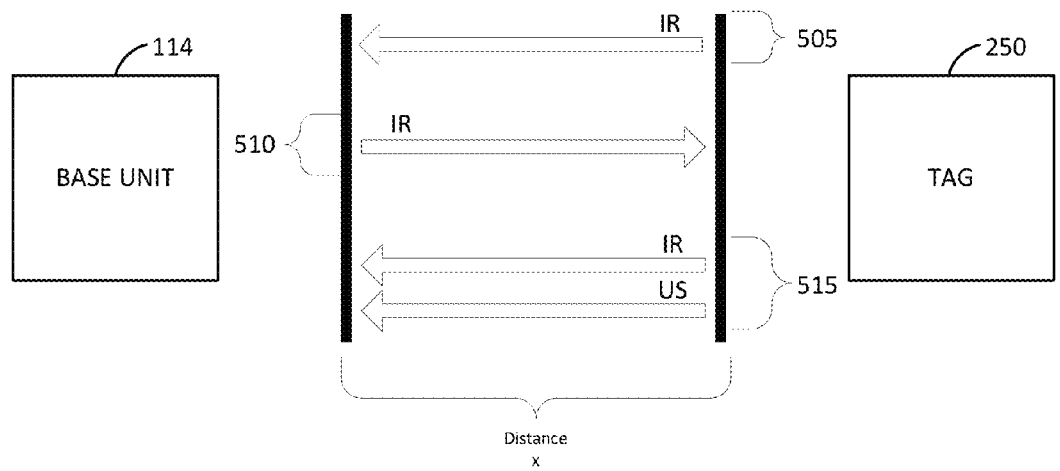
FIGS. 5A and 5B illustrate example communication processes between the example tag device of FIGS. 1 and 2B, and the example base unit of FIGS. 1 and 3.

Location determination may also be accomplished with the example tag 250. An example communication between the base unit 114 and the tag 250 of FIG. 2B for determining the location of the tag 250 is shown in FIG. 5A. As discussed above, the tag 250 of FIG. 2B may be used in addition to, or instead of the example MPPM 104 shown in FIG. 2A. Unlike the location determination process including an MPPM 104 and the base unit 114 discussed above, in the example communication of FIG. 5A the tag 250 of FIG. 2B initiates the location determination process (distance determination) by emitting an infra-red (IR) pulse 505 to the base unit 114. For ease of illustration, FIGS. 5A and 5B employ IR signals, but persons having ordinary skill in the art will appreciate that the tag 250 and/or base unit 114 may, additionally or alternatively, employ RF signals. IR pulses may be emitted by the tag 250, with an embedded tag identification signal, on a periodic basis and consume very small amounts of power from the battery 257. If the base unit 114 is within a line-of-sight range of the tag 250 and receives the IR pulse 505 with the optical receiver portion of the optical transceiver 312, the base unit 114 returns an acknowledgement pulse 510 back to the tag 250 with the transmitter portion of the optical transceiver 312. The acknowledgement IR pulse signal 510 confirms to the tag 250 that it is within range to perform location determination. Accordingly, the tag 250 transmits an IR chirp and an US chirp 515 to the base unit 114 at substantially the same time. IR signals, much like the RF signals described above, propagate at the speed of light and, for practical purposes, can be considered instantaneous. The US chirp, on the other hand, propagates at a much slower speed so that the difference of the propagation times between the IR and US chirps may be used to calculate the distance "x" between the tag 250 and the base unit 114 in the manner described above.

The example tag distance determination process shown in FIG. 5A is particularly useful for audience measurement techniques when battery power needs to be conserved. Such power conservation may allow longer periods of time for audience measurement in between battery charging and accommodate the forgetful user that fails to place the tag 250 on a charging dock (e.g., a charging station/base unit 114 combination) on a regular basis (e.g., every night). The power of the tag 250 is conserved by issuing a burst of US energy (chirp) 515 only when a base unit 114 is within range. Additionally, battery 257 power is conserved by offloading distance calculations from the tag 250 to the base unit 114.

Figure 5B:
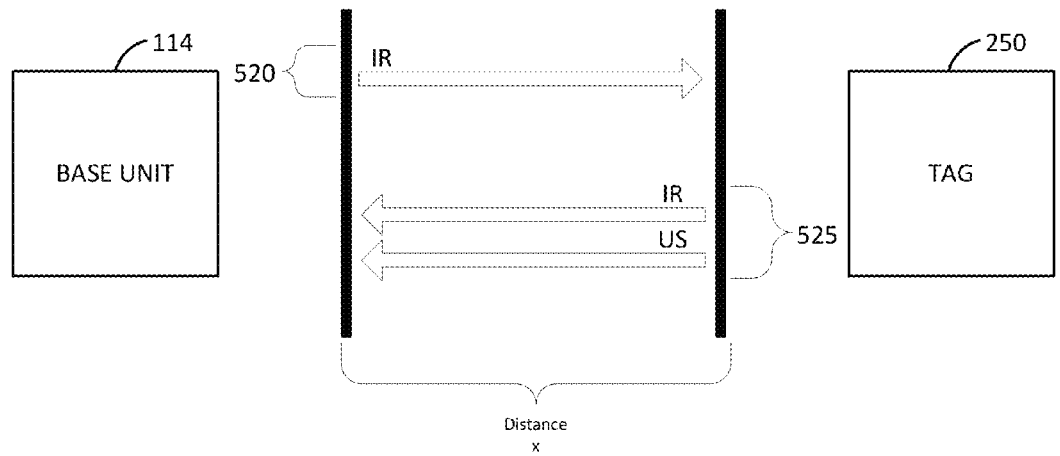

While FIG. 5A illustrates the tag 250 initiating an IR chirp 505, the base unit 114 may, alternatively, initiate the process of distance determination with the tag 250, as shown in FIG. 5B. For example, if the optical transceiver 228 includes a photodetector that consumes less energy than the periodically emitting IR LED transmitter described above in view of FIG. 5A, then the base unit 114 may periodically transmit the IR chirp instead of the tag 250, thereby optimizing the conservation of battery 257 power. This also conserves power at the tag because the tag 250 will not chirp IR pulses to see if a base unit is present, but instead will wait to receive an IR pulse from a base unit before transmitting a chirp. The base unit 114 of FIG. 5B initiates the distance determination process by sending an IR chirp 520 from its optical transceiver 312 that is received by the optical receiver portion of the optical transceiver 260 of the tag 250 if the tag 250 is present. In response to receiving the IR chirp 520, the tag 250 of the illustrated example responds by sending a simultaneous IR chirp and US chirp 525 to the base unit 114. Accordingly, the distance between the tag and the base unit 114 may be calculated by the base unit 114 in the same manner as described above, thereby minimizing processing and memory requirements of the tag 250.

Figure 5C:
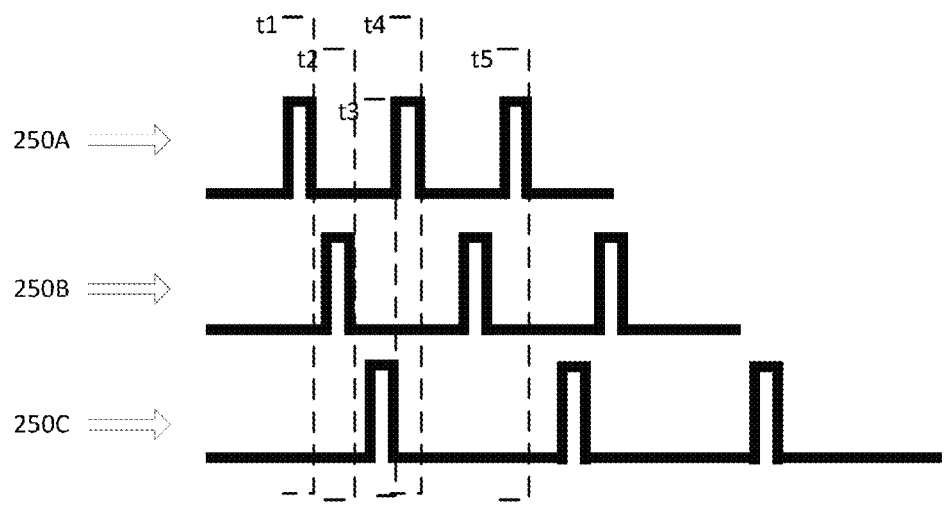
FIG. 5C illustrates an example timing diagram for use with the example tag device of FIGS. 1 and 2B.

Tags 250, much like any other device that attempts to communicate in an environment with other devices, may interfere with each other when attempting to communicate. As described above, communication conflicts may be minimized by using encoded (tag identification) signals, synchronizing devices to communicate at independent times from each other, and/or establishing a round-robin communication protocol. Such methods to prevent communication conflict may be particularly useful when battery power is not of great concern and/or when such devices are communicatively connected together on a network, either wired or wireless. Because the tags 250 are not typically part of a communication network and because the tags 250 of the illustrated example cannot afford to consume great amounts of battery 257 power by constantly transmitting and receiving synchronization signals from a network, the tags 250 of the illustrated example employ a variable transmission rate to minimize collision during communication attempts. FIG. 5C illustrates three example transmission rates 250A, 250B, and 250C, each of which is associated with a tag. The tag associated with transmission rate 250A performs communication functions once every, for example, 2.70 seconds. Furthermore, the tags associated with transmission rates 250B and 250C perform communication functions once every 2.82 and 2.94 seconds, respectively.

Such non-uniform transmission rates 250A, 250B, 250C permit communication attempts by the various tags at times in which no other tags are simultaneously attempting to communicate. For example, at time t1, only the tag associated with transmission rate 250A is attempting to communicate. Similarly, at time t2, only the tag associated with transmission rate 250B is attempting to communicate, and at time t3, only the tag associated with transmission rate 250C is attempting to communicate. While overlap of communication attempts is not completely prevented by this approach, as shown by example time t4 in which the tags associated with rates 250A and 250C overlap, such times of overlap are reduced because of the dissimilar transmission rates for each of the tags. In particular, while time t4 experienced an overlap, the tag associated with rate 250A experiences no overlap at the next period iteration of time t5.

Figure 5D:
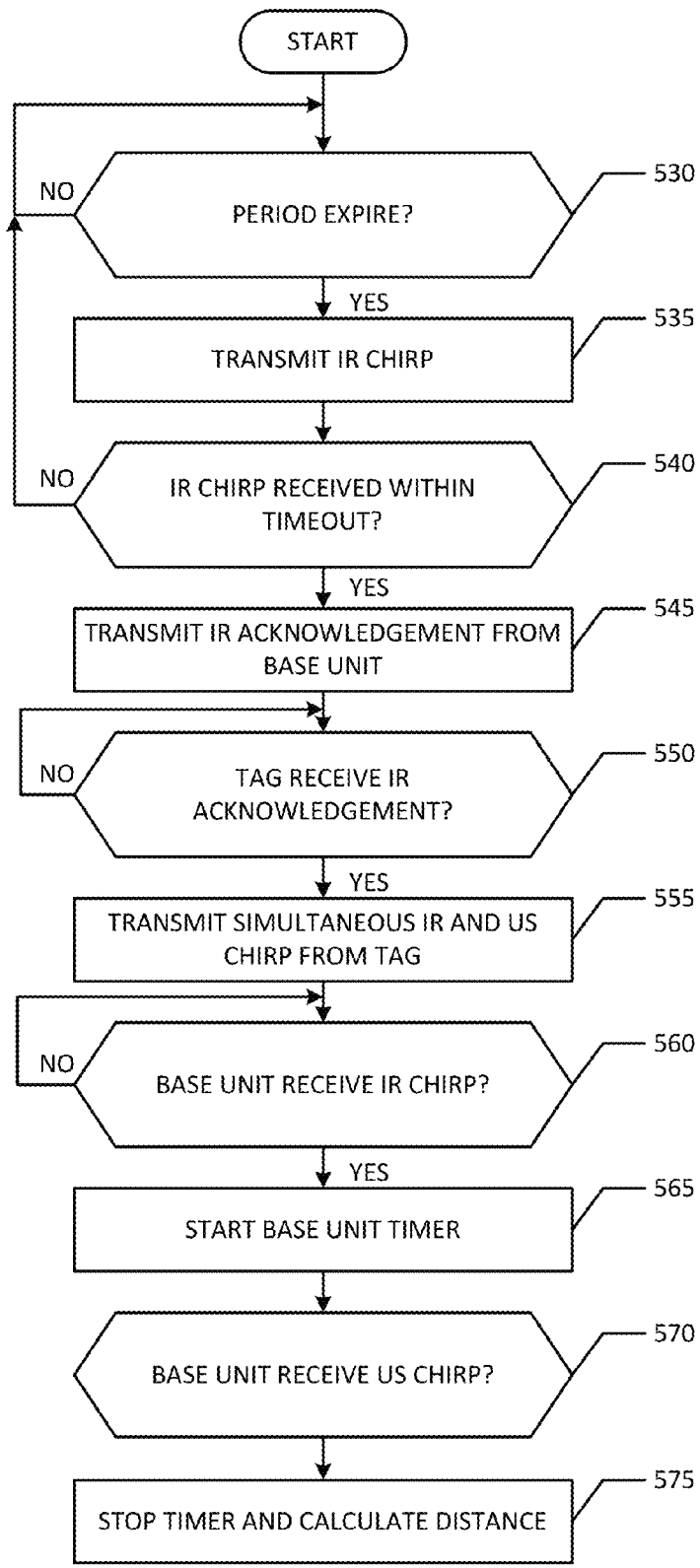
FIG. 5D illustrates a flow diagram of an example process to calculate distance between the example tag device of FIGS. 1 and 2B and the base unit of FIGS. 1 and 3.

FIG. 5D is a flow diagram of an example method that may be used to calculate distance between the tag 250 and the base unit 114. As discussed above in view of FIGS. 5A and 5B, the base unit 114 and tag 250 determine distance by a combination of IR and US chirps (see, for example, 505 and 515 of FIG. 5A). The tag 250 is programmed to emit an IR pulse at periodic intervals, as discussed above in view of FIG. 5C. Because each tag 250 of the example household 102 is programmed with a different transmission rate (e.g., one tag that transmits every 2.70 seconds, a second tag that transmits every 2.82 seconds, etc.) communication overlap is reduced.

When the transmission rate of the tag 250 repeats its periodic interval (block 530), the tag 250 initiates a location determination process by emitting an IR pulse 505 to the base unit 114 (block 535). Each IR pulse 505 emitted by the tag 250 consumes a very small amount of battery power, thereby allowing the tag 250 to operate away from a charging/docking station for long periods of time. The tag 250 waits a predetermined amount of time (timeout) for a response from the base unit 114 (block 540). If the base unit 114 is not within a line-of-sight range of the tag 250 (block 540), then the tag 250 waits for the next iteration of its transmission rate (block 530) before emitting another IR chirp in search for the base unit 114 (block 535). On the other hand, if the base unit 114 is within a line-of-sight range of the tag 250 (block 540) and receives the IR pulse 505 with the optical receiver portion of the optical transceiver 312, the base unit 114 returns an acknowledgement pulse 510 (block 545) back to the tag 250 with the transmitter portion of the optical transceiver 312. The acknowledgement IR pulse signal 510 confirms to the tag 250 that it is within range to perform location determination.

As a result of the base unit acknowledgement IR chirp (block 545) being received by the tag 250 (block 550), the tag 250 transmits a simultaneous IR chirp with an US chirp to the base unit 114 (block 555). IR signals, much like the RF signals described above, propagate at the speed of light and are, for present practical purposes, instantaneous. The US chirp, on the other hand, propagates at a much slower speed so that the difference of the propagation times between each chirp may be used to calculate the distance "x" between the tag 250 and the base unit 114. In particular, the base unit 114 waits to receive the IR chirp from the tag 250 (block 560) and starts its timer (e.g., a timer function of the processor 302) upon receipt of the IR chirp 515 from the tag 250 (block 565). While the base unit 114 waits for the US chirp (block 570), the timer value increases proportionally with the distance separating the base unit 114 from the tag 250 that emitted the US chirp 515. Upon receipt of the US chirp 515, the base unit stops the timer and uses the resulting time value to calculate distance (block 575).

Tag Status Information

In some example implementations, the tag 250 may be configured to communicate status information (e.g., battery level information, movement history information, etc) to a requesting base unit (e.g., the base unit 114 of FIG. 5B) in response to receiving a status request message from the base unit. The tag 250 may transmit its status information to the base unit 114 using infrared (IR) transmissions. Typically, to transmit data via an infrared transmitter, the tag 250 requires relatively more power than required to perform other operations (e.g., receive RF transmissions). Configuring the tag 250 to communicate its status information only when it is requested to do so by the base unit 114 enables putting most or all of the electrical subsystems of the tag 250 in a sleep mode (e.g., shutting down or disabling some or all of the electrical subsystems to consume relatively less or no electrical power) to conserve the stored energy (e.g., battery life) in a battery of the tag 250. Otherwise, if the tag 250 were configured to transmit its status information unconditionally (e.g., at predefined intervals) the battery charge of the tag 250 would more quickly decrease and many of the status information transmissions may be wasted if the tag 250 were not sufficiently close to a base unit for the base unit to detect the transmissions.

In some example implementations, to enable detecting status requests from base units while in a sleep mode, the tag 250 is provided with an RF transceiver configured to receive status requests from base units. During a sleep mode, some or all of the electrical subsystems of the tag 250 may be shut down. However, the tag 250 may keep the RF transceiver powered or at least partially powered (e.g., the antenna interface circuitry and receiver circuitry may be powered) to detect RF signals. In this manner, during sleep mode, the tag 250 can receive RF signals including status requests from base units and, in response, communicate its status information to a requesting base unit. In some example implementations, base units may be configured to include a tag ID of a particular tag from which status information is to be requested. In this manner, a base unit can specify a particular tag each time the base unit requests status information. In this case, when the tag 250 receives a status request from a base unit, the tag 250 can remain in a sleep mode if the tag 250 determines that its assigned tag ID does not match the tag ID in the received status request. If multiple tags are present in the same room or within the communication vicinity of the same base unit, all of the tags need not exit sleep mode or respond each time the base unit transmits a status request.

In some example implementations, the status information includes battery level information and movement history information. In other example implementations, the status information may additionally or alternatively include other information such as, for example, media identification information corresponding to media presentations to which the tag 250 was exposed, location information, room identification information, etc. The battery level information can include, for example, status bits indicative of the amount of energy or charge remaining in the battery of the tag 250. The movement history information can include bits corresponding to values or data indicative of whether and when the tag 250 was moved, which may be indicative of a person's activity while wearing or carrying the tag 250. The tag 250 may be configured to generate and/or collect movement information in any manner described herein each time the tag 250 is moved and to store the movement information for subsequent communication to a base unit. Additionally, the tag 250 may be configured to tag each movement information entry with a timestamp of when a corresponding movement occurred. In some example implementations, the movement history information can be configured to include only movement information that was generated since a last time the tag 250 communicated status information to the base unit 114 or any other base unit. For example, the tag 250 may be configured to clear movement information from a buffer or memory each time it communicates status information.

Regardless, of the devices used to implement the status information exchanges, the status information exchanges can be implemented using substantially the same techniques described herein. For example, although the status information exchanges are described as occurring between the tag 250 and one or more of the base units 114, in other example implementations, the status information exchanges can be implemented to occur between the MPPM 104 and one or more of the base units 114. Additionally or alternatively, the status information exchanges can be implemented to occur between the tag 250 and one or more people meters or between the MPPM 104 and one or more people meters. A people meter is an electronic device that is typically disposed in the presentation area of a presentation device (e.g., a television) and that is proximate to one or more audience members. Some example people meters are adapted to communicate with a media meter disposed in, for example, a set top box, that measures various signals associated with the television for a variety of purposes including, but not limited to, determining the operational status of the television (i.e., whether the television is off or on) and identifying the programming being displayed by the television. Based on any number of triggers, including, for example a channel change or an elapsed period of time, the people meter prompts the audience member(s) to input information by depressing one of a set of buttons each of which is assigned to represent a different member. For example, the people meter may prompt the audience member(s) to register (i.e., log in) or may prompt the audience member(s) to indicate that they are still present in the audience. The above example is applicable to television audience measurement and/or to other metering measurement contexts (e.g., radio, Internet, etc.)

Figure 5E:
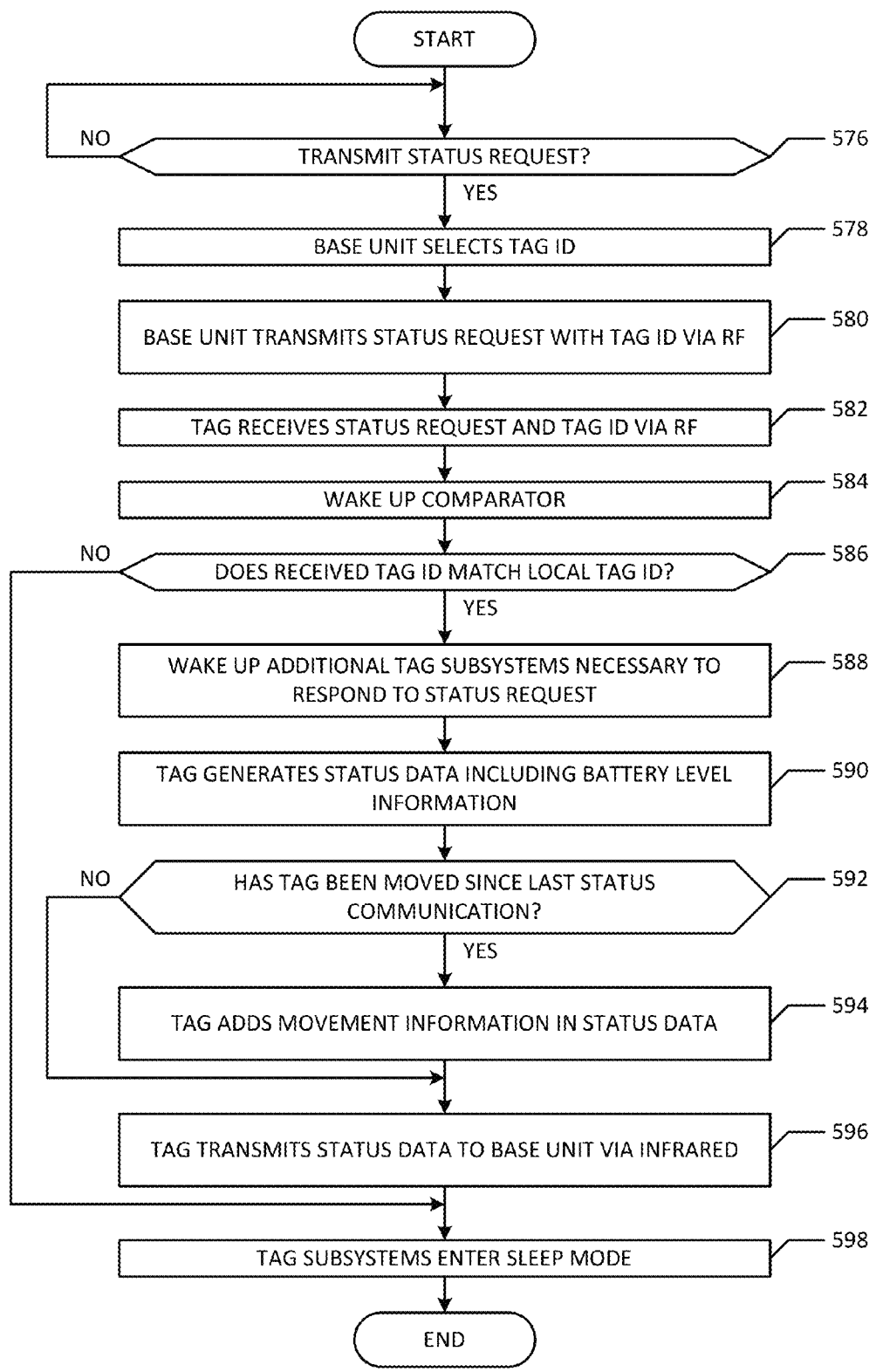
FIG. 5E illustrates a flow diagram of an example process to communicate status information from the example tag device of FIGS. 1 and 2B to the base unit of FIGS. 1 and 3.

FIG. 5E is a flow diagram representative of example machine readable instructions that may be executed to communicate status information from the tag 250 to the base unit 114. Initially, the base unit 114 determines whether it should transmit a status request message (block 576). For example, the base unit 114 may be configured to transmit a status request message to the tag 250 at predefined time intervals and/or in response to one or more events. If the base unit 114 should not yet transmit a status request message, it continues to check at block 576 to determine when it should transmit a status request message. If the base unit 114 determines that it should transmit a status request message (block 576), the base unit 114 selects a tag ID of the tag (e.g., the tag 250) from which it is to receive status information (block 578). The base unit 114 then transmits the status request with the selected tag ID via an RF signal (block 580).

The tag 250 receives the status request and the tag ID (block 582) via its RF interface 262 and, in response, wakes up its comparator subsystem 266 (block 584). For example, upon receipt of the status request, the RF interface 262 can generate an interrupt or trigger signal, or a receive buffer in which the RF interface 262 stores the status request can generate an interrupt or trigger signal indicating the status request has been received. In response to the interrupt or trigger signal, an interrupt handler or trigger signal handler can wake up the comparator subsystem 266. In an alternative example implementation, a polling routine or a data receive monitor can be configured to periodically check a receive buffer for receipt of a status request message. In any case, in response to a receive data interrupt, a receive data trigger signal, or determining that data has been received in the receive buffer, the tag 250 can wake up its comparator subsystem 266. The comparator subsystem 266 determines whether the received tag ID matches the tag ID assigned to the tag 250 (block 586) by comparing the tag ID's. For example, the comparator subsystem 266 can receive the tag ID from the RF interface of the tag 250, retrieve the tag ID of the tag 250 from a memory of the tag 250, and compare the received and retrieved tag ID's to each other. If the comparator subsystem 266 determines that the tag ID's match (block 586), the tag 250 wakes up additional tag subsystems necessary to respond to the status request (block 588). For example, the tag 250 can wake up an IR interface, a microprocessor, etc. by communicating a wake up signal (e.g., an interrupt) from the comparator subsystem 266 to the subsystems to be woken up. In some example implementations, the tag 250 can wake up a battery status subsystem and/or a movement status subsystem. The battery status subsystem can be configured to measure a battery charge remaining in its battery or batteries so that the tag 250 can communicate a battery status to the base unit 114. The movement status subsystem can be configured to determine whether any movement history information is available for communication to the base unit 114.

The tag 250 then generates status data including battery level information (block 590). If the tag 250 has been moved since the last time it communicated status information to a base unit (block 592), the tag 250 adds any available movement information in the status data (block 594). More specifically, when the tag 250 is moved, the tag 250 may generate movement information (e.g., movement history information) indicative of its movement and store the movement information in a memory. In some example implementations, at block 592, the tag 250 can determine that it has moved after it communicated previous status information to a base unit if any movement information is stored in its memory 254, and each time the tag 250 communicates status information to a base unit, the tag 250 can clear its memory 254 of movement history information. Alternatively or additionally, when the tag 250 generates and stores new movement information it can set a flag indicating that movement information is available for communication to a base unit, and after the tag 250 communicates status information (and the movement history information) to a base unit, the tag 250 can clear the flag. In this manner, at block 592, if the flag is set, the tag 250 can determine that new movement information generated after previous status information was communicated to a base unit is available. On the other hand, if the flag is clear, the tag 250 can determine that no movement information has been generated after the tag 250 communicated status information to a base unit.

After the tag 250 adds the movement information in the status data (block 594) or if the tag 250 determines that it has not been moved since the last time it communicated status information (block 592), the tag 250 transmits the status data to the base unit 114 via IR (block 596). After the tag 250 transmits the status data to the base unit 114, the tag 250 places its subsystems in sleep mode (block 598) while keeping awake (or in standby mode) only the subsystem(s) or circuitry (e.g., an RF antenna interface and an RF receiver interface) required to detect RF transmissions from base units. The process of FIG. 5E then ends.

The example process of FIG. 5E is described above as the base unit 114 transmitting the status request via an RF signal at block 580 and the tag 250 transmitting the status data to the base unit 114 via an IR signal at block 596. However, in other example implementations, the base unit 114 can be configured to transmit the status request using any other type of transmission signal at block 580, and the tag 250 can be configured to transmit the status data to the base unit 114 using any other type of transmission signal at block 596 different from the type of transmission signal used by the base unit 114 at block 580. For example, in some example implementations, the base unit 114 may be configured to transmit the status request using an RF signal at block 580, and the tag 250 may be configured to transmit the status data using an ultrasonic signal at block 596.

The data from the MPPM 104 is forwarded to a central office for out of home reporting and fixed-location metering information (e.g., media metering information generated by the base units 114) associated with the MPPM 104 is also forwarded to the central office to provide metered location (e.g., in home) information for analyzing. Also, the in-home data (i.e., data collected at one or more primary monitored locations such as a panelist's home) generated by the base units 114 and the out-of-home data (i.e., data collected outside the primary monitored location(s)) generated by the MPPM 104 may be processed together and/or independently to provide comprehensive information regarding the metered audience exposure.

Mesh Networking

Returning to FIG. 1, the example geographic area 100, in which the example household 102 and/or store 102 is located includes multiple rooms (e.g., Rooms A, B, and C) and/or floors. Thus, some of the example devices to meter an audience (e.g., MPPMs, tags, base units, home processing system, etc.) may not be within communicative range of another device. For example, an audience member in proximity to the media delivery center 112A carrying MPPM A 104A of Room A is not in communicative range of any base unit 114. Similarly, the audience member 106 carrying a MPPM 104D is not within communicative range of a base unit 114 because, for example, the user is gardening outside the example household 102. While an MPPM 104 and/or a base unit 114 includes a memory to store audience member data, the memory requirements of such device increase in size (and the expense) as a function of increasing time away from a docking station and/or any other device (e.g., base unit, home processing system) that may communicatively receive collected audience data. Therefore, it is desirable to provide a vehicle for transmitting data from the MPPM or tag to reduce on-board memory requirements.

FIG. 1 illustrates a mesh network to expand the communicative capabilities of various devices (e.g., MPPMs, tags, base units, charging station, docking stations, home processing system, etc.) to meter an audience. Rather than rely upon the RF, IR, and/or US transmission power of a MPPM 104 (or tag) to reach a base unit 114 directly, each MPPM 104 (or tag), base unit/charging station 114, and/or home processing system may operate as a repeater to relay communications. As discussed above, while in the example of FIG. 1, audience member 106 is well out of range of the nearest base unit 114 (Room B), the audience member 106 is within range of MPPM A 104A in Room A. As such, the MPPM 104D may communicate audience member data (e.g., GPS location information via satellite 110 and/or RF transceiver towers 108) and/or other information to MPPM A 104A in Room A. Moreover, because MPPM A is out of range of a base unit, much like the MPPM 104D on the audience member 106, the MPPM A relies upon MPPM B 104B in Room B to service communicative needs. Assuming for this example household environment 102 that the RF transmission power of MPPM A 104A may not reach the base unit 114 of Room B, but is within range of MPPM B 104B of Room B, then MPPM A 104A uses MPPM B 104B to forward its data (and/or data received from the MPPM 104D) to the base station 114A. In other words, MPPM B 104B is within communicative range of the base unit 114 of Room B, it can relay communicative requests and/or data from any one of the MPPM 104 of the outside user 106, MPPM A 104A of Room A, and/or any other MPPM within its communication range.

The base unit 114 of Room B (which may operate as a metering device), much like base units 114 in other location(s) of the example household 102, may be communicatively networked together via a local network. Such local communication network may further the home processing system 116 and the charging/docking stations. The local network may include wired or wireless techniques known by persons of ordinary skill in the art (e.g., 802.11 wireless, Bluetooth®, Category 5 network cable, powerline communication, X10 protocol, cellular, etc.). The local network enables data sharing and/or transfer between any two elements of the network, although such communication may be via an intermediate node or element.

Figure 6:
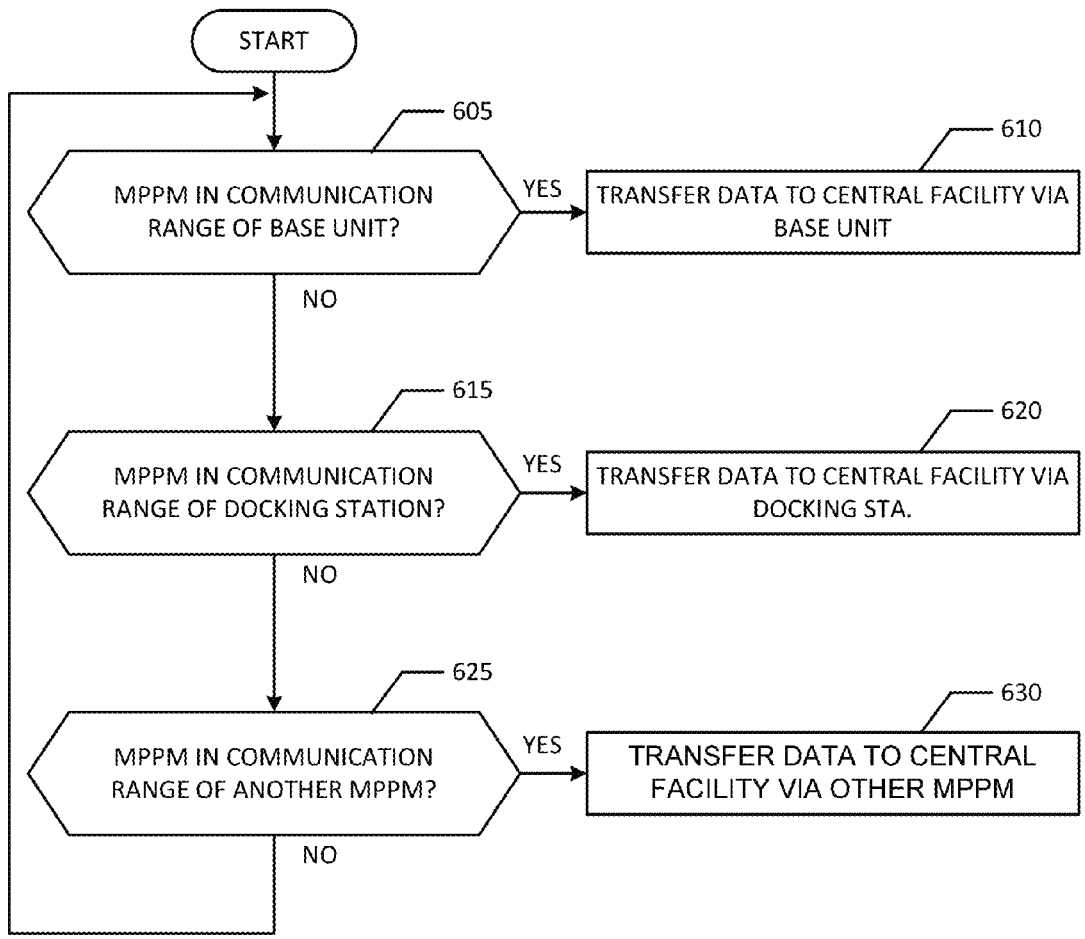
FIG. 6 illustrates a flow diagram of an example process for mesh communication in the system of FIG. 1.

FIG. 6 is a flow diagram of an example method that may be used to permit mesh communication among the various devices of the example household 102. As discussed above in view of FIG. 1, rather than rely exclusively upon the RF, IR, and/or US transmission power of a MPPM 104 to directly reach a base unit 114, one or more of the MPPMs 104 and/or base units 114 may operate as a repeater to relay communications from one device (e.g., an MPPM) to another device (e.g., a remotely located base station).

If a given MPPM 104 is within direct communicative range of a base unit 114 (block 605), then data may be transferred to/from the base station by using any of the communication methods as described above (block 610). For example, the MPPM 104 may transfer data from the optical transducer 220, and/or the RF transceiver 222. However, if the MPPM 104 is not within direct communication range of any base unit 114 (block 605), then the MPPM 104 may determine whether a docking station is within communication range (block 615). For example, the audience member 106 may have placed the MPPM 104 on the docking station to allow it to charge during the night. Because the docking station is typically plugged into a power outlet (e.g., thereby permitting powerline communication opportunities) and/or wired and/or wirelessly connected to a home network, any data that resides on the memory 204 of the MPPM 104 may be uploaded to the base unit 114 via the networked docking station (block 620)

If the MPPM 104 is neither within communication range of a base unit 114 (block 605) nor within communication range of a docking station (block 615), then the MPPM 104 may determine whether it is within communication range of another MPPM 104 (block 625). As described above in view of FIG. 2A, the MPPM 104 includes various sensors and transducers that may aid in location of and/or communication with other devices that also employ such sensing technology. For example, the MPPM 104 may employ its RF transceiver 222 to detect another MPPM 104 in range, as discussed above in view of FIG. 1. If the other MPPM 104 is within range, data stored in memory 204 may be RF modulated and transmitted to the other MPPM 104 to enable the other MPPM to act as a relay (block 630). On the other hand, if the MPPM 104 fails to locate another MPPM 104 within communicative range, that MPPM 104 may wait for another opportunity in which it may be closer to any one of a base unit 114, docking station, and/or another MPPM 104 to convey data. A system for wirelessly conveying data to a base unit using MXL is discussed in Internation Application No. PCT/US04/00818, which is hereby incorporated by reference in its entirety.

Example Processor System

Figure 7:
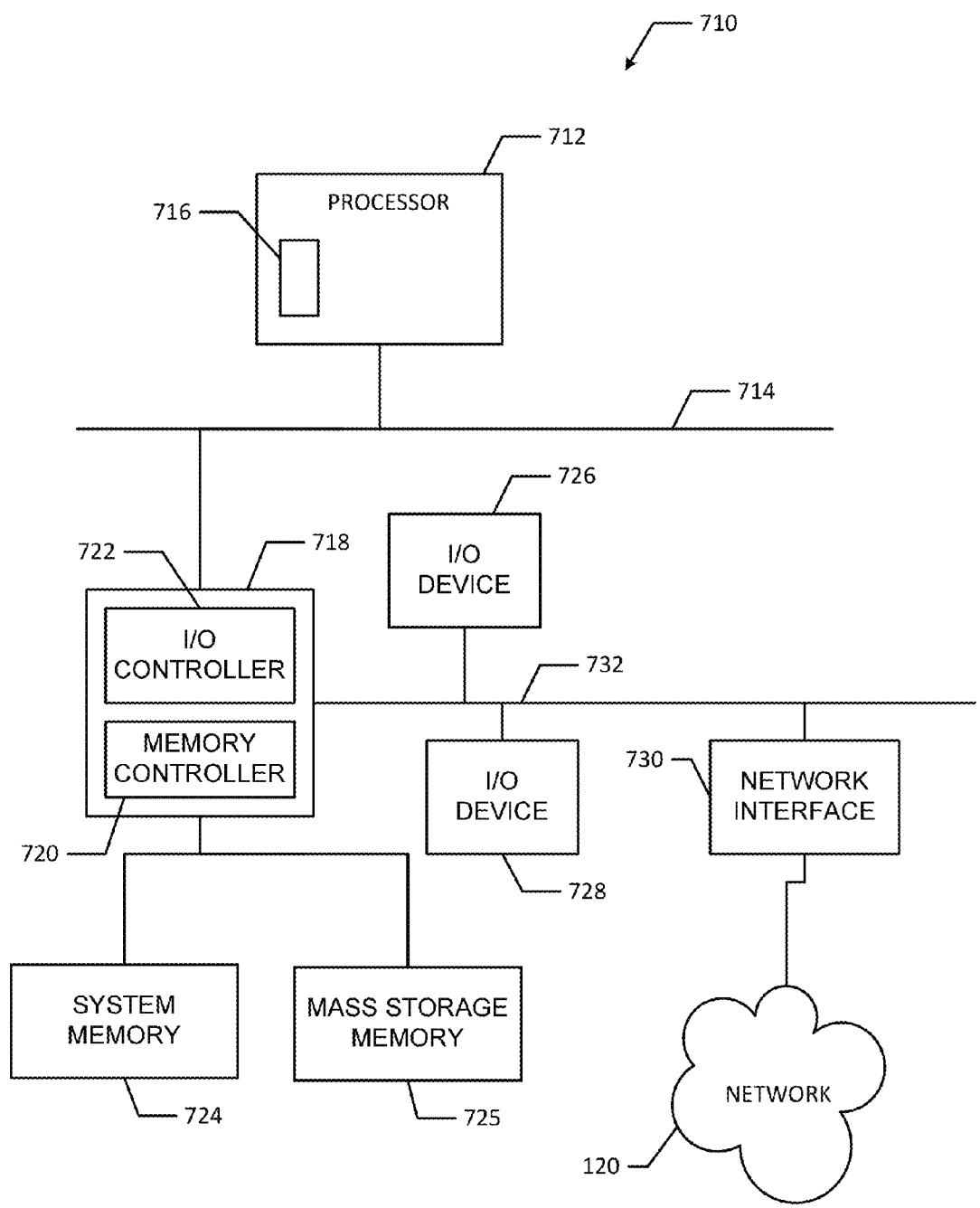
FIG. 7 is a block diagram of an example processor system that may be used to implement portions of the system of FIG. 1.

FIG. 7 is a block diagram of an example processor system 710 that may be used to implement the apparatus and methods described herein. As shown in FIG. 7, the processor system 710 includes a processor 712 that is coupled to an interconnection bus 714. The processor 712 includes a register set or register space 716, which is depicted in FIG. 7 as being entirely on-chip, but which could alternatively be located entirely or partially off-chip and directly coupled to the processor 712 via dedicated electrical connections and/or via the interconnection bus 714. The processor 712 may be any suitable processor, processing unit or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. As is well known, a chipset typically provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 is communicatively coupled to the network 120 and may be, for example, an Ethernet device, an asynchronous transfer mode (ATM) device, an 802.11 device, a DSL modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

FIGS. 8-12, 16-18, and 20 are flow diagrams that depict example processes. The example processes depicted in the flow diagrams of FIGS. 8-12, 16-18, and 20 may be implemented in software, hardware, and/or any combination thereof. For example, the example processes may be implemented in software that is executed on the MPPMs 104 of FIGS. 1 and 2A, the tags 250 as shown in FIG. 2B, the base units 114 of FIGS. 1 and 3, and/or the processor system 710 of FIG. 7. Although the example processes are described below as a particular sequence of operations, one or more operations may be rearranged, added, and/or removed to achieve the same or similar results.

Bandwidth Detection

Figure 8:
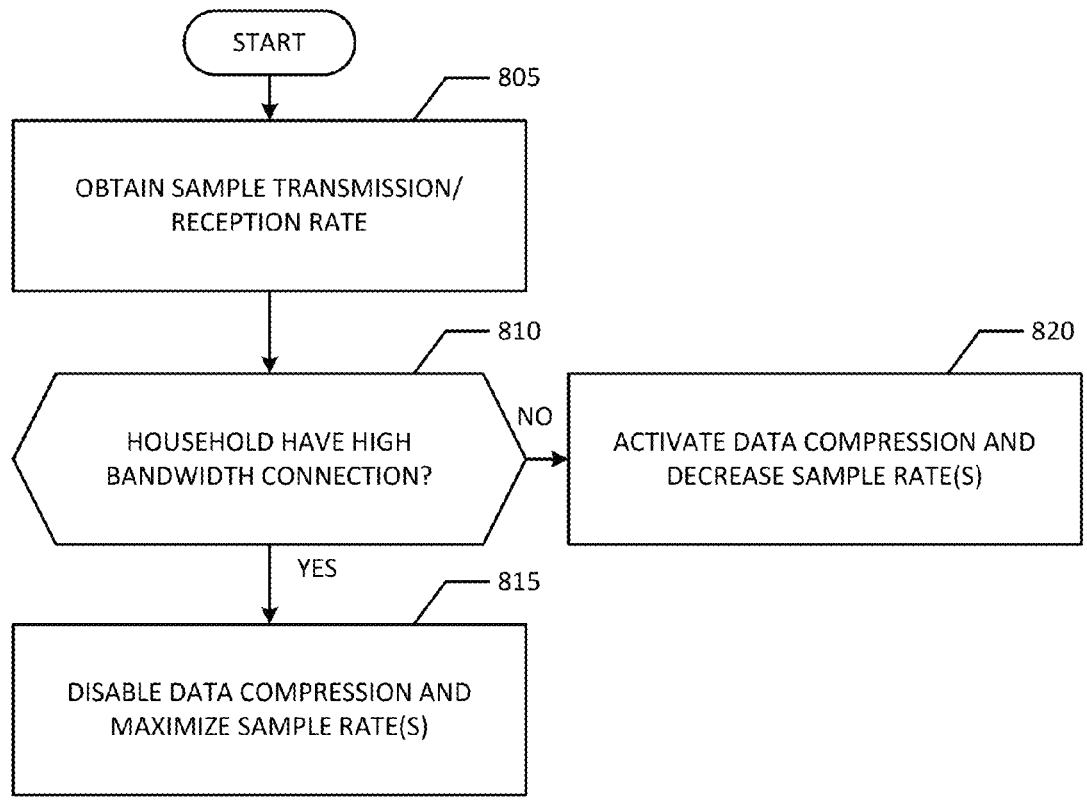
FIG. 8 is a flow diagram of an example process to determine bandwidth capabilities of an example household of FIG. 1.

FIG. 8 is a flow diagram of an example method that may be used to improve collection and analysis of media monitoring information and location information. In particular, the example method of FIG. 8 may be implemented using a base unit (e.g., the base unit 114 of FIGS. 1 and 3). For example, the base unit 114 may be configured to monitor the network 120 for bandwidth capacity based on a data rate measurement during data transmission and reception. Transmission and reception rates for monitored locations (e.g., stores, audience member households) 102 that employ a telephone modem will be relatively low as compared to households 102 that employ a cable or DSL modem. Knowing what the transmission rate capabilities are for a particular household 102 allows the base unit 114 to more efficiently accommodate data collection and minimize the amount of time consumed by sending and receiving audience data to/from the central facility 118. Generally speaking, a household 102 with a low bandwidth connection to the network 120 indicates that each device in the household 102 that performs data collection should be configured to reduce its sample rate and activate data compression techniques, if available.

Initially, the processor 302 of the base unit 114 may analyze and acquire the transmission and reception rates for data traffic to/from the example household 102 via the remote transceiver 316 (block 805). The acquired sample rate may be stored in the base unit 114 memory 324 along with an aggregate number of samples. More than one sample is particularly helpful to prevent a false understanding of data transmission capabilities for the example household 102. For example, if the network 120 connection for the household 102 is typically very fast, the base unit 114 will inform and/or instruct other devices (e.g., MPPMs 102, tags 250, base units 114) to sample measurement data at a very high rate. However, if a brief period of network 120 communication occurs (e.g., a storm, a power outage, etc.), then having an aggregate value for the transmission rate will prevent the base unit 114 from instructing the household 102 measurement devices to alter data rate settings in response to an intermittent glitch.

The acquired sample rate, or the aggregate sample rate (e.g., a running average) saved in the memory 304, is compared against a data rate threshold to determine whether the speed communication capabilities (e.g., high, low, etc.) (block 810). If the threshold value, such as a data rate of 500 kilobits per second (kbps), is lower than the rate measured (e.g., the running average), then the household 102 has a relatively fast network connection as compared to a household using dial-up modems. Accordingly, the presence of such a high data rate prompts the base unit 114 to instruct the devices to sample at a high/maximum sample rate and disable data compression algorithms, if any (block 815). On the other hand, if the threshold value is higher than the rate measured, then the household may have a relatively slow network 120 connection as compared to a household using cable or DSL modems. Accordingly, a lower data rate may prompt the base unit 114 to instruct the devices (e.g., MPPM 102, tags, base unit 114) to sample at a lower/minimum sample rate and employ data compression algorithms (block 820). Multiple thresholds may be used to throttle the sample rate and/or the level of compression to a level consistant with the available data rate to/from the monitored location 102.

Audio Processing

Figure 9:
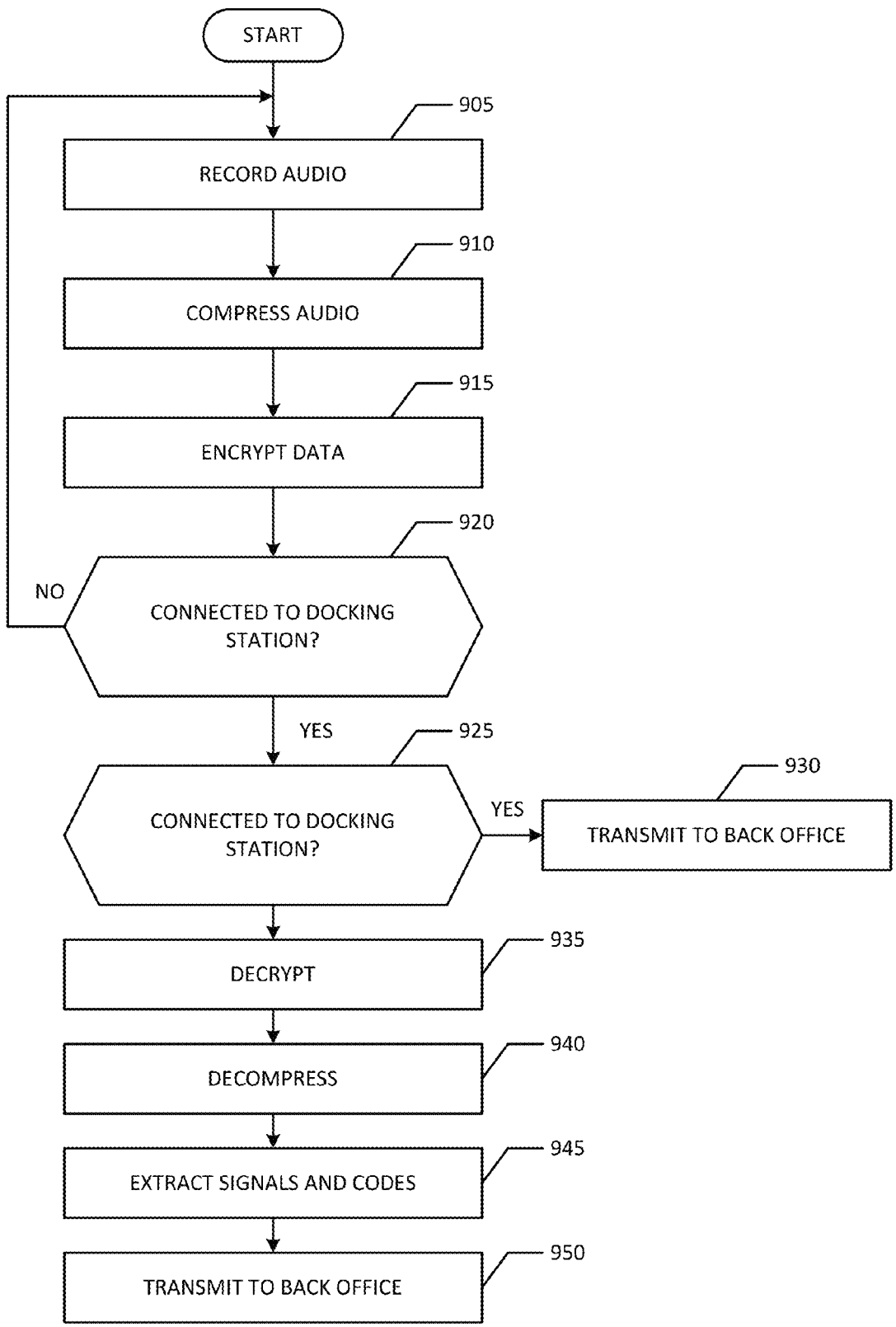
FIG. 9 is a flow diagram of an example process to acquire audio information.

FIG. 9 is a flow diagram of an example method that may be used to acquire audio information by a device (e.g., MPPM 102, tag, base unit 114) related to content viewed and/or heard by audience members. In general, a MPPM 104 and/or a base unit 114 may be configured to acquire audio signals of the broadcast program(s) (e.g., television, radio, etc.) being presented to by the audience member. For the purpose of illustration, and without loss of generality, the following flow diagram will be described in view of the MPPM 104 as the device that monitors audio data. However, other devices (e.g., a tag, a base station, etc.) may be substituted for the MPPM 104. The audio is recorded by the MPPM 104 (block 905) and compressed into an audio file format (block 910) such as, but not limited to, audio video interleave (AVI), WAVE (WAV) format by Microsoft®, audio interchange file format (AIFF), Windows® media audio (WMA), and/or MPEG audio layer-3 (MP3) format. Generally, the audio file format compression is lossy, which does not typically adversely affect post processing of the audio data to extract codes embedded within the broadcast audio and/or to generate a signature from the audio. The compressed audio file is encrypted (block 915) to prevent the acquired audio data from being accessed by an unauthorized party. For example, if the MPPM 104 carried by the audience member is lost or stolen, then the privacy of the audience member is less likely to be breached by another person because of the encryption. As long as the MPPM 104 is not communicatively connected to a docking station (block 920), the process of acquiring data continues (blocks 905, 910, 915).

If the MPPM 104 is placed on the docking station (block 920), such as a docking station next to an audience member's bed, then the MPPM 104 uploads the compressed and/or encrypted audio data in a manner consistent with the bandwidth capabilities of the example household 102 (block 925). For example, if the household 102 is determined to have a limited bandwidth capability, then any data sent to the central facility 118 is left in a compressed format and/or further compressed before transmission (block 930). As described above, based on the bandwidth capability determination of the household, the sample rate of audio recorded (block 905) may have been previously set to a low rate (block 820 of FIG. 8). Similarly, the compression setting (block 910) may also be adjusted pursuant to the communicative capabilities of the example household 102 (block 820 of FIG. 8).

If the MPPM 104 is placed on the docking station (block 920) and the capabilities of the example household 102 indicate that high speed communication options are available (e.g., high speed internet via cable or DSL modem), then, prior to sending the metering data to the central facility 118, the encrypted data is decrypted (block 935). Thereafter, the decrypted data is decompressed (block 940), which permits the MPPM 104, base unit 114, or home processing system 116 to generate signatures and/or extract codes (block 945) that may have been embedded in the acquired broadcast signal. Because the decryption (block 935), decompression (block 940), and signature collection code extraction (block 945) are performed on a device (e.g., MPPM 104, base unit 114, home processing system 116) at the audience member's household 102 before sending to the central facility 118 (block 950), the central facility 118 is less inundated/taxed with processing responsibilities upon receipt of such metering data.

Power Management

As described above, portable metering units, such as the MPPM 104 and/or the tag 250, consume varying amounts of battery power based on the activities they perform. For example, the MPPM 104 consumes a greater amount of battery power when, for example, the audio sensor 218, the optical transducer(s) 220, the RF transceiver 222, the US transducer 223, the motion sensor 224, and/or the SPSR 226 are active. However, all of the various sub-components of the portable device are not necessary at all times of operation. As a result, the various example location determination methods described above allow the portable devices to conserve on-board battery power by selectively powering down sub-systems based on the detected location of the portable meter.

Figure 10A:
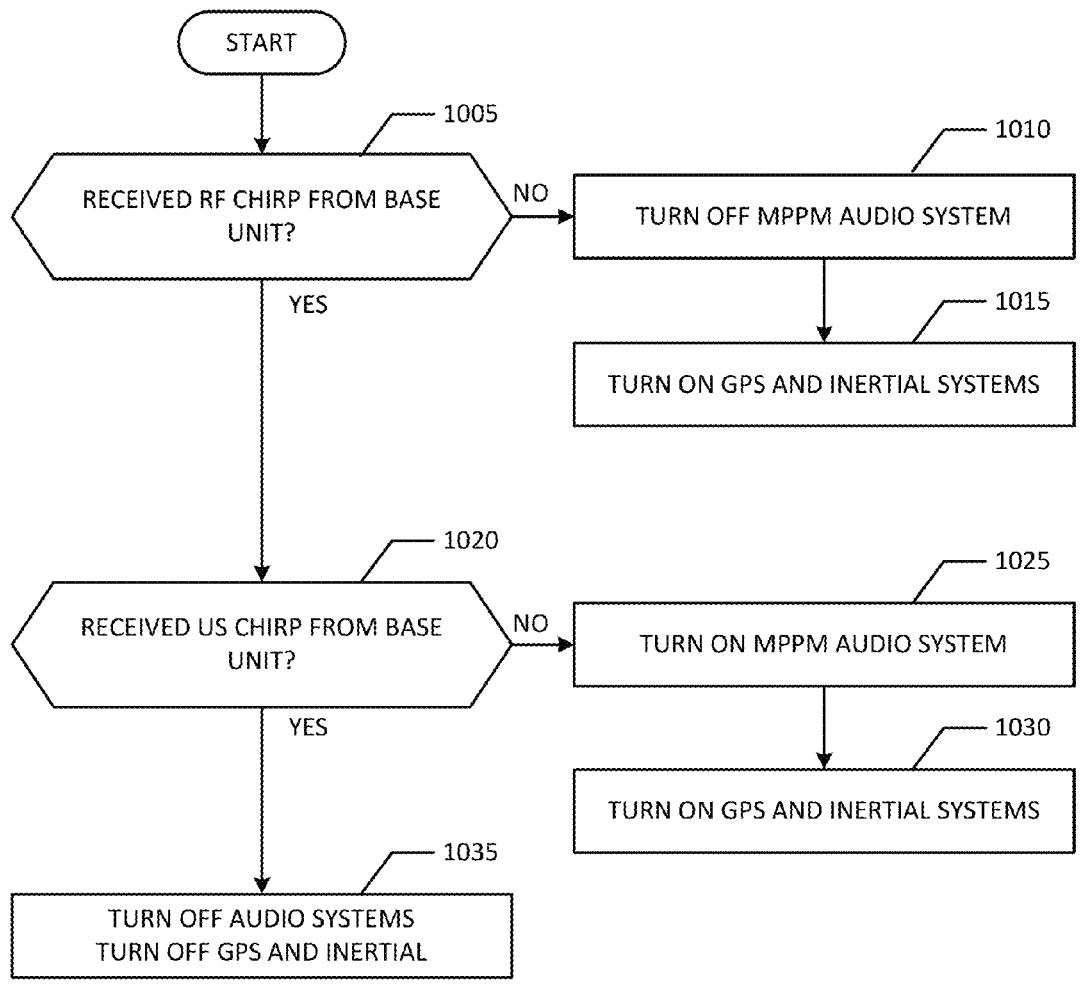
FIGS. 10A, 10B, and 11 are flow diagrams of example processes to conserve battery power of the example Multipurpose Personal Portable Metering device of FIGS. 1 and 2A.

FIG. 10A is a flow diagram of an example method that may be used to conserve battery power of the MPPM 104. Typically, the base unit 114 is emitting periodic RF, IR, and/or US chirps in an effort to locate the portable devices (e.g., MPPMs 104, tags 250). If the MPPM 104 fails to receive an RF chirp (block 1005) from the base unit 114, then the MPPM 104 turns off its internal devices related to audio acquisition (block 1010). In the absence of communication with a base unit 114, the MPPM 104 is presumed to be outside the boundaries of a monitored location (e.g., a household, store, restaurant, etc.) 102, in which case the internal devices related to GPS location detection are activated (block 1015) to enable data collection indicative of where the user (e.g., audience member) has traveled. For example, while the user may not be within the household 102 (or other metered location) to view and/or listen to media programming (e.g., radio, television, etc.), the user may be in the vicinity of various billboards, mall advertisements, and/or supermarket ads. Such GPS location detection methods allow collection of exposure to outside advertisements based on proximity.

On the other hand, if the MPPM 104 detects an RF chirp from the base unit 114 (block 1005), but fails to detect a corresponding US chirp (block 1020), then the internal devices related to audio detection and/or collection are turned on (block 1025). For example, while the MPPM 104 is close enough to a base unit 114 to receive RF chirps, the MPPM 104 may also be far enough away to indicate that the user is not in the vicinity of one or more media delivery centers 112. Nonetheless, audio detection may still be useful in the event that the user is listening to a portable radio, MP3 player, etc. while, for example, gardening outside or working in a garage workshop. Additionally, because the MPPM 104 is receiving RF chirps from the base unit 114, it may be safely assumed that the MPPM is located near the monitored location 102 and the internal devices related to GPS location detection and/or inertial detection may no longer be needed and may then be turned off (block 1030) to conserve battery power.

In the event that the MPPM 104 detects both an RF chirp and a US chirp, the MPPM 104 may turn off both the internal devices for audio detection, GPS location detection, and inertial systems (block 1035). For example, the base unit 114 and MPPM 104 may determine a distance, as described above in view of FIGS. 4A, 4B, 4C, 5A, 5B, 5C, and 5D, and then unload further data acquisition responsibilities to the base unit 114. Accordingly, the base unit 114 may collect all audio data from the media delivery center 112, extract codes and/or collect signatures, and store the collected data, codes, and/or signatures in the memory 324 for later transmission to the home processing system 116 (if available) and/or the collected data, codes, and/or signatures may be transmited directly to the central facility 118. Battery power of the MPPM 104 is conserved due to its reliance upon the base unit 114 for most of the data acquisition (metering functions) while in proximity to the base station.

Figure 11:
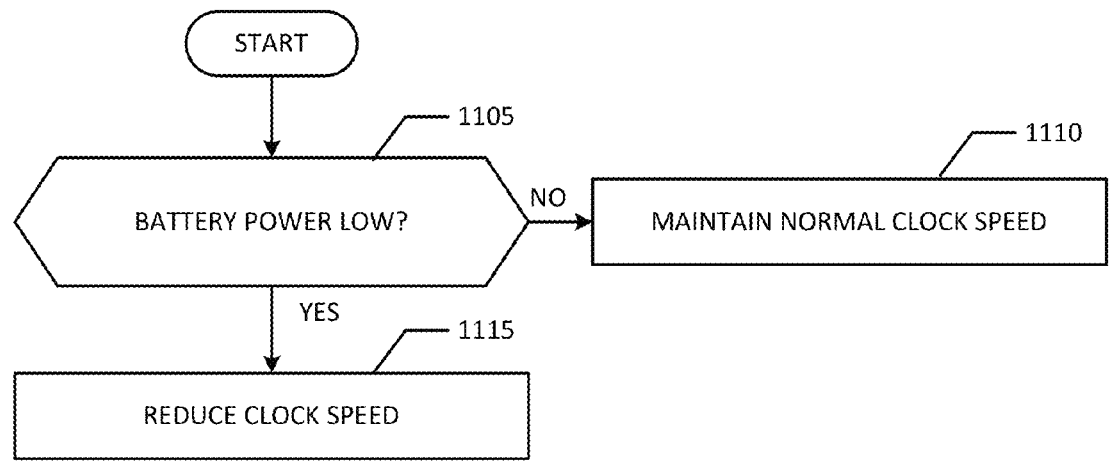

The MPPM 104 may also conserve battery power based on a voltage measurement of the battery. FIG. 11 is a flow diagram of an example method that may be used to conserve MPPM 104 battery power. In particular, clock speed variations have an effect on battery longevity in devices that employ processors, such as the processor 202 in the example MPPM 104. Persons of ordinary skill in the art will appreciate that any given processor has a finite amount of resources (e.g., transistors), wherein use of such transistors requires switching power. As the clock speed of a processor increases, the amount of switching power per unit of time increases, thereby increasing the power consumption and heat generation of the processor. Similarly, as the clock speed decreases, lower amounts of power are required per unit of time.

The MPPM 104 of the illustrated example periodically performs a voltage measurement on the internal battery 207 and compares the measured voltage to a voltage threshold that indicates a battery strength status. If the battery threshold voltage is lower than the measured voltage (e.g., the voltage measurement is above the threshold value) (block 1105), then the clock speed of the MPPM 104 processor 202 is maintained at its present (i.e., "normal") rate (block 1110). However, if the battery measurement is measured and falls below the threshold value (block 1105), then the MPPM 104 processor 202 clock speed is reduced to consume less power per unit of time.

Various thresholds may be established and stored in the memory 204 of the MPPM 104. For example, if the MPPM 104 is using Nickel Cadmium batteries, then a battery voltage threshold value may be set to accommodate for the relatively rapid discharge rate after a slight voltage decrease is measured. However, if the MPPM 104 is using a Nickel Metal Hydride battery, for example, then the battery voltage threshold value may be set to accommodate the more linear discharge rate exhibited by such batteries.

Figure 10B:
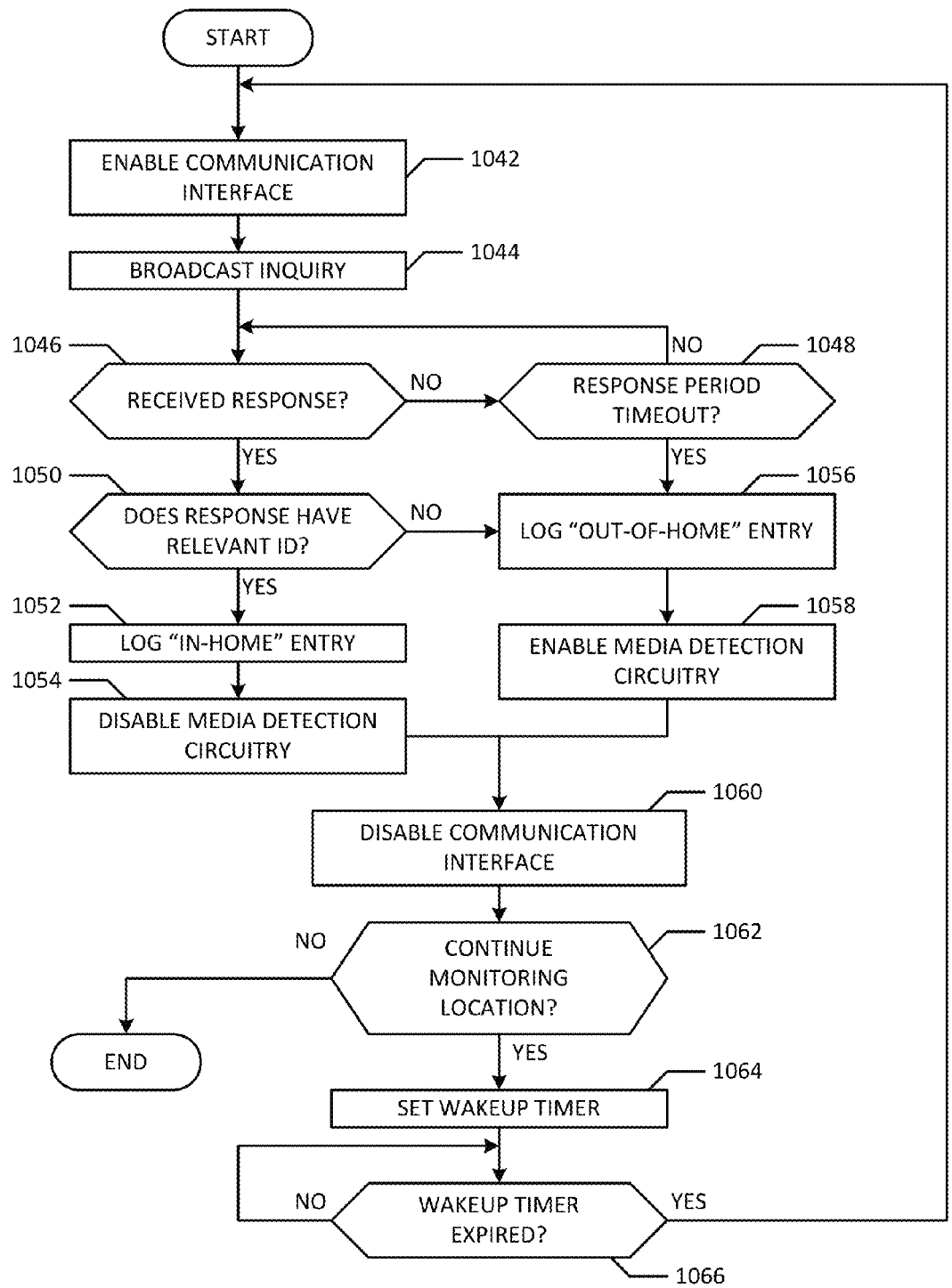

FIG. 10B is a flow diagram representative of example machine readable instructions that may be executed to conserve battery power of the MPPM 104. The example instructions of FIG. 10B may also be used to generate information indicative of when the MPPM 104 was within a home or out of a home. To conserve battery power, the MPPM 104 may be configured to turn off or shutdown its media detection subsystems or circuitry (e.g., the information sensors 208 of FIG. 2A) when they are not needed to detect media information. In addition, the MPPM 104 may use the communication interface 206 (FIG. 2) to determine when it is located within a home or out of a home. In the illustrated example of FIG. 10B, the communication interface 206 is implemented using a Bluetooth® (BT) transceiver having discovery capabilities similar or identical to those defined in the Bluetooth® standard. These capabilities are employed to determine when the MPPM 104 is near one of the base units 114 of FIG. 2 in the household 102 (or other metered location).

Initially, the MPPM 104 enables its communication interface 206 (block 1042) and broadcasts a discovery inquiry message (block 1044). For example, the communication interface 206 may broadcast a discovery message as defined in the Bluetooth® standard. The MPPM 104 then determines whether it has received a response (block 1046) from a base unit (e.g., one or more of the base units 114 of FIG. 1). For example, if the MPPM 104, is sufficiently close to one of the base units 114 so that the base unit 114 can receive the discovery message, the base unit 114 is configured to respond by communicating a response message to the MPPM 104. If the MPPM 104 receives a response from the base unit 114 (block 1046), the MPPM 104 determines whether the response has a relevant ID (block 1050). In the illustrated example, the MPPM 104 determines whether the response has a relevant ID by using the comparator 234 to compare an identifier received via the response to a locally stored identifier associated with the MPPM 104. For example, to ignore responses received from wireless devices (e.g., Bluetooth® devices) that are not associated with metering applications corresponding to the MPPM 104 or a metering system that includes the MPPM 104 and the base units 114, the base units 114 may be configured to insert an ID value (e.g., a system ID value or a shared ID value which is shared between some or all metering devices in the household 102) that indicates that the base units 114 are associated with the metering applications or the metering system. Of course, non-relevant wireless devices such as, for example, BT-enabled telephones or computers or MPPM's not corresponding to the same monitored environment or the same metering system as the MPPM 104 that respond to the discovery message will not include the ID value. Thus, the MPPM 104 will ignore response messages received from such non-relevant devices.

If the MPPM 104 determines that the received message does have a relevant ID value (block 1050), the MPPM 104 creates an "in-home" entry and stores the same in the memory 204 (FIG. 2A) (block 1052). The MPPM 104 can include a timestamp in the "in-home" entry to indicate that the MPPM 104 was inside the household 102 (or other metered location) at the time it created the "in-home" entry. The "in-home" entry indicates that the MPPM 104 was within an area (e.g., a monitored environment) having a stationary metering device (e.g., one of the base units 114) therein. In some example implementations, the "in-home" entry does not necessarily mean that the MPPM 104 is within a household. For example, the "in-home" entry may indicate that the MPPM 104 is within any other area (e.g., an office, a retail establishment, etc.) having stationary metering devices capable of interacting with the MPPM 104 and performing media metering, audience metering, and/or other metering applications substantially similar or identical to the MPPM 104. For example, the same metering entity or metering company may install various metering systems in various areas (indoor or outdoor) having base units substantially similar or identical to the base units 114 and capable of communicating with the MPPM 104 and other MPPM's, each of which may be associated with a different household. Stored entries indicating an "in-home" status can be subsequently analyzed to determine the times during which the MPPM 104 was located within the household 102 (or within another building having base units similar to the base units 114).

The MPPM 104 then disables the media detection circuitry (e.g., disables one or more of the information sensors 208 of FIG. 2A) (block 1054). In this manner, the MPPM 104 can offload all media detection and collection processes to the base unit(s) 114 and, in turn, the MPPM 104 can conserve its battery power by relying upon the base unit 114 to perform data acquisition (metering functions) while the MPPM 104 is within the household 102 (or other metered location). Accordingly, the base unit 114 may collect media signals from the media delivery center 112, extract codes and/or collect signatures, and store the same in the memory 324 for later transmission to the home processing system 116 (if available) or transmit the collected metering information (e.g., collected codes and signatures) directly to the central facility 118. In this manner, the base units 114 are adapted to perform media exposure monitoring within a metered location (e.g., in a home, in a store such as a retail location, in a restaurant, etc.) while the MPPM 104 is adapted to perform media exposure monitoring outside the metered location (e.g., outside the metered home, retail location, etc.). Further, the MPPM 104 is effectively disabled while within the monitored location to avoid redundant (or duplicative) data collection and/or to conserve battery life of the MPPM 104. Although, the above describes disabling the media monitoring operations of the MPPM 104 to conserve battery life, in alternative example implementations, the MPPM 104 may be configured not to disable its media monitoring operations when it is within the monitored location. In such example implementations, when the MPPM 104 is within the monitored location, the MPPM 104 and the base units 114 may both monitor media exposure.

Returning to block 1046, if the MPPM 104 does not receive a response, the MPPM 104 determines if a response period has expired (block 1048). For example, when the MPPM 104 broadcasts the discovery inquiry message at block 1044, it may set a response period in a timer (e.g., the timer 264 of FIG. 2B) that specifies the amount of time that the MPPM 104 will wait to receive a response from a base unit. The MPPM 104 may use the comparator 234 to periodically poll the timer 264 by, for example, comparing the value of the timer 264 to zero to determine whether the timer 264 has expired. Alternatively, the timer 264 may be configured to generate an interrupt when the timer 264 expires. If the response period has not expired (block 1048), the MPPM 104 continues to check for a received response (block 1046). However, when the response period expires (block 1048), the MPPM 104 creates an "out-of-home" entry and stores the same in the memory 204 (FIG. 2A) (block 1056) because it is likely that the MPPM 104 is outside of the household 102 (or other metered location) when it does not receive a response. The MPPM 104 can include a timestamp in the "out-of-home" entry to indicate that the MPPM 104 was outside the household 102 (or other metered location) at the time it created the "out-of-home" entry. Stored entries indicating an "out-of-home" status can be subsequently analyzed to determine the times during which the MPPM 104 was located outside the household 102 (or outside another building having base units similar to the base units 114). The MPPM 104 then enables its media detection circuitry (e.g., enables one or more of the information sensors 208 of FIG. 2A) (block 1058) to detect media information while the MPPM 104 is out of the household 102 (or other metered location). In this manner, the MPPM 104 can generate metering information when the MPPM 104 is in areas not metered by the base units 114 based on media to which the carrier of the MPPM 104 is exposed but to which the base units 114 are not exposed.

The MPPM 104 then disables the communication interface 206 (FIG. 2A) (block 1060) or puts the communication interface 206 in a sleep mode or low-power mode to conserve battery life. The MPPM 104 then determines whether it should continue to monitor its location (block 1062) (e.g., should the MPPM 104 continue to monitor whether it is located in or out of the household 102). If the MPPM 104 determines that it should continue to monitor its location (block 1062), the MPPM 104 sets a wakeup timer (e.g., the timer 264 of FIG. 2B) (block 1064) for an amount of time, the expiration of which indicates that the MPPM 104 should enable its communication interface 206 and broadcast another discovery inquiry message.

The MPPM 104 then collects measurement data, and it also periodically determines whether the wakeup timer has expired (block 1066). For example, the MPPM 104 may periodically poll the wakeup timer at predetermined intervals and use the comparator 234 to determine whether the wakeup timer has expired or the wakeup timer may communicate an interrupt to the processor 252 (FIG. 2B) of the MPPM 104 to indicate that the wakeup timer has expired. The MPPM 104 keeps the communication interface 104 disabled or shutdown as long as the wakeup timer has not expired. However, when the wakeup timer expires (block 1066), control returns to block 1042.

Returning to block 1062, if the MPPM 104 determines that it should not continue to monitor its location, the process of FIG. 10B is ended. For example, the MPPM 104 may determine that it should not continue monitoring if it detects that it has been docked in a docking station, that it has not been moved for some time, that it has been turned off, that it has entered a fixed metered location (e.g., a household monitored by base units), etc.

Media Type Identification

Some broadcast data includes an embedded code and/or signal, which may be detected and/or collected by audience measurement devices (e.g., MPPMs 104, tags, base units 114, home processing system 116) and transmitted to the central office 118 for analysis, sometimes the broadcast has no such codes and/or signals, or such signals are too distorted to be usable by the central office 118. As such, the central office 118 may, instead, attempt to identify the broadcast program by comparing collected signatures to known program signatures. For example, audience measurement comparisons often create a signature of some aspect of a detected media presentation (e.g., a video signature based on, for example, luminosity, an audio signature based on, for example, one or more spectral characteristics of a detected audio signal, etc.) and transmit that to the central facility for comparison to a database of known signatures. The known signatures are correlated to program names and/or other identifiers. Thus, a matching "signature" allows identification of the media observed and/or listened to by the audience member 106. For example, the database 124 of the central office 118 may be populated with audio signatures of any number of movies that an audience member 106 may rent from a video store. Persons of ordinary skill in the art will appreciate that a "signature" is typically a substantially unique representation of at least one characteristic of a monitored media signal. A sample may be a signature of the media signal. The signature may be, for example, a copy of the entire media signal for a period of time, a copy of a portion of the media signal for a period of time, or a representation of any portion and/or portions of a media signal. It is common for a signature to contain less data than a time domain sample of the entire media signal while maintaining substantially unique representations of that signal. Thus, in some examples, the signature may be considered to be a proxy for the full time domain signal.

Of course, the database 124 may be limited and/or some signatures collected by devices in the example household 102 may be of a type that do not occur in a predictable manner. One such signature that may not be typically found in a database 124 for comparison purposes is that of a video game. The video game audio signals do not typically follow a predictable and pre-determined pattern due to audience member 106 participation. As such, audio signatures based on video game play may vary based on the actions taken by the game player. Therefore, the central office may have difficulty matching the audio signatures of a video game. In such circumstances, (i.e., upon failing to find a match to the unknown signatures), the central office 118 may not know why the audio signal is unknown. Similarly, non-mainstream movie rentals and/or "B" movies may not reside in the database 124 to permit comparisons with collected signatures.

Figure 12:
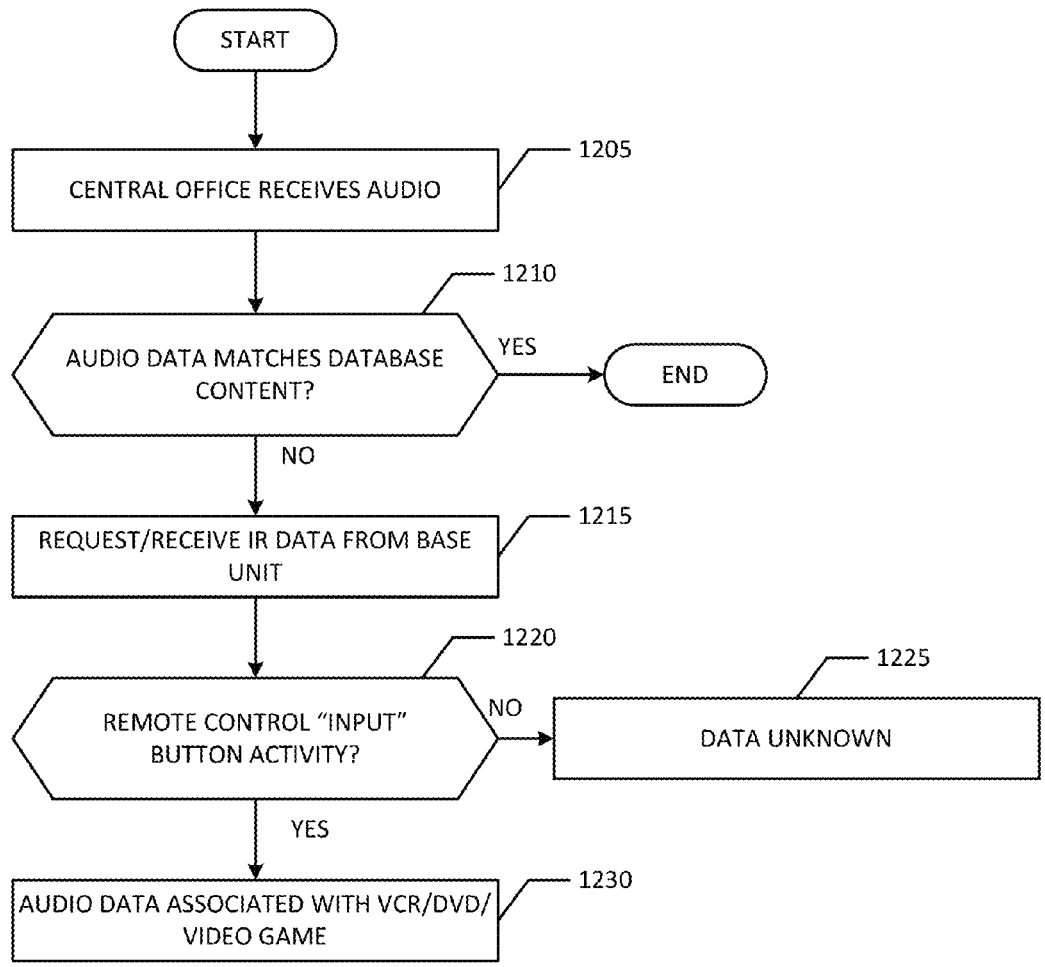
FIG. 12 is a flow diagram of an example process to determine media content broadcast in the example household of FIG. 1.

FIG. 12 is a flow diagram of an example method that may be used to determine why a collected signature fails to match a database archive of signatures. A signature (e.g., an audio signature) is received at the central office 118 (block 1205) and compared to signatures in the database 124 in an attempt to find a matching signature (block 1210). If a match between the collected signature (e.g., from a MPPM 104) and a signature in the database 124 is found (block 1210), then the central office 118 has identified the programming content viewed and/or listened to by the audience member 106. However, if a match between the collected signature and the signature of the database 124 is not found (block 1210), then the central office 118 requests to receive a log of IR data from the monitored location (e.g., a household) 102. In particular, the central office 118 receives IR and/or RF data that may be collected by a base unit 114 near the media delivery center 112 (block 1215). Because the base unit 114 includes an optical transceiver 312 and/or an RF transceiver 308, the base unit 114 is capable of monitoring any IR and/or RF signals that may be transmitted within a corresponding room, such as those signals emitted by an audience member's 106 remote control. Additionally or alternatively, an IR and/or RF receiver may be employed as a separate device within a household room to detect remote control activity. Remote control transmission data may be analyzed for specific commands (e.g., an "input" button), such as those used by an audience member 106 to change the mode of reception, for example, from broadcast television to 'video game' input. Additionally, the remote control may indicate that the mode of reception is for a DVD player or VCR. If upon receiving the remote control activity data (block 1220) the central office 118 determines there was no such "input" button activity, then the ultimate source of the unidentified audio data is still unknown (block 1225). However, if the remote control activity data indicates one or more selections of the "input" button, then the central office may associate any acquired monitoring data with activities that include, but are not limited to, viewing programs on a VCR, a DVD, or playing a video game depending on the type of activity indicated by the button selections (block 1230).

Because the base units 114 are generally not physically connected to the media delivery centers 112, via, for example, a direct video input port, identification of presented media content is accomplished, in part, by capturing presented audio and/or a signature based on the captured audio, and then matching the signature to reference audio signatures in a reference database. As explained above, various RF and/or IR codes sent from remote controls and/or Peoplemeter remotes are received and logged by the base unit 114, which may allow determination of why collected MPPM audio data fails to match the reference data in the database. While the codes received from a Peoplemeter remote allow demographic information to be determined, IR and/or RF codes and/or commands from various device manufacturers may be stored in a memory and/or database (e.g., within the devices of the household 102 and/or within one or more databases at the central office 118) to be used later to match codes/commands logged at the monitored location. For example, IR codes detected/logged by the base unit 114 may be compared to a database of codes (reference codes) to determine that a Sony® DVD device is being used, which may explain why audio signals and/or signatures captured by the base unit 114 fail to match reference audio signals and/or signatures stored at the central office 118. Additionally, detected IR and/or RF signals may be tracked to log usage activity for such devices, and charts (e.g., pie-charts, bar-charts, etc.) and/or graphs (e.g., histograms) may be generated to further illustrate audience member viewing behaviors. Such devices may include, but are not limited to, DVD players, VCRs, stereo systems, and video game systems. Identification of device usage may also improve the efficiency of the signature matching process by preemptively stopping an attempted reference database query due to a high expectation that no match will be found. As a result, processing resources of the central office 118 may be saved for other tasks.

Even if the central office 118 determines a match between a collected signature and a signature of the database 124, remote control activity may be useful to determine the type of device used to present the media to an audience member. For example, the audience member may choose to receive media via a television broadcast, a cable provider, and/or a satellite provider. While all three of these example media providers may broadcast some of the same media content, data associated with remote control use may allow the central office 118 to determine the source of the media. That is, whether the audience member consumed the media content via a broadcast television, a cable box, and/or a satellite receiver.

Hash Matching

As described above, the central office 118 may attempt to identify signature(s) collected at a monitored location 102, by comparing the collected signature(s) (a "query signature") with a database of reference signatures. The reference signatures may be acquired on an on-going basis to capture new media that is generated by the entertainment industry (e.g., new music videos, movies, sitcoms, soap-operas, etc.). Such reference data may be acquired at media monitoring sites, the central office 118, or by other means and saved to the database 124.

Because the media monitoring sites are typically dedicated to storing very large amounts of data, the databases employed are also large to permit relatively high data rates of data acquisition. For example, reference signatures may be generated from reference data streams at a rate of one signature every 0.032 seconds (31.25 signatures per second). However, signatures are generate at the example monitored site 102 at a much slower rate. For instance, in the illustrated example, the MPPMs 104 and base units 114 generate one signature every 0.128 seconds (7.81 signatures per second). Each signature is a binary string of a certain bit length (e.g., 24-bits, 128 bits, etc.).

Figures 13, 14:
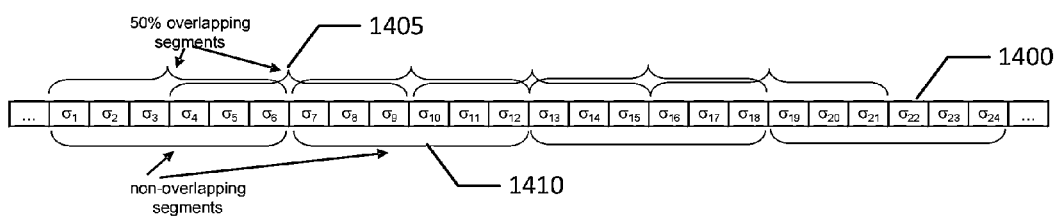
FIG. 13 is a diagram of example streams of signatures captured by a media monitoring center and a Multipurpose Personal Portable Metering device of FIGS. 1, 2A, and 3.
FIG. 14 is a diagram of example audio segments captured by a Multipurpose Personal Portable Metering device of FIGS. 1 and 2A.

FIG. 13 illustrates example streams of signatures captured by a media monitoring center 1300 ("reference signatures") and streams of signatures captured by devices of the example monitored location 1305 ("query signature"). As shown in the example reference signature 1300 stream, 26 samples were taken, each containing a reference timestamp (T) and a reference signature (s). Each reference timestamp (T) may include the date and time in which the reference signature (s) (e.g., a 24-bit value that represents a broadcast audio characteristic) was acquired. The example query signature 1305 stream illustrates that 7 samples were taken, each containing a query timestamp ($\tau$) and a query signature ($\sigma$). Due to the difference between acquisition rates, the query signature stream 1305 does not include 3 out of every 4 signatures in the reference stream, whereas the size of the stream from the reference audio is much more voluminous. Each query timestamp ($\tau$) may include the date and time in which the query signature (σ) was acquired by a metering device (e.g., a MPPM 104, a base unit 114, etc.).

Generally, the corresponding times between the reference timestamp (T) and the query timestamp (τ) are not equal. In particular, a timepiece for a metering device may not be synchronized with the exact time of a reference signature collection center, or the metering device time may drift as a function of battery strength. For each sample in the corresponding reference 1300 and query 1305 streams, an offset (Δ) is calculated as T=τ+Δ (or Δ=T−τ). For any particular query 1305 stream, (Δ) is assumed constant locally, but generally changes due to viewed content change. Accordingly, other portions of the query 1305 streams may have a different offset (Δ). Similarly, the signatures located between the reference signature (s) and the query signature (σ) are not equal due to variations in microphone detection, noise, and/or signal transformation. Even without such differences between the reference and query streams, performing a linear search of an array or list large enough to accommodate a program (e.g., a movie, a television show, a music video, a song, etc.) takes a large amount of time and processor resources.

While the query 1305 stream of FIG. 13 represents a small window of a larger acquisition of samples, for the purposes of matching the query 1305 stream to the reference 1300 streams, the query stream is divided into segments of short length (e.g., 15-30 second segments), as shown in FIG. 14. Segments may be chosen arbitrarily, either having some overlap 1405 or no overlap 1410. For purposes of illustration, the example query stream 1400 of FIG. 14 includes six separate signatures per segment. However, in practice the number of signatures per segment is typically 400-1000.

As discussed in further detail below, the offsets found in the query stream 1400 reflect where in the reference 1300 streams similar segments of audio occur. The example process of finding the closest match between the query and the reference stream, in light of the time and signature variations between each, includes loading reference data into a hash table, matching the query data, and filtering the match results to determine a set of most plausible candidate offsets that indicate the source of the query data (e.g., which movie, television show, music video, etc.).

Figure 15:
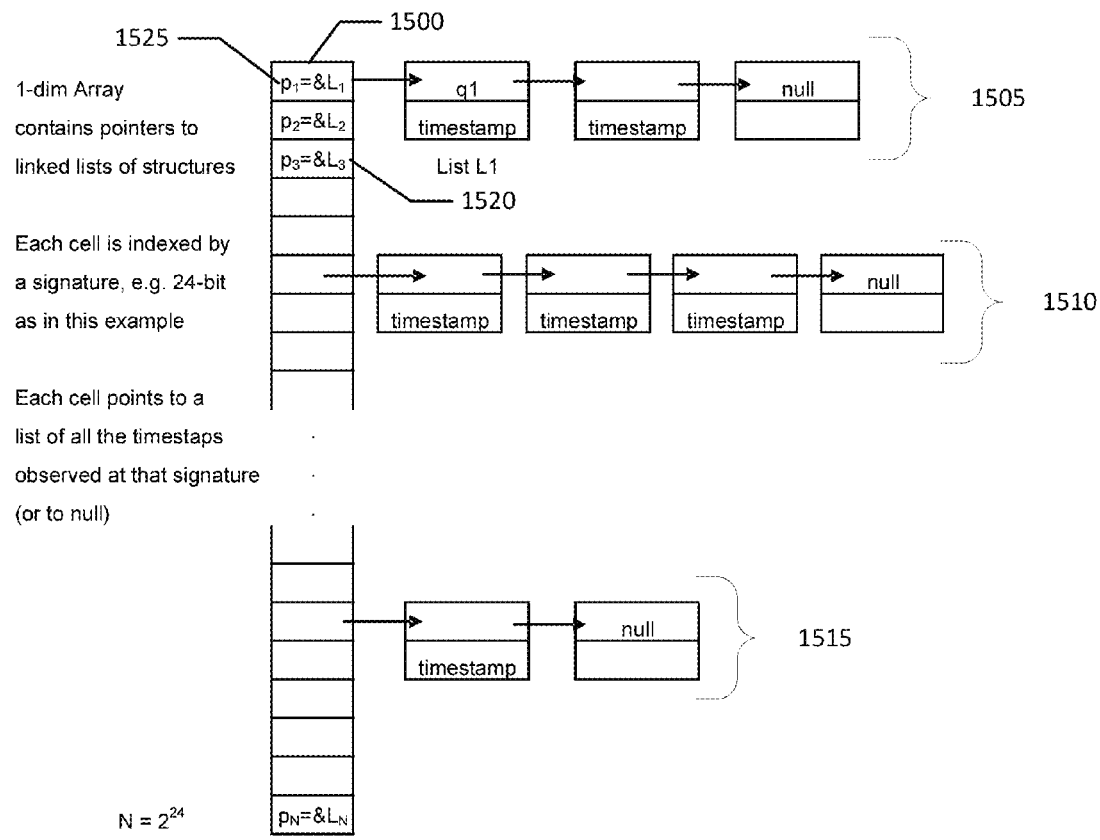
FIG. 15 is a block diagram of an example hash table for use in the system of FIG. 1.

FIG. 15 illustrates an example hash table (H) 1500 generated by the central office 118 and/or various media monitoring sites. The hash table 1500 (or array) may be of a length based on the bit length of the signature bit length, e.g., N=$2^{24}$ for a 24-bit signature. Each cell of the table 1500 includes a pointer (p) to a linked list 1505, 1510, 1515, three of which are shown in FIG. 15. The table 1500 is first initialized by assigning each pointer to NULL in each cell. For each pair of reference (T and s) an index is calculated H(S) with a hash function using the reference audio signature (s). Persons of ordinary skill in the art will appreciate that a number of suitable hash functions may be used to generate a fixed-sized output (hash value) that is unique and used as an index when searching the hash table. The process of creating the hash value with the hash function allows dissimilar inputs (e.g., different signatures) to access a specific cell of the hash table, thereby providing access to a value (e.g., a timestamp of the broadcast program).

After calculating the index location (i.e., hash value) with the hash function, wherein the hash function uses the reference signature to calculate the index, the corresponding reference timestamp (T) is placed in the cell associated with the calculated index. For example, if the resulting index is for the third cell 1520 of the table 1500, and the third cell 1520 includes a pointer to NULL, then the pointer $p_3$ is assigned to the timestamp (T). However, if the calculated index results in the first cell 1525 of the table 1500 and the pointer is not assigned to NULL, then the timestamp (T) is saved in the first location of a linked list 1505 that contains a NULL. The use of linked lists 1505, 1510, 1515 allows for index collision management. The hash function may not always guarantee that every input will map to a different output (e.g., a different offset), thus the cell pointers (p) point to a linked list to store the different values therein.

After all of the reference signatures and associated timestamps are added to the hash table, the query signatures are matched to the reference signatures on a segment-by-segment basis (each segment having M signatures therein). Each segment is processed into a histogram of encountered offsets. As described above, the offsets are calculated as a difference between a reference timestamp and a query timestamp. Those offsets are compared to a threshold that, if exceeded, are retained for postprocessing, described in further detail below. The raw matching results (i.e., those results prior to postprocessing) may include false positives that, when compared to adjacent segments, are eliminated from consideration.

Figure 16:
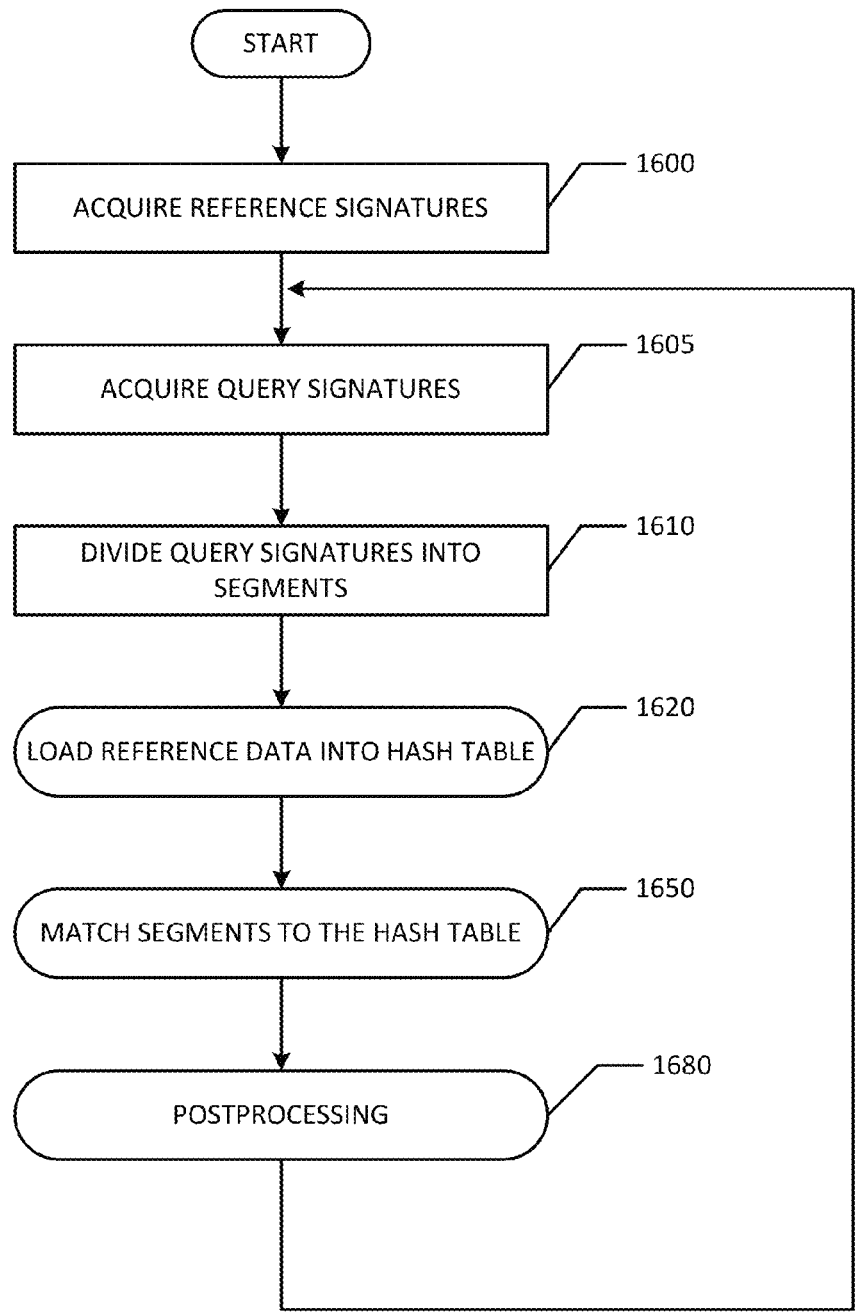
FIG. 16 is a flow diagram of an example process to find a match between reference data and metered data.

FIG. 16 is a flow diagram of an example method that may be used to find a match between reference and query. As described above, reference signatures are collected (block 1600) at media monitoring sites and/or a central office 118. Additionally, query signatures are collected (1605) by metering devices (e.g., MPPMs 104, base units 114, etc.) at various monitored locations 102. The query signatures collected by the metering devices are further divided into segments (block 1610) to allow overlapping and non-overlapping analysis of the collected signatures. Reference signatures are loaded into a hash table 1500 (block 1620) so that the signatures of the various segments 1405, 1410 may be matched to the reference signatures (block 1650). Raw matching data may contain false positives, thus postprocessing (block 1680) allows adjacent segments to be compared to each other, thereby allowing the false positives to be eliminated from consideration.

Figure 17:
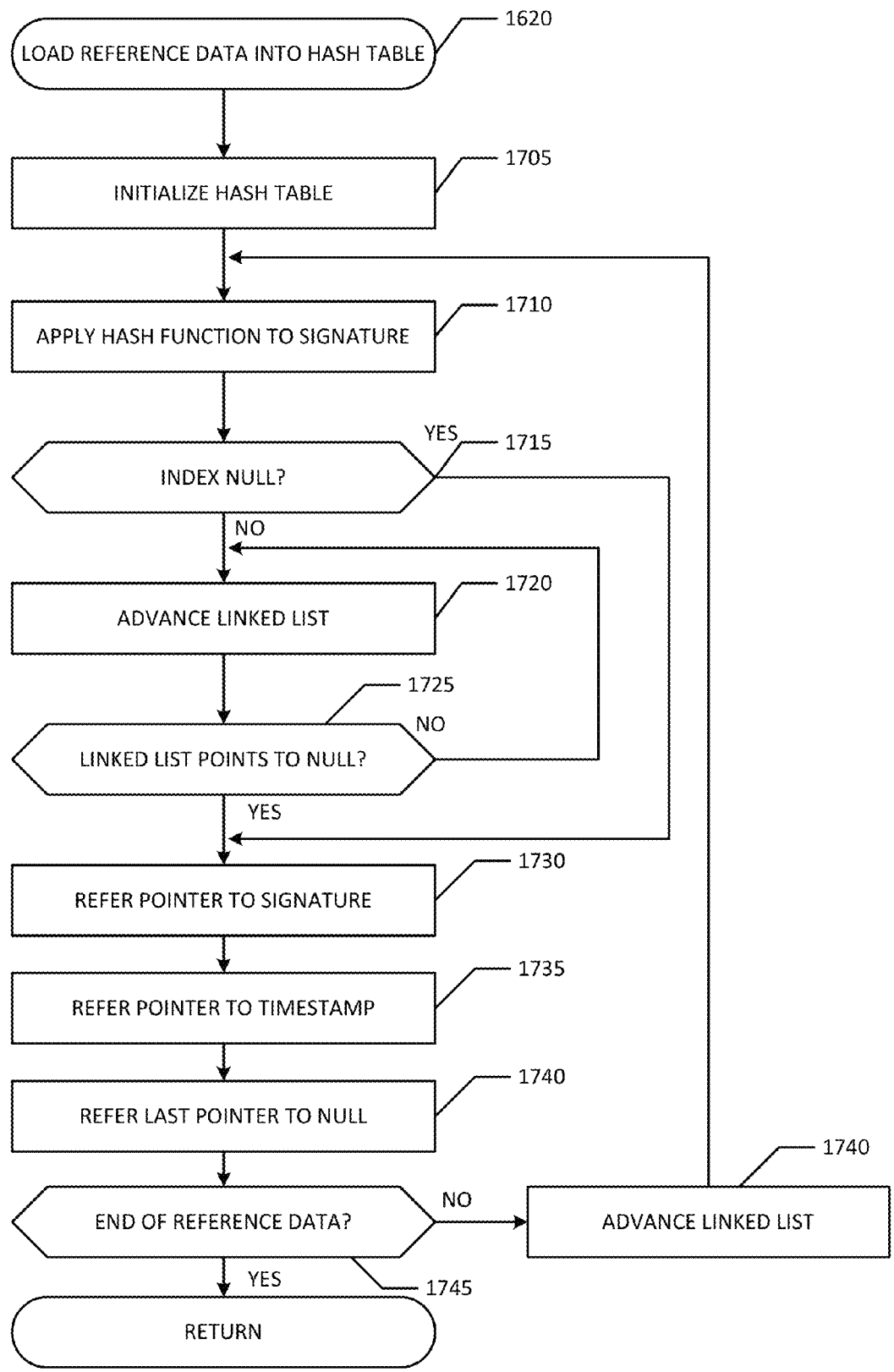
FIG. 17 is a flow diagram of an example process to load reference data into the example hash table of FIG. 15.

FIG. 17 is a flow diagram showing additional detail of the example method that may be used to load reference data into the hash table 1500. Hash table 1500 initialization (block 1705) may begin by verifying that all cells of the table 1500 include a pointer set to NULL. Persons of ordinary skill in the art will appreciate a programming loop may prepare such a table 1500 prior to population and/or modification. For each of the signatures in the stream of reference 1300, the hash function is applied to the signature to compute an index (block 1710). Each cell of the hash table 1500 includes a pointer that either points to NULL or a linked list structure. Before associating the pointer of the cell associated with the recently calculated index, the cell is checked for the NULL pointer (block 1715). If the pointer is not assigned to NULL, then a prior timestamp has been associated with the index, as discussed above in view of FIG. 15. For example, the calculated index may refer to the first cell 1525 of the table 1500, which points to a linked list 1505 having two timestamps listed therein. Accordingly, the pointer advances one position through the linked list 1505 (block 1720) and determines whether the pointer refers to NULL in that position of the linked list 1505 (block 1725). Continuing with the example linked list 1505 of FIG. 15, the pointer does not refer to NULL and the pointer again advances to the next position in the linked list 1505. Because this iteration of pointer advancing results in finding the first location of the linked list 1505 that refers to NULL (block 1725), the linked list 1505 location may be associated with the reference signature (block 1730) and the reference timestamp (block 1735). Such multiple entries for a single index location may be the result of the same signature (e.g., the same audio sound) occurred during the broadcast. For example, if a television program has two identical glasses breaking, and such glasses break at different times during the program, then audio signatures for those events are identical, despite the fact that they occurred at different times in the television program.

Returning to block 1715, if the first location of the linked list includes a pointer assigned to NULL, then the program advances directly to block 1730 to associate the index location with the reference signature and the reference timestamp (block 1735). In an abundance of caution, the central office 118 checks to make sure that the last location of any linked list includes a pointer assigned to NULL (block 1740) before determining whether additional signatures in the stream exist (block 1745). If there are additional signatures in the stream, then the next signature is accessed (block 1750) before reiterating the example method and applying the hash function to the next signature (block 1710).

Figure 18:
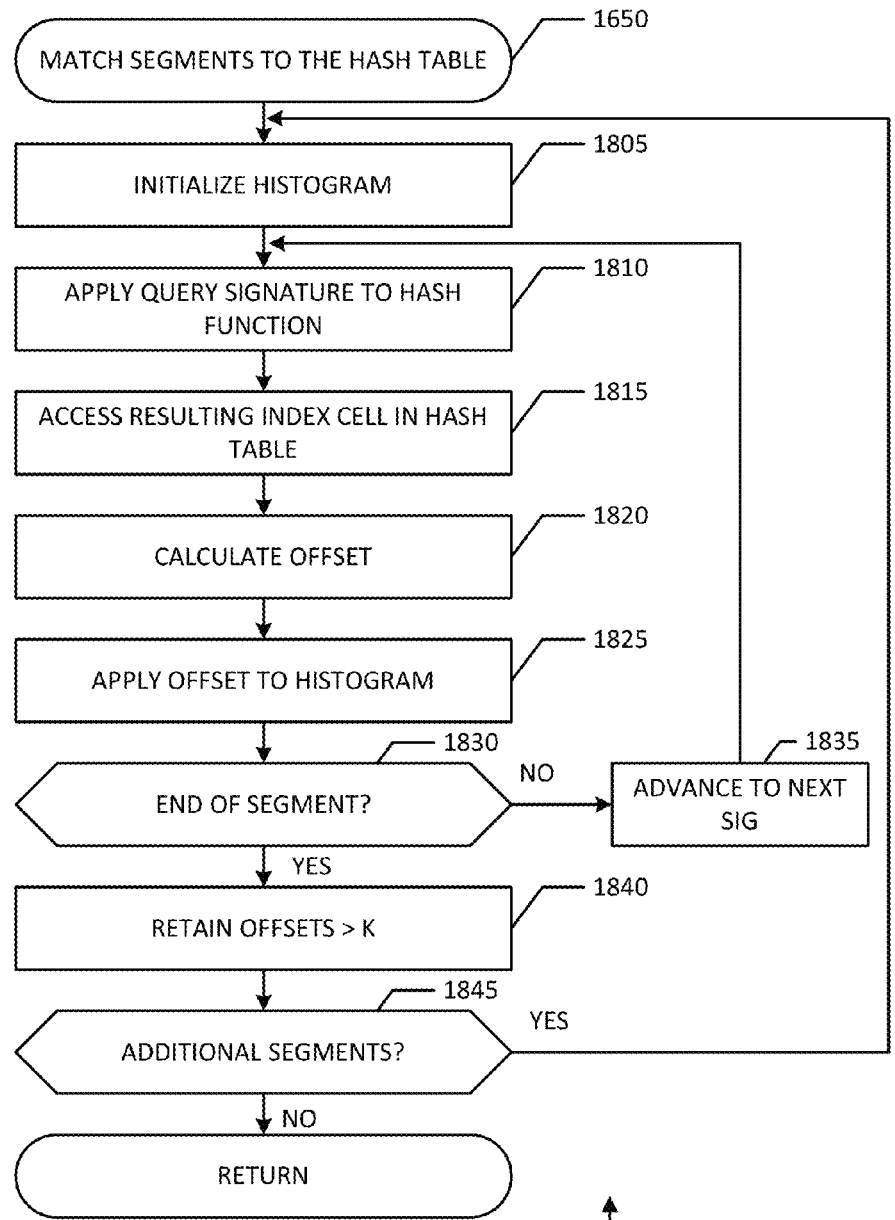
FIG. 18 is a flow diagram of an example process to match metered data with reference data.

FIG. 18 is a flow diagram showing additional detail of the example method that may be used to match reference data of the hash table 1500 to acquired query data. Query signature matching may begin by initializing a histogram (block 1805) that will store and analyze results from the selected segment. Much like the initialization of the hash table, described above, persons of ordinary skill in the art will appreciate that the histogram may be created and stored in a temporary memory location and initialized to set, for example, an array to NULL (e.g., a 'for' loop). For each of the signatures in a first of many segments, examples of which discussed are above and shown in FIG. 14, the hash function is applied to yield a resulting index location (block 1810). For example, reconsidering the sound of a breaking glass example discussed above, if the query signature is a 24-bit representation of some aspect of the signal energy for the breaking-glass sound, then applying the hash function to that 24-bit number results in an index value associated with the reference signature of that sound, which may be accessed in the hash table (block 1815). Unlike a standard database that typically applies a linear search in an iterative manner to check each cell for a matching signature, the use of the hashing function and hash table produced a likely candidate match in constant time (i.e., a constant number of operations rather than an unknown number of iterative operations prior to finding a match).

While the index calculated based on hashing the query signature may suggest a match with the reference signature, such match may not actually be associated with the same television program, movie, music video, song, etc. For example, the query signature of the breaking-glass sound may have occurred on an alternate station compared to the station for which the reference signature is associated. Alternatively, the query signature may be that of some other sound that has the same signature as the breaking-glass sound of the reference signature. Therefore, matching those two with raw matching data may not yield accurate results.

Figure 19:
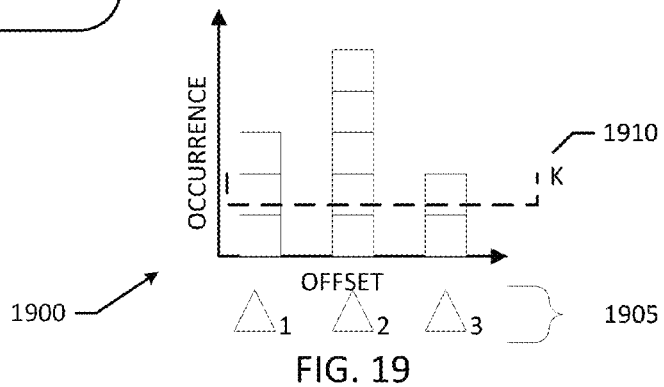
FIG. 19 is an example histogram to compare offsets with a threshold.

After accessing the resulting index location of the hash table (block 1815), the offset between the reference timestamp and the query timestamp may be calculated (block 1820) and added to the histogram (block 1825). Turning briefly to FIG. 19, each offset calculated from the segment of signatures is added to a histogram 1900. Along the x-axis of the histogram 1900 are several offset values 1905 that result from the various calculations, wherein only three are shown in FIG. 19 for purposes of illustration. Along the y-axis of the histogram 1900 is an indication of the frequency of occurrence for each of the offsets of the x-axis. The example histogram 1900 of FIG. 19 illustrates three occurrences for the offset ($\Delta_1$), five occurrences for the offset ($\Delta_2$), and two occurrences for the offset ($\Delta_3$). As discussed below, a threshold K 1910 is established to identify offset data that should be retained during post processing.

Returning to FIG. 18, if additional query signatures remain in the segment (block 1830), then the central office 118 advances to the next signature of the segment (block 1835) and applies the hash function (block 1810) in the manner described above. On the other hand, when the last signature of the segment (block 1830) has been matched and the calculated offsets of the segment have all been added to the histogram, any offsets that fail to meet the threshold K 1910 are discarded (block 1840). In the example of FIG. 19, offsets for ($\Delta_1$) and ($\Delta_2$) are retained, while the offsets for ($\Delta_3$) are discarded for failing to exceed the threshold K 1910. If additional segments remain (block 1845), then another histogram is initialized (block 1805) and the example method repeats in the manner discussed above. When all segments have been matched and qualifying offsets retained (block 1845), control advances to block 1680 of FIG. 16.

Figure 20:
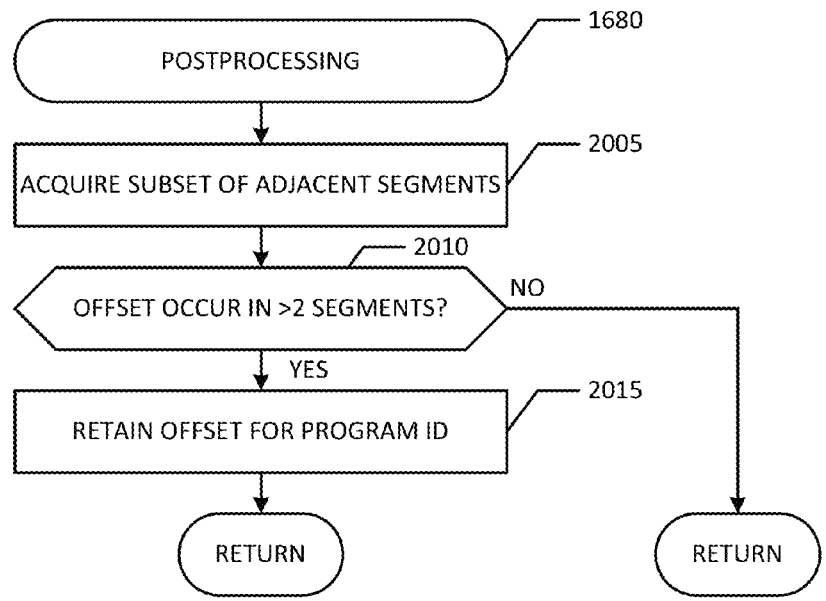
FIG. 20 is a flow diagram of an example process to post-process match data.
Figure 21A:
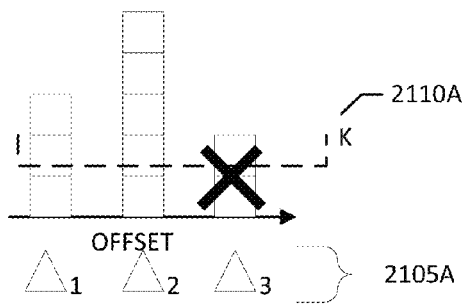
FIGS. 21A, 21B, and 21C are example histograms to compare offsets with a threshold.
Figure 21B:
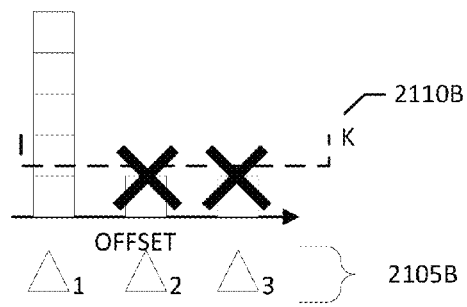
Figure 21C:
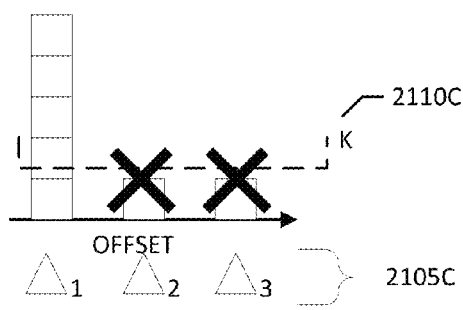

FIG. 20 is a flow diagram showing additional detail of the example method that may be used to post process match data. Each segment that was matched and compared to the threshold K 1910 is acquired from memory for further comparison (block 2005). Because of concern for false positives from the matching process, results of adjacent segments are compared to one another. For example, three segments may be compared to one another, each of which previously resulted in a histogram. Three example histograms are shown in FIGS. 21A, 21B, and 21C. While the histogram 2100A of FIG. 21A retained offsets ($\Delta_1$) and ($\Delta_2$) because they exceeded the threshold 2110A, the histograms 2100B and 2100C of FIGS. 21B and 21C, respectively, retained only offset ($\Delta_1$) and discarded offsets ($\Delta_2$) and ($\Delta_3$). Accordingly, the central office 118 performs a comparison of the segment results (block 2010) and applies a test to determine which, if any, offsets should be kept and relied upon as an indication of media identification. For example, the comparison (block 2010) may seek an occurrence of more than two offsets in adjacent segments prior to retaining such offsets for program identification purposes (block 2015). In view of FIGS. 21A, 21B, and 21C, only offset (1) meets the criteria of the comparison (block 2010) and is retained (block 2015). On the other hand, if none of the analyzed segments meets the criteria of comparison (block 2010), then control advances to block 1680 of FIG. 16 for additional signature acquisition (block 1605) and analysis as shown in FIG. 16.

Figure 22:
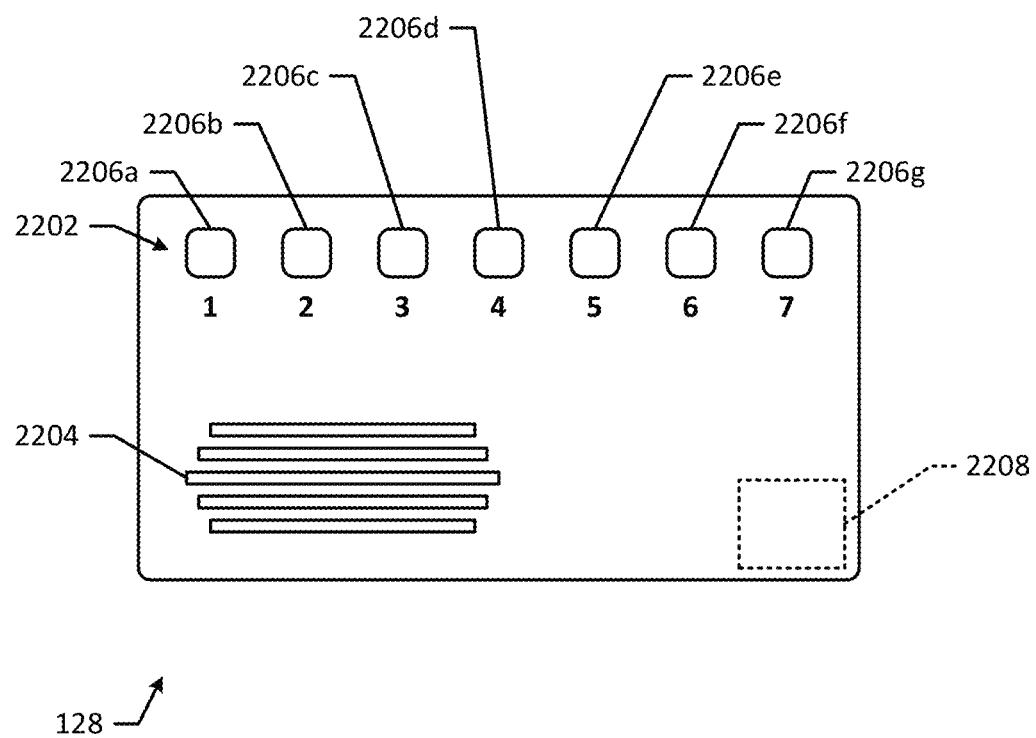
FIG. 22 is a detailed view of the example compliance status device of FIG. 1.

FIG. 22 is a detailed view of the example compliance status device 128 of FIG. 1. The compliance status device 128 includes a display 2202 and a speaker 2204. The display 2202 may be implemented using a set of LEDs 2206a-2206g. Each of the LEDs 2206a-2206g may represent one of the household audience members. The LEDs 2206a-2206g may be used to indicate whether the household audience members' MPPM usage is in compliance with MPPM usage requirements. For example, each of the LEDs 2206a-2206g may be a multi-color LED and may glow red when the corresponding household audience member is non compliant and may glow green when the corresponding household audience member is compliant. Alternatively, each of the LEDs 2206a-2206g may be active (e.g., turned on) when the corresponding household audience member is non compliant and inactive (e.g., turned off) when the corresponding household audience member is compliant. In an alternative example implementation, the display 2202 may be implemented using an LCD or any other suitable display technology in combination with or instead of the LEDs 2206a-2206g. The speaker 2204 may be used to generate alerts or alarms. The alerts may be used to indicate, for example, when a household audience member is in a compliant or a non compliant state. For example, the speaker 2204 may be used to emit a unique tone for each audience member of the household that is non compliant.

The compliance status device 128 may also include a wireless transceiver 2208. The wireless transceiver 2208 may be implemented using, for example, a Bluetooth® transceiver, an 802.11 transceiver, and/or any other suitable wireless transceiver. The compliance status device 128 may be communicatively coupled to each MPPM of the household 102, each base unit 114 (FIG. 1), and the home processing unit 116 (FIG. 1) via the wireless transceiver 2208. Each MPPM in the household 102 may be configured to wirelessly transmit compliance status information directly to the compliance status device 128 and/or, each MPPM may be configured to transmit compliance status information to a central collection facility (e.g., the central facility 118 of FIG. 1). The central collection facility may then communicate the compliance status information to the compliance status device 128 via, for example, the home processing system 116.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

We claim:

1. A method to manage power consumption of a portable device, comprising:
    transmitting a first discovery inquiry message in response to a wakeup timer expiration signal;
    disabling a media detection circuit of the portable device when a base unit responds to the first discovery inquiry message, the portable device associated with a first household;
    determining whether the response to the first discovery inquiry message includes an identifier associated with a media metering application of the first household; and
    enabling the media detection circuit of the portable device when the base unit response to the first discovery inquiry message is absent.

2. The method as defined in claim 1, further comprising:
    ignoring the base unit response to the first discovery inquiry message when the response is associated with a second household; and
    identifying the portable device as located in the first household when the base unit response comprises the identifier associated with the metering application of the first household.

3. The method as defined in claim 1, further comprising enabling a location detection circuit when the base unit response to the first discovery inquiry message is absent.

4. The method as defined in claim 3, wherein the location detection circuit comprises a global positioning satellite detection circuit.

5. The method as defined in claim 1, further comprising disabling a location detection circuit when the base unit responds to the first discovery inquiry message.

6. The method as defined in claim 5, wherein the location detection circuit comprises a global positioning satellite detection circuit.

7. The method as defined in claim 1, wherein the first discovery inquiry message is transmitted via a first radio frequency (RF) signal.

8. The method as defined in claim 7, further comprising detecting the base unit response to the first discovery inquiry message via at least one of an audio signal or a second RF signal.

9. The method as defined in claim 8, further comprising disabling an audio detection circuit of the portable device when the base unit response comprises the audio signal.

10. The method as defined in claim 1, further comprising resetting the wakeup timer after disabling the media detection circuit to re-enable the media detection circuit to transmit a second discovery inquiry message at a subsequent time.

11. The method as defined in claim 1, wherein the media detection circuit collects at least one of an audio output of a media presentation device, or a code in the audio output of the media presentation device.

12. The method as defined in claim 1, further comprising causing the base unit to acquire audience information when the portable device is in a household to reduce power consumption by the portable device.

13. An apparatus to manage power consumption of a portable device, comprising:
    a communication interface having a processor to:
        transmit a first discovery inquiry message in response to a wakeup timer expiration signal;
        disable a media detection circuit of the portable device when a base unit responds to the first discovery inquiry message, the portable device associated with a first household;
        determine whether the response to the first discovery inquiry message includes an identifier associated with a media metering application of the first household; and
        enable the media detection circuit of the portable device when the base unit response to the first discovery inquiry message is absent.

14. The apparatus as defined in claim 13, wherein the communication interface is to:
    ignore the base unit response to the first discovery inquiry message when the response is associated with a second household; and
    identify the portable device as located in the first household when the base unit response comprises the identifier associated with the metering application of the first household.

15. The apparatus as defined in claim 13, wherein the communication interface is to enable a location detection circuit when the base unit response to the first discovery inquiry message is absent.

16. The apparatus as defined in claim 13, wherein the communication interface is to disable a location detection circuit when the base unit responds to the first discovery inquiry message.

17. The apparatus as defined in claim 13, wherein the communication interface is to detect a base unit response to the first discovery inquiry message via at least one of an audio signal or a radio frequency signal.

18. A machine readable storage device or storage disk comprising instructions stored thereon that, when executed, cause a machine to, at least:
    transmit a first discovery inquiry message in response to a wakeup timer expiration signal;
    disable a media detection circuit of a portable device when a base unit responds to the first discovery inquiry message, the portable device associated with a first household;
    determine whether the response to the first discovery inquiry message includes an identifier associated with a media metering application of the first household; and
    enable the media detection circuit of the portable device when the base unit response to the first discovery inquiry message is absent.

19. The machine readable storage device or storage disk as defined in claim 18, wherein the instructions, when executed, cause the machine to:
- ignore the base unit response to the first discovery inquiry message when the response is associated with a second household; and
- identify the portable device as located in the first household when the base unit response comprises the identifier associated with the metering application of the first household.

20. The machine readable storage device or storage disk as defined in claim 18, wherein the instructions, when executed, cause the machine to enable a location detection circuit when the base unit response to the first discovery inquiry message is absent.

21. The machine readable storage device or storage disk as defined in claim 18, wherein the instructions, when executed, cause the machine to disable a location detection circuit when the base unit responds to the first discovery inquiry message.

22. The machine readable storage device or storage disk as defined in claim 18, wherein the instructions, when executed, cause the machine to detect the base unit response to the first discovery inquiry message via at least one of an audio signal or an RF signal.

23. The machine readable storage device or storage disk as defined in claim 18, wherein the instructions, when executed, cause the machine to disable an audio detection circuit of the portable device when the base unit response comprises the audio signal.

24. The machine readable storage device or storage disk as defined in claim 18, wherein the instructions, when executed, cause the machine to cause the base unit to acquire audience information when the portable device is in a household to reduce power consumption by the portable device.

* * * * *